(12) United States Patent
Luo et al.

(10) Patent No.: US 12,217,011 B2
(45) Date of Patent: Feb. 4, 2025

(54) GENERATING ADAPTIVE TEXTUAL EXPLANATIONS OF OUTPUT PREDICTED BY TRAINED ARTIFICIAL-INTELLIGENCE PROCESSES

(71) Applicant: The Toronto-Dominion Bank, Toronto (CA)

(72) Inventors: Yaqiao Luo, Toronto (CA); Jesse Cole Cresswell, Toronto (CA); Kin Kwan Leung, Toronto (CA); Kai Wang, Hockessin, DE (US); Atiyeh Ashari Ghomi, Toronto (CA); Caitlin Messick, Chadds Ford, PA (US); Lu Shu, Mount Laurel, NJ (US); Barum Rho, Toronto (CA); Maksims Volkovs, Toronto (CA); Paige Elyse Dickie, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 469 days.

(21) Appl. No.: 17/533,358

(22) Filed: Nov. 23, 2021

(65) Prior Publication Data
US 2023/0103753 A1 Apr. 6, 2023

Related U.S. Application Data

(60) Provisional application No. 63/252,496, filed on Oct. 5, 2021.

(51) Int. Cl.
*G06F 40/40* (2020.01)
(52) U.S. Cl.
CPC .................................. *G06F 40/40* (2020.01)

(58) Field of Classification Search
CPC ...... G06F 40/40; G06F 18/213; G06F 18/214; G06F 40/30; G06N 20/00; G06N 3/044;
(Continued)

(56) References Cited

U.S. PATENT DOCUMENTS 10,510,022 B1 * 12/2019 Tharrington, Jr. ..... G06N 5/045
2017/0193392 A1 * 7/2017 Liu ........................ G06N 20/00
(Continued)

OTHER PUBLICATIONS

Friedman, Jerome H. "Greedy function approximation: A gradient boosting machine." Annals of statistics (2001): 1189-1232 .~ (Year: 2001).*

(Continued)

*Primary Examiner* — Fariba Sirjani
(74) *Attorney, Agent, or Firm* — NIXON PEABODY LLP

(57) ABSTRACT

The disclosed embodiments include computer-implemented processes that generate adaptive textual explanations of output using trained artificial intelligence processes. For example, an apparatus may generate an input dataset based on elements of first interaction data associated with a first temporal interval, and based on an application of a trained artificial intelligence process to the input dataset, generate output data representative of a predicted likelihood of an occurrence of an event during a second temporal interval. Further, and based on an application of a trained explainability process to the input dataset, the apparatus may generate an element of textual content that characterizes an outcome associated with the predicted likelihood of the occurrence of the event, where the element of textual content is associated with a feature value of the input dataset. The apparatus may also transmit a portion of the output data and the element of textual content to a computing system.

22 Claims, 12 Drawing Sheets

(58) Field of Classification Search
CPC ............ G06N 3/08; G06N 5/01; G06N 5/045; G06N 7/01; G06N 20/20
See application file for complete search history.

(56) References Cited

U.S. PATENT DOCUMENTS

| | | | | |
|---|---|---|---|---|
| 2021/0049503 | A1* | 2/2021 | Nourian | G06F 11/3466 |
| 2021/0201176 | A1* | 7/2021 | Dhingra | G06N 20/00 |
| 2021/0295427 | A1* | 9/2021 | Shiu | G06N 5/04 |
| 2021/0383268 | A1* | 12/2021 | Miroshnikov | G06V 10/776 |
| 2021/0390457 | A1* | 12/2021 | Romanowsky | G06N 5/04 |
| 2022/0067580 | A1* | 3/2022 | Rho | G06F 9/451 |
| 2022/0083873 | A1* | 3/2022 | Ramey | G06N 20/00 |
| 2022/0172101 | A1* | 6/2022 | Das | G06N 5/04 |
| 2022/0180252 | A1* | 6/2022 | Marvaniya | G06F 16/9024 |
| 2022/0188701 | A1* | 6/2022 | Röder | G16H 10/60 |
| 2022/0207324 | A1* | 6/2022 | Hamilton | G06N 3/049 |
| 2022/0301658 | A1* | 9/2022 | Zamft | G16B 20/50 |
| 2023/0033680 | A1* | 2/2023 | Whatley | G06F 18/2134 |
| 2023/0076559 | A1* | 3/2023 | Sankarapu | G06Q 40/03 |
| 2023/0103753 | A1* | 4/2023 | Luo | G06F 40/40 704/9 |
| 2024/0005150 | A1* | 1/2024 | Dugger | G06N 3/08 |
| 2024/0070487 | A1* | 2/2024 | Merrill | G06N 20/00 |

OTHER PUBLICATIONS

Greenwell, Brandon M., Bradley C. Boehmke, and Andrew J. McCarthy. "A simple and effective model-based variable importance measure." arXiv preprint arXiv:1805.04755 (2018) (Year: 2018).*

* cited by examiner

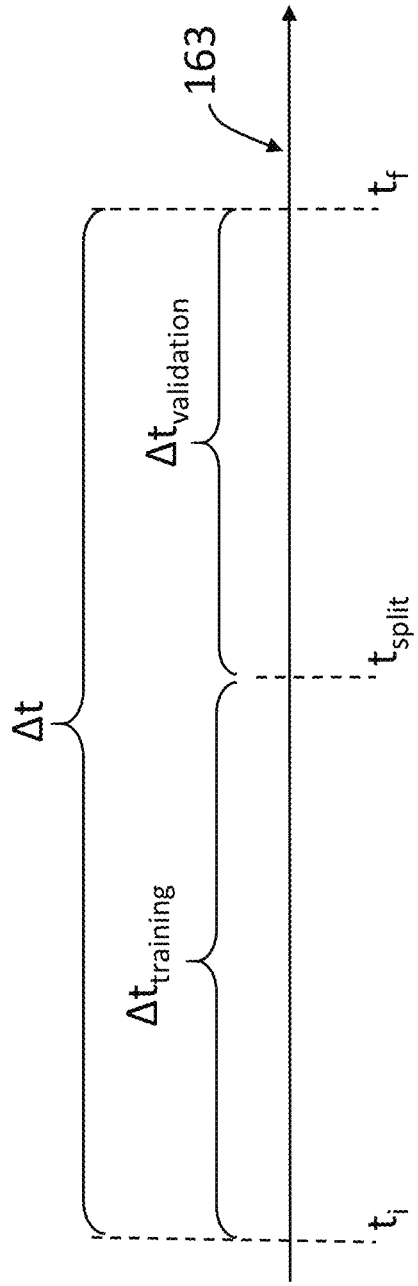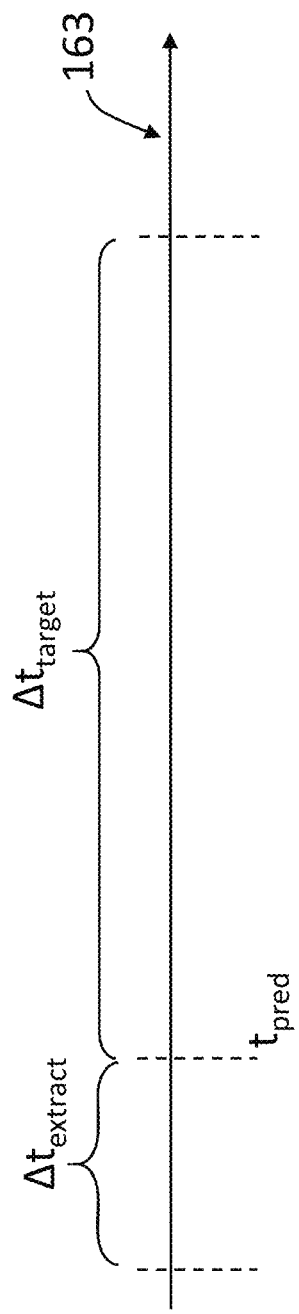

GENERATING ADAPTIVE TEXTUAL EXPLANATIONS OF OUTPUT PREDICTED BY TRAINED ARTIFICIAL-INTELLIGENCE PROCESSES

CROSS-REFERENCE TO RELATED APPLICATION

This application claims the benefit of priority to U.S. Provisional Patent Application No. 63/252,496, filed on Oct. 5, 2021, the entire disclosure of which is expressly incorporated herein by reference to its entirety.

TECHNICAL FIELD

The disclosed embodiments generally relate to computer-implemented systems and processes that generate adaptive textual explanations of output predicted by trained artificial intelligence processes.

BACKGROUND

Today, many financial institutions extend credit in the form of credit-card accounts, personal loans, and other unsecured lines-of-credit to their customers in accordance with certain terms and conditions, such as a repayment schedule or corresponding interest rate. The terms and conditions associated with the extended credit may be established initially by the financial institutions prior to issuing the credit-card accounts, personal loans, and unsecured lines-of-credit to corresponding ones of the customers and further, the financial institutions may elect to modify one or more of the terms and conditions of the extended credit based on an evolution in the relationships between the financial institutions and the customers, and based on the customer's use, or misuse, of various financial or credit instruments issued by these financial institutions.

SUMMARY

In some examples, an apparatus includes a memory storing instructions, a communications interface, and at least one processor coupled to the memory and the communications interface. The at least one processor is configured to execute the instructions to generate an input dataset based on elements of first interaction data associated with a first temporal interval. Based on an application of a trained artificial intelligence process to the input dataset, the at least one processor is further configured to execute the instructions to generate output data representative of a predicted likelihood of an occurrence of an event during a second temporal interval. Based on an application of a trained explainability process to the input dataset, the at least one processor is further configured to execute the instructions to generate a first element of textual content that characterizes an outcome associated with the predicted likelihood of the occurrence of the event. The first element of textual content is associated with a feature value of the input dataset. The at least one processor is further configured to execute the instructions to transmit a portion of the output data and the first element of textual content to a computing system via the communications interface. The computing system is configured to generate or modify second interaction data based on the portion of the output data, and to provision notification data comprising the first element of textual content to a device associated with the first interaction data.

In other examples, a computer-implemented method includes generating, using at least one processor, an input dataset based on elements of first interaction data associated with a first temporal interval. The computer-implemented method also includes, using the at least one processor, and based on an application of a trained artificial intelligence process to the input dataset, generating output data representative of a predicted likelihood of an occurrence of an event during a second temporal interval. Further, the computer-implemented method includes, using the at least one processor, and based on an application of a trained explainability process to the input dataset, generating a first element of textual content that characterizes an outcome associated with the predicted likelihood of the occurrence of the event. The first element of textual content is associated with a feature value of the input dataset. The method also includes, using the at least one processor, transmitting a portion of the output data and the first element of textual content to a computing system. The computing system is configured to generate or modify second interaction data based on the portion of the output data, and to provision notification data comprising the first element of textual content to a device associated with the first interaction data.

Further, in some examples, a tangible, non-transitory computer-readable medium stores instructions that, when executed by at least one processor, cause the at least one processor to perform a method that includes generating an input dataset based on elements of first interaction data associated with a first temporal interval. The method also includes, based on an application of a trained artificial intelligence process to the input dataset, generating output data representative of a predicted likelihood of an occurrence of an event during a second temporal interval. Further, the method includes, and based on an application of a trained explainability process to the input dataset, generating a first element of textual content that characterizes an outcome associated with the predicted likelihood of the occurrence of the event. The first element of textual content is associated with a feature value of the input dataset. The method also includes transmitting a portion of the output data and the first element of textual content to a computing system. The computing system is configured to generate or modify second interaction data based on the portion of the output data, and to provision notification data comprising the first element of textual content to a device associated with the first interaction data.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed exemplary embodiments, as set forth in the accompanying claims.

BRIEF DESCRIPTION OF THE DRAWINGS

FIGS. 1C and 1D are diagrams of exemplary timelines for training a machine-learning or artificial intelligence process, in accordance with some exemplary embodiments.

Like reference numbers and designations in the various drawings indicate like elements.

DETAILED DESCRIPTION

Figure 1A:
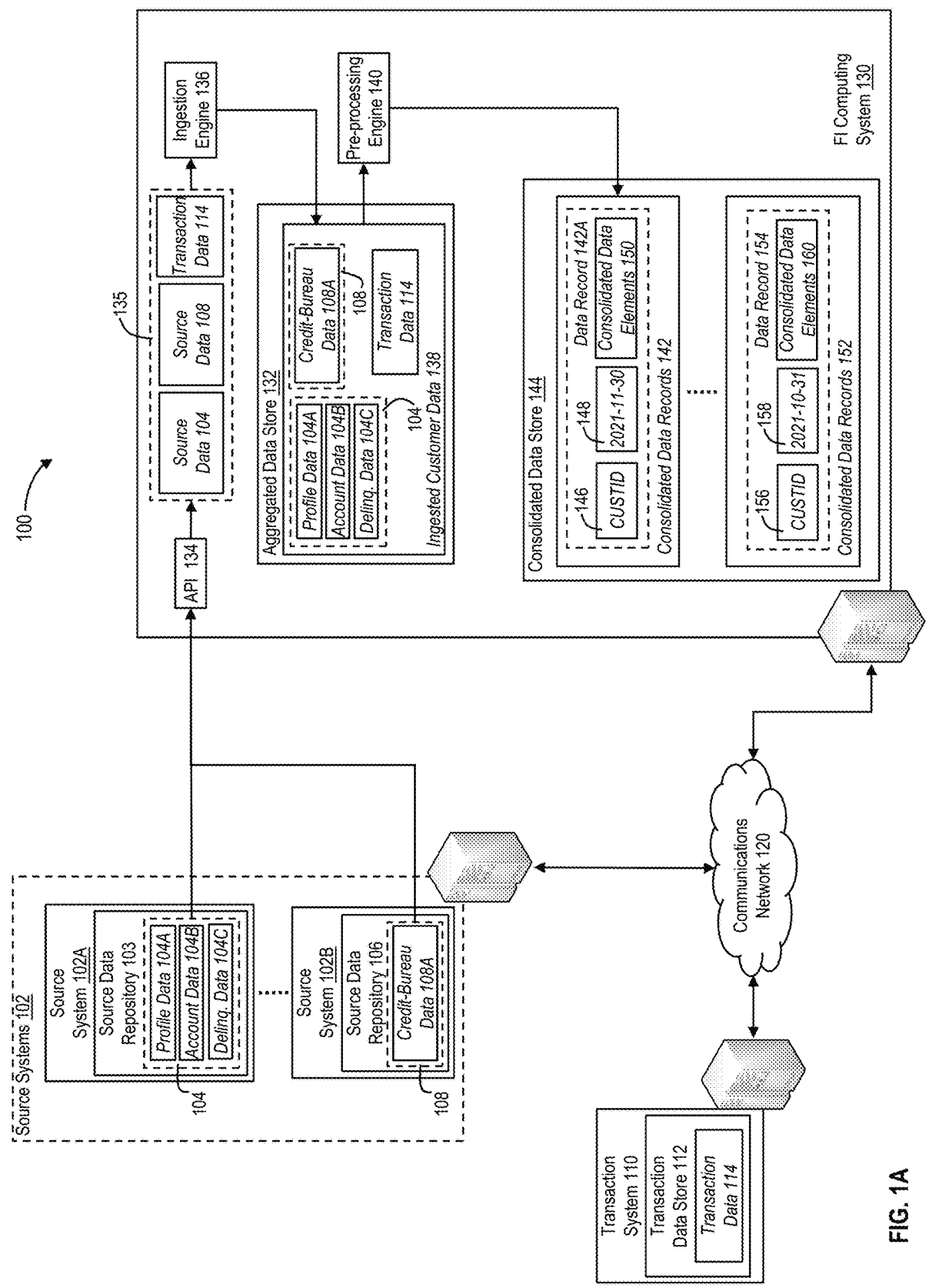
FIGS. 1A and 1B are block diagrams illustrating portions of an exemplary computing environment, in accordance with some exemplary embodiments.

Modern financial institutions offer a variety of financial products or services to their customers, both through in-person branch banking and through various digital channels, and decisions related to the provisioning of a particular financial product or financial service to a corresponding customer are often informed by the customer's relationship with the financial institution and the customer's use, or misuse, of other financial products or services. For example, one or more computing systems of a financial institution (e.g., an FI computing system, as described herein) may obtain, generate, and maintain elements of customer profile data identifying the customer and characterizing the customer's relationship with the financial institution, elements of account data identifying and characterizing one or more financial products issued to the customer by the financial institution, elements of transaction data identifying and characterizing one or more transactions involving these issued financial products, or elements of reporting data, such as credit-bureau data associated with the particular customer. The elements of customer profile data, account data, transaction data, and/or reporting data may establish collectively a time-evolving risk profile for the customer, and the financial institution may base not only a decision to provision the particular financial product or service to the corresponding customer, but also a determination of one or more initial terms and conditions of the provisioned financial product or service, on the established risk profile.

Further, and as described herein, the time-evolving risk profile of the customer may also inform decisions by the financial institution that impact the provisioned product or service, such as, but not limited to, a decision by the financial institution to modify one or more of the terms and conditions imposed initially on the provisioned product or service (e.g., an increase or decrease in a credit limit, a change in a repayment schedule, etc.), or a decision by the financial institution to authorize a transaction involving the provisioned product or service. Further, the time-evolving risk profile of the customer, either alone or in conjunction with additional elements of the customer profile data, account data, transaction data, and/or reporting data that characterize a use, or misuse, of the provisioned product or service, may also inform decisions by the financial institution regarding a suspension or closure of the provisioned product or service, or a subsequent re-issuance of that product or service, and additionally, or alternatively, may also inform one or more collection activities or strategies associated with the customer or the provisioned product or service (e.g., a prioritization of collection activities, etc.).

In some instances, to further characterize the time-evolving risk profile of the customer, and to further inform the decisions by the financial institution regarding a particular financial product or service provisioned, or available for provisioning, to the customer, a machine-learning or artificial-intelligence process may be trained to predict a likelihood of an occurrence of one or more events associated with, or involving, a customer of the financial institution and a corresponding financial product or service during a future temporal interval using training data associated with a first prior temporal interval, and using validation data associated with a second, and distinct, prior temporal interval. The machine-learning or artificial-intelligence process may include an ensemble or decision-tree process, such as a gradient-boosted decision-tree process (e.g., XGBoost process), and the trained machine-learning or artificial-intelligence process (e.g., the trained gradient-boosted, decision-tree process described herein) may further ingest input datasets associated with one or more customers of the financial institution, and based on an application of the trained gradient-boosted, decision-tree process to the input datasets, the one or more FI computing systems may generate elements of output data indicative of a likelihood of an occurrence of one or more events involving corresponding ones of the customers and the corresponding financial product or service during a future temporal interval disposed subsequent to a prediction date.

By way of example, the corresponding financial product or service may include, but is not limited to, a credit product, such as a secured or unsecured credit-card account held by a corresponding customer of the financial institution, such as, but not limited to, an individual or personal-banking customer or a small-business banking customer. Further, and through an implementation of the exemplary processes described herein, the one or more FI computing systems (e.g., which may collectively establish a distributed computing cluster associated with the financial institution) may adaptively, and successively, train and validate the machine-learning or artificial-intelligence process to predict an occurrence of a default event involving credit card account held by a customer of the financial during a future, twelve-month interval using respective elements of the training and validation data.

In some instances, the training and validation data associated with the prediction of the occurrence of the default event may include, but are not limited to, elements of profile, account, transaction, or reporting data characterizing corresponding ones of the customers of the financial institution, along with elements of delinquency data identifying and characterizing prior occurrences of default events associated with, or involving, the corresponding customers (e.g., that collective establishes elements of "interaction data"). Further, the trained machine-learning or artificial-intelligence process (e.g., the trained gradient-boosted, decision-tree process described herein) may further ingest input datasets associated with one or more customers of the financial institution, and based on an application of the trained gradient-boosted, decision-tree process to the input datasets, the one or more FI computing systems may generate elements of output data indicative of a likelihood of an occurrence of a default event involving corresponding ones of the customers during a future temporal interval, such as, but not limited to, a twelve-month period interval disposed subsequent to a prediction date.

As described herein, and for the customer holding the credit card account, a default event may occur when the credit card account is associated with a past due balance (e.g., that accrues due to scheduled payments missed, or delayed, by the customer), and when the a past-due balance is associated with a corresponding past-due interval (e.g., as defined by the number of scheduled payments missed, or delayed, by the customer) that exceeds a predetermined threshold time period (e.g., ninety days, etc.). An occurrence of a default event may also be associated with an inability of the financial institution to recover all, or at least a portion of, an outstanding balance associated with the credit-card account (e.g., based on a determination of the financial institution to "charge off" or write down the past-due balance on the credit-card account, and to cease collection efforts involving the past due balance). For instance, the decision by the financial institution to "charge off" or write down the past-due balance on the credit-card account may be triggered by the customer's declaration of, or association with, a personal or business bankruptcy.

Certain of these exemplary processes, which train and validate a gradient-boosted, decision-tree process using customer-specific training and validation datasets associated with respective training and validation periods, and which apply the trained and validated gradient-boosted, decision-tree process to additional customer-specific input datasets, may enable the one or more of the FI computing systems to predict, in real-time, a likelihood of an occurrence of an event involving one or more customer of the financial institution, such as, but not limited to, the exemplary default event described herein, during a predetermined, future temporal interval (e.g., via an implementation of one or more parallelized, fault-tolerant distributed computing and analytical protocols across clusters of graphical processing units (GPUs) and/or tensor processing units (TPUs)). These exemplary processes may, for example, be implemented in addition to, or as alternative to, processes through which the one or more FI computing systems compute customer-specific scores indicative of a potential misuse of financial, products or services during a current temporal interval or that characterize a relationship between the financial institution and a corresponding customer during the current temporal interval.

Further, and as described herein, certain of the exemplary processes described herein provide, to the financial institution, a real-time indication of the likelihood of a future default event (e.g., during the future temporal interval) involving one or more customers, which may inform a determination of not only an initial set of terms and conditions associated with a newly issued credit product, but may also inform decisions, by the financial institution, to approve or decline requests for modifications to an initial set of terms and conditions, or to authorize a transaction involving the issued credit product, as well as decisions, by the financial institution, to suspend, close, or subsequently reissue the credit product, and decisions to implement one or more collection processes or strategies involving the credit product. By way of example, a customer may request, via a digital channel (e.g., through a mobile application executed at customer device, etc.) or an in-person branch appointment, that the financial institution increase an initial credit limit established for a credit-card account. Based on an implementation of any of the exemplary processes described herein, the one or more FI computing systems may generate, in real-time and contemporaneously with the requested credit-limit increase, output data indicative of an indication of the likelihood of a future default event involving the customer and the credit-card account, and the financial institution may elect to approve the requested credit-limit increase (e.g., to issue a "positive" decision) or alternatively, to decline the requested credit-limit increase (e.g., to issue an "adverse" decision).

Further, and in addition to an adverse decision that declines the credit-limit increase requested by the customer (e.g., based on the generated output data characterizing the likelihood of the future default event), the financial institution may also provision, to the customer, information that explains the adverse decision and identifies one or more of the factors that resulted in the decision of the financial institution to decline the requested credit-limit increase. In some instances, however, the one or more factors identified within the provisioned information may include data characterizing one or more coarse metrics of the customer's use or misuse of the credit-card account, and additionally, or alternatively, the customer's interaction of the financial institution, and may not reflect an impact of each, or a selected subset, of the feature values of a corresponding, customer-specific input dataset on the output data derived from an application of the trained gradient-boosted, decision-tree processes to the customer-specific input dataset. By way of example, the provisioned information may include one or more reasons for the adverse decision, which may be generated manually by a representative of the financial institution, or programmatically by the one or more FI computing systems, based on one or more product- or customer-specific rules or reasons, or which may be generated by representatives of the financial institution based on, among other thing, an experience or intuition of the representative.

In some instances, described herein, the one or more FI computing systems may perform operations that apply one, or more, explainability processes to the customer-specific input dataset, and based on the application of the one or more explainability processes to the customer-specific input dataset, the one or more FI computing systems may generate elements of natural language that characterize a causal relationship between the corresponding feature values of the customer-specific input dataset and the predicted output data generated through an application of the trained gradient-boosted, decision-tree process to the customer-specific input dataset. By way of example, the one or more FI computing systems may train an explainability process (e.g., a Shapley-splitter process, as described herein) against elements of one or more validation datasets associated with the trained gradient-boosted, decision-tree process to generate, for each, or a selected subset, of the feature values of customer-specific input dataset, corresponding elements of natural language that characterize a causal relationship between the corresponding feature value and the predicted output data. The one or more FI computing systems may apply the trained explainability process to the elements (e.g., the feature values) of the customer-specific input data set concurrently with the application of the trained, gradient-boosted decision-tree process to that customer-specific input data (e.g., concurrently with, or subsequent to, inferencing), and as described herein, the elements of natural language may characterize an impact of the at least one feature value on an adverse decision associated with the output data (e.g., the adverse decision that declines the requested credit-limit increase, as described herein), in a manner readily apparent to, and appreciable by, both representatives and customers of the financial institution.

Certain of the exemplary processes described herein, which adaptively and dynamically associate one or more feature values of a customer-specific input dataset with a corresponding impact of the one or more feature values of a predicted output of a trained, artificial intelligence or machine learning process, and that generate elements of natural characterizing an adverse decision associated with predicted output based on the corresponding impact, may be implemented by the one or more FI computing systems in addition to, or as an alternate to, conventional mechanisms for developing rationales for adverse decisions based on inflexible, fixed rules or based on an intuition or an experience of a representative of the financial institution. Further, certain of these exemplary reason generation processes described herein, which link the dynamic and programmatic generation of the elements of natural language, e.g., the "adverse reasons," with the trained, artificial intelligence or machine learning process, may enhance an explainability of the trained, artificial intelligence or machine learning process and its role in the decision-making processes of the financial institution.

Further, although the exemplary reason generation processes are described with respect to a trained, artificial intelligence or machine learning process that predict a likelihood of a future default event involving one or more customers, the disclosed embodiments are not limited to this exemplary trained, gradient-boosted, decision-tree process, and in other examples, one or more of the exemplary explainability process described herein, such as, but not limited to, the trained Shapley-splitter process or explainability processes associated with local partial dependency plots, may be applied to the validation data sets or predicted output data associated with any additional, or alternate, trained, gradient-boosted decision tree processes (or other trained, artificial intelligence or machine learning processes) and may generate elements of natural language that characterize causal relationship between the corresponding feature values of a customer-specific input dataset and the predicted output data concurrently with, or subsequent to, inferencing.

Figure 1B:
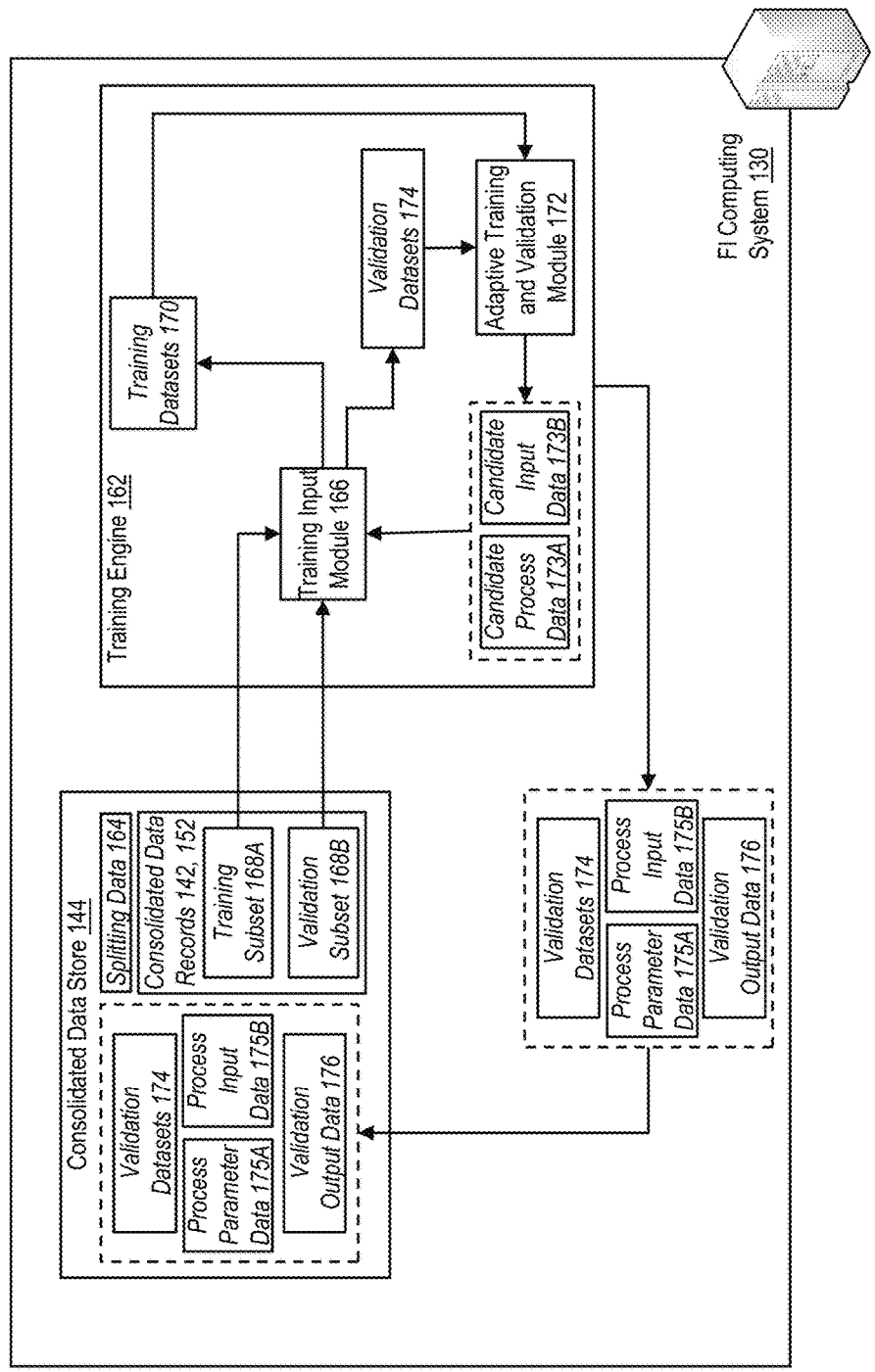

A. Exemplary Techniques for Training Gradient-Boosted, Decision Tree Processes in a Distributed Computing Environment FIGS. 1A and 1B illustrate components of an exemplary computing environment 100, in accordance with some exemplary embodiments. For example, as illustrated in FIG. 1A, environment 100 may include one or more source systems 102, such as, but not limited to, source system 102A and source system 102B, and one or more computing systems associated with, or operated by, a financial institution, such as a transaction system 110 and a financial institution (FI) computing system 130. In some instances, each of source systems 102 (including source system 102A and source system 102B), transaction system 110, and FI computing system 130, may be interconnected through one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In some examples, each of source systems 102 (including source system 102A and source system 102B), transaction system 110, and FI computing system 130 may represent a computing system that includes one or more servers and tangible, non-transitory memories storing executable code and application modules. Further, the one or more servers may each include one or more processors, which may be configured to execute portions of the stored code or application modules to perform operations consistent with the disclosed embodiments. For example, the one or more processors may include a central processing unit (CPU) capable of processing a single operation (e.g., a scalar operations) in a single clock cycle. Further, each of source systems 102 (including source system 102A and source system 102B), transaction system 110, and FI computing system 130 may also include a communications interface, such as one or more wireless transceivers, coupled to the one or more processors for accommodating wired or wireless internet communication with other computing systems and devices operating within environment 100.

Further, in some instances, source systems 102 (including source system 102A and source system 102B), transaction system 110, and FI computing system 130 may each be incorporated into a respective, discrete computing system. In additional, or alternate, instances, one or more of source systems 102 (including source system 102A and source system 102B), transaction system 110, and FI computing system 130 may correspond to a distributed computing system having a plurality of interconnected, computing components distributed across an appropriate computing network, such as communications network 120 of FIG. 1A. For example, FI computing system 130 may correspond to a distributed or cloud-based computing cluster associated with and maintained by the financial institution, although in other examples, FI computing system 130 or transaction system 110 may correspond to a publicly accessible, distributed or cloud-based computing cluster, such as a computing cluster maintained by Microsoft Azure™, Amazon Web Services™, Google Cloud™, or another third-party provider.

In some instances, FI computing system 130 may include a plurality of interconnected, distributed computing components, such as those described herein (not illustrated in FIG. 1A), which may be configured to implement one or more parallelized, fault-tolerant distributed computing and analytical processes (e.g., an Apache Spark™ distributed, cluster-computing framework, a Databricks™ analytical platform, etc.). Further, and in addition to the CPUs described herein, the distributed computing components of FI computing system 130 may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle. Through an implementation of the parallelized, fault-tolerant distributed computing and analytical protocols described herein, the distributed computing components of FI computing system 130 may perform any of the exemplary processes described herein to ingest elements of data associated with the customers of the financial institution, including elements of transaction data characterizing purchase transaction involving these customers, to preprocess the ingested data element and characterize, in real-time, trends or patterns in the customers' purchase transactions, and to store the preprocessed data elements within an accessible data repository (e.g., within a portion of a distributed file system, such as a Hadoop distributed file system (HDFS)).

Further, and through an implementation of the parallelized, fault-tolerant distributed computing and analytical protocols described herein, the distributed components of FI computing system 130 may perform operations in parallel that not only train adaptively a machine learning or artificial intelligence process (e.g., the gradient-boosted, decision-tree process described herein) using corresponding training and validation datasets extracted from temporally distinct subsets of the preprocessed data elements, but also apply the trained machine learning or artificial intelligence process to customer-specific input datasets and generate, in real time, elements of output data indicative of a likelihood of an occurrence of a default event involving corresponding ones of the customers during a future temporal interval, such a twelve-month interval subsequent to a prediction date. The implementation of the parallelized, fault-tolerant distributed computing and analytical protocols described herein across the one or more GPUs or TPUs included within the distributed components of FI computing system 130 may, in some instances, accelerate the training, and the post-training deployment, of the machine-learning and artificial-intelligence process when compared to a training and deployment of the machine-learning and artificial-intelligence process across comparable clusters of CPUs capable of processing a single operation per clock cycle.

Referring back to FIG. 1A, each of source systems 102 may maintain, within corresponding tangible, non-transitory memories, a data repository that includes confidential data associated with the customers of the financial institution. For example, source system 102A may be associated with, or operated by, the financial institution, and may maintain, within one or more tangible, non-transitory memories, a source data repository 103 that includes elements of source data 104 identifying or characterizing customers of the financial institution and interactions between these customers and the financial institution, such as, but are not limited to, customer profile data 104A, account data 104B, and delinquency data 104C. In some instances, customer profile data 104A may include a plurality of data records associated with, and characterizing, corresponding ones of the customers of the financial institution. By way of example, and for a particular customer of the financial institution, the data records of customer profile data 104A may include, but are not limited to, one or more unique customer identifiers (e.g., an alphanumeric character string, such as a login credential, a customer name, etc.), residence data (e.g., a street address, etc.), other elements of contact data (e.g., a mobile number, an email address, etc.), values of demographic parameters that characterize the particular customer (e.g., ages, occupations, marital status, etc.), and other data characterizing the relationship between the particular customer and the financial institution.

Account data 104B may also include a plurality of data records that identify and characterize one or more financial products or financial instruments issued by the financial institution to corresponding ones of the customers. For example, the data records of account data 104B may include, for each of the financial products issued to corresponding ones of the customers, one or more identifiers of the financial product or instrument (e.g., an account number, expiration data, card-security-code, etc.), one or more unique customer identifiers (e.g., an alphanumeric character string, such as a login credential, a customer name, etc.), and additional information characterizing a balance or current status of the financial product or instrument (e.g., payment due dates or amounts, delinquent accounts statuses, etc.). Examples of these financial products or financial instruments may include, but are not limited to, one or more deposit accounts issued to corresponding ones of the customers (e.g., a savings account, a checking account, etc.), one or more secured or unsecured credit products (e.g., a secured or unsecured a credit-card account, etc.), one or more brokerage or retirements accounts issued to corresponding ones of the customers by the financial institutions, and one or more secured credit products issued to corresponding ones of the customers by the financial institution (e.g., a home mortgage, a home-equity line-of-credit (HELOC), an auto loan, etc.).

Further, delinquency data 104C may include data records that identify and characterize occurrences of default events involving customers of the financial institution and corresponding financial products or financial instruments issued by the financial institution, such as the default events associated with the credit-card accounts described herein. In some instances, each of the data records of delinquency data 104C may associate with a corresponding occurrence of a default event, and may include, for the corresponding occurrence of the default event, a unique identifier of a corresponding customer (e.g., an alphanumeric identifier or login credential, a customer name, etc.), temporal data characterizing of the corresponding occurrence of the default event (e.g., a time or date, etc.), information identifying one or more financial products or financial instruments associated with the corresponding occurrence of the default event (e.g., a portion of a tokenized account number for a credit-card account, etc.), and additionally, or alternatively, information characterizing the corresponding occurrence of the default event (e.g., an event type, such as the past-due balance on the credit-card account, the bankruptcy, or the write-down described herein, etc.).

The disclosed embodiments are, however, not limited to these exemplary elements of customer profile data 104A, account data 104B, or delinquency data 104C. In other instances, the data records of source data 104 may include any additional or alternate elements of data that identify and characterize the customers of the financial institution and their relationships or interactions with the financial institution, financial products issued to these customers by the financial institution, and any additional, or alternate, information characterizing prior occurrences of default events involving customer of the financial institution. Further, although stored in FIG. 1A within data repositories maintained by source system 102A, the exemplary elements of customer profile data 104A, account data 104B, and delinquency data 104C may be maintained by any additional or alternate computing system associated with the financial institution, including, but not limited to, within one or more tangible, non-transitory memories of FI computing system 130.

Source system 102B may be associated with, or operated by, one or more judicial, regulatory, governmental, or reporting entities external to, and unrelated to, the financial institution, and source system 102B may maintain, within the corresponding one or more tangible, non-transitory memories, a source data repository 106 that includes one or more elements of source data 108 generated by the judicial, regulatory, governmental, or regulatory entities described herein, such as additional, or alternate, elements of credit-bureau data. In some instances, source system 102B may be associated with, or operated by, a reporting entity, such as a credit bureau, and source data 108 may include data records that specify elements of credit-bureau data 108A associated with one or more customers of the financial institution. In some instances, the elements of credit-bureau data 108A for a particular one of the customers of the financial institution may include, but are not limited to, a unique identifier of the particular customer (e.g., an alphanumeric identifier or login credential, a customer name, etc.), information identifying one or more financial products currently or previously held by the particular customer (e.g., one or more of the financial products or payment instruments described herein, financial products issued by other financial institutions, etc.), and information identifying one or more of a history of payments associated with these financial products, negative events associated with the particular customer (e.g., missed payments, collections, repossessions, etc.), or credit inquiries involving the particular customer (e.g., inquiries by the financial institution, other financial institutions or business entities, etc.).

Further, and as illustrated in FIG. 1A, transaction system 110 may also be associated with, or operated by, the financial institution, and may maintain, within the corresponding one or more tangible, non-transitory memories, a transaction data store 112 having one or more transaction data records that maintain elements of transaction data 114 identifying, and characterizing, transactions initiated by, and involving, customers of the financial institution. Each of the transactions may, for example, be initiated by a customer of the financial institution and involve a corresponding counterparty (e.g., a merchant, retailer, or other business that offers products or services for sale), and may be funded by a corresponding one of the financial products or instruments held by that customer, such as, but not limited to, the credit products described herein.

In some instances, not illustrated in FIG. 1A, transaction system 110 may, via a secure programmatic channel of communications, portions of transaction data 114 from the one or more additional computing systems operating within environment 100 in real-time data and on a continuous streaming basis, on in batch form in accordance with a predetermined temporal schedule (e.g., on a daily basis, a monthly basis, etc.). The one or more additional computing systems may, for example, be associated with a transaction processing network, such as, but not limited to, a payment rail that clears and settles purchase transactions funded via corresponding credit-card accounts. Further, in some instances, the one or more of the additional computing systems may be associated with real-time payment rail that processes and facilitates real-time payment (RTP) transactions between counterparties (e.g., via payment messages structured in accordance with an ISO-20022 messaging standard). Additionally, or alternatively, one or more of the additional computing systems may be associated with a mobile payment rail that processes certain peer-to-peer (P2P) transactions between the customers of the financial institutions and corresponding counterparties, or an automated clearing house (ACH) that also process and facilitate certain of the P2P transactions described herein, along with electronic funds transfer (EFT) transactions between the customers of the financial institutions and the corresponding counterparties.

Referring back to FIG. 1A, FI computing system 130 may perform operations that establish and maintain one or more centralized data repositories within corresponding ones of the tangible, non-transitory memories. For example, as illustrated in FIG. 1A, FI computing system 130 may establish an aggregated data store 132, which maintains, among other things, elements of the customer profile, account, transaction, delinquency, and credit-bureau data associated with one or more of the customers of the financial institution, which may be ingested by FI computing system 130 (e.g., from one or more of source systems 102 and/or from transaction system 110) using any of the exemplary processes described herein. Aggregated data store 132 may, for instance, correspond to a data lake, a data warehouse, or another centralized repository established and maintained, respectively, by the distributed components of FI computing system 130, e.g., through a Hadoop™ distributed file system (HDFS).

For example, FI computing system 130 may execute one or more application programs, elements of code, or code modules that, in conjunction with the corresponding communications interface, establish a secure, programmatic channel of communication with each of source systems 102, including source system 102A and source system 102B, across network 120, and may perform operations that access and obtain all, or a selected portion, of the elements of customer profile, account, delinquency, and/or reporting data maintained by corresponding ones of source systems 102. As illustrated in FIG. 1A, source system 102A may perform operations that obtain all, or a selected portion, of source data 104, including the data records of customer profile data 104A, account data 104B, and delinquency data 104C, from source data repository 103, and transmit the obtained portions of source data 104 across network 120 to FI computing system 130. Further, source system 102B may also perform operations that obtain all, or a selected portion, of source data 108, including the data records of credit-bureau data 108A, from external data repository 106, and transmit the obtained portions of source data 108 across network 120 to FI computing system 130. In some instances, each of source systems 102, including source system 102A and source system 102B, may perform operations that transmit respective portions of source data 104 and source data 108 across network 120 to FI computing system 130 in batch form and in accordance with a predetermined temporal schedule (e.g., on a daily basis, on a monthly basis, etc.), or in real-time on a continuous, streaming basis.

Further, the one or more executed application programs, elements of code, or code modules may also cause FI computing system 130 to perform operations that, in conjunction with the corresponding communications interface, establish a secure, programmatic channel of communication with transaction system 110 across network 120, and may perform operations that access and obtain all, or a selected portion, of the transaction data 114 maintained within transaction data store 112. For example, transaction system 110 may access transaction data store 112, and perform operations that transmit all, or a selected portion, of transaction data 114 across network 120 to FI computing system 130. As described herein, transaction system 110 may perform operations that transmit portions of transaction data 114 across network 120 to FI computing system 130 in real-time on a continuous streaming basis (e.g., upon receipt of transaction data 114 at transaction system 110) or in accordance with a predetermined temporal schedule (e.g., on an hourly basis, on a daily basis, on a monthly basis, etc.).

A programmatic interface established and maintained by FI computing system 130, such as application programming interface (API) 134, may receive the portions of source data 104 (including the data records of customer profile data 104A, account data 104B, and delinquency data 104C) from source system 102A, the portions of source data 108 (including the data records of credit-bureau data 108A) from source system 102B, and portions of transaction data 114 from transaction system 110. The received portions of source data 104, source data 108, and transaction data 114 may collectively represent element of interaction data (e.g., interaction data 135 of FIG. 1A, and API 134 may route the portions of source data 104, source data 108, and transaction data 114 to a data ingestion engine 136 executed by the one or more processors of FI computing system 130. In some instances, the portions of source data 104 and source data 108 (and the additional, or alternate, portions of the customer profile, account, delinquency, or reporting data), and/or transaction data 114, may be encrypted via a corresponding encryption key (e.g., a public cryptographic key of FI computing system 130), and executed data ingestion engine 136 may perform operations that decrypt each of the encrypted portions of source data 104 and source data 108 (and the additional, or alternate, portions of the customer profile, account, delinquency, or reporting data), and/or the portions of transaction data 114, using a corresponding decryption key, e.g., a private cryptographic key associated with FI computing system 130. Executed data ingestion engine 136 may also perform operations that store the portions of source data 104 (including the data records of customer profile data 104A, account data 104B, and delinquency data 104C), source data 108 (including the data records of credit-bureau data 108A), and transaction data 114 within aggregated data store 132, e.g., as ingested customer data 138.

In some instances, a pre-processing engine 140 executed by the one or more processors of FI computing system 130 may access ingested customer data 138, and perform any of the exemplary data pre-processing operations described herein to selectively aggregate, filter, and process portions of the elements of ingested customer data 138, and to generate consolidated data records 142 that characterize corresponding ones of the customers, their interactions with the financial institution and with other financial institutions, and any associated default events during a corresponding temporal interval associated with the ingestion of source data 104, source data 108, and transaction data 114 by executed data ingestion engine 136. By way of example, executed pre-processing engine 140 may access the data records of profile data 104A, account data 104B, delinquency data 104C, credit-bureau data 108A, and in some instances, transaction data 114 (e.g., as maintained within ingested customer data 138). As described herein, each of the accessed data records may include an identifier of corresponding customer of the financial institution, such as a customer name or an alphanumeric character string, and executed pre-processing engine 140 may perform operations that map each of the accessed data records to a customer identifier assigned to the corresponding customer by FI computing system 130. For instance, FI computing system 130 may assign a unique, alphanumeric customer identifier to each customer, and executed pre-processing engine 140 may perform operations that parse the accessed data records, obtain each of the parsed data records that identifies the corresponding customer using a customer name, and replace that customer name with the corresponding alphanumeric customer identifier.

Executed pre-processing engine 140 may also perform operations that assign a temporal identifier to each of the accessed data records, and that augment each of the accessed data records to include the newly assigned temporal identifier. In some instances, the temporal identifier may associate each of the accessed data records with a corresponding temporal interval, which may be indicative of or reflect a regularity or a frequency at which FI computing system 130 ingests the elements of source data 104 and source data 108 from corresponding ones of source systems 102 and/or transaction data 114 from transaction system 110. For example, executed data ingestion engine 136 may receive elements of confidential customer data from corresponding ones of source systems 102 on a monthly basis (e.g., on the final day of the month), and in particular, may receive and store the elements of source data 104 and source data 108 from corresponding ones of source systems 102 on, for example, Nov. 30, 2021. In some instances, executed pre-processing engine 140 may generate a temporal identifier associated with the regular, monthly ingestion of source data 104 and source data 108 on Nov. 30, 2021 (e.g., "2021-11-30"), and may augment the accessed data records of profile data 104A, account data 104B, delinquency data 104C, credit-bureau data 108A, and/or transaction data 114 to include the generated temporal identifier. The disclosed embodiments are, however, not limited to temporal identifiers reflective of a regular, monthly ingestion of source data 104 and source data 108 by FI computing system 130, and in other instances, executed pre-processing engine 140 may augment the accessed data records to include temporal identifiers reflective of any additional, or alternative, temporal interval during which FI computing system 130 ingests the elements of source data 104, source data 108, and transaction data 114.

In some instances, executed pre-processing engine 140 may perform further operations that, for a particular customer of the financial institution during the temporal interval (e.g., represented by a pair of the customer and temporal identifiers described herein), obtain one or more data records of profile data 104A, account data 104B, delinquency data 104C, credit-bureau data 108A, and/or transaction data 114 that include the pair of customer and temporal identifiers. Executed pre-processing engine 140 may perform operations that consolidate the one or more obtained data records and generate a corresponding one of consolidated data records 142 that includes the customer identifier and temporal identifier, and that is associated with, and characterizes, the particular customer of the financial institution across the temporal intervals. By way of example, executed pre-processing engine 140 may consolidate the obtained data records, which include the pair of customer and temporal identifiers, through an invocation of an appropriate Java-based SQL "join" command (e.g., an appropriate "inner" or "outer" join command, etc.). Further, executed pre-processing engine 140 may perform any of the exemplary processes described herein to generate another one of consolidated data records 142 for each additional, or alternate, customer of the financial institution during the temporal interval (e.g., as represented by a corresponding customer identifier and the temporal interval).

Executed pre-processing engine 140 may perform operations that store each of consolidated data records 142 within the one or more tangible, non-transitory memories of FI computing system 130, such as within consolidated data store 144. Consolidated data store 144 may, for instance, correspond to a data lake, a data warehouse, or another centralized repository established and maintained, respectively, by the distributed components of FI computing system 130, e.g., through a Hadoop™ distributed file system (HDFS). In some instances, and as described herein, consolidated data records 142 may include a plurality of discrete data records, and each of these discrete data records may be associated with, and may maintain data characterizing, a corresponding one of the customers of the financial institution during the corresponding temporal interval (e.g., a month-long interval extending from Nov. 1, 2021, to Nov. 30, 2021). For example, and for a particular customer of the financial institution, discrete data record 142A of consolidated data records 142 may include a customer identifier 146 of the particular customer (e.g., an alphanumeric character string "CUSTID"), a temporal identifier 148 of the corresponding temporal interval (e.g., a numerical string "2021-11-30"), and consolidated data elements 150 of customer profile, account, delinquency, credit-bureau, and/or transaction data that characterize the particular customer during the corresponding temporal interval (e.g., as consolidated from the data records of profile data 104A, account data 104B, delinquency data 104C, credit-bureau data 108A, and/or transaction data 114 ingested by FI computing system 130 on Nov. 30, 2021).

In some instances, consolidated data elements 150 include also aggregated values of customer profile, account, delinquency, credit-bureau, and/or transaction parameters that characterize a behavior of the particular customer during the temporal interval extending from Nov. 1, 2021, to Nov. 30, 2021. For example, executed pre-processing engine 140 may process the data records of account data 104B (e.g., as maintained within ingested customer data 138) to compute aggregate values of account parameters that include, but are not limited to, an average balance of one or more accounts held by the particular customer, a total number of withdrawals of funds from, or deposits of funds into, one or more of the accounts held the particular customer, or a total value of the funds withdrawn from, or deposited into, the one or more of the accounts during the month-long interval. Additionally, in some examples, executed pre-processing engine 140 may process the data records of transaction data 114 (e.g., as maintained within ingested customer data 138) to compute aggregate values of transaction parameters that include, but are not limited to, an aggregate value of transactions initiated, cleared and settled during month-long interval, an average daily value of the initiated, cleared and settled transactions, or an aggregate or average daily value of those initiated, cleared, and settled transactions that involve a particular payment instrument, or a particular counterparty. The disclosed embodiments are, however, not limited to these exemplary aggregate values of account or transaction parameters, and in other examples, executed pre-processing engine 140 may compute any additional or alternate aggregated values of account or transaction parameters the characterize the behavior of particular customer.

Further, in some instances, consolidated data store 144 may maintain each of consolidated data records 142, which characterize corresponding ones of the customers, their interactions with the financial institution and with other financial institutions, and any associated default events during the temporal interval, in conjunction with additional consolidated data records 152. Executed pre-processing engine 140 may perform any of the exemplary processes described herein to generate each of the additional consolidated data records 152, including based on elements of profile, account, delinquency, credit-bureau, and/or transaction data ingested from source systems 102 or transaction system 110 during the corresponding prior temporal intervals.

Each of additional consolidated data records 152 may also include a plurality of discrete data records that are associated with and characterize a particular one of the customers of the financial institution during a corresponding one of the prior temporal intervals. For example, as illustrated in FIG. 1A, additional consolidated data records 152 may include one or more discrete data records, such as discrete data record 154, associated with a prior temporal interval extending from Sep. 1, 2021, to Sep. 30, 2021. For the particular customer, discrete data record 154 may include a customer identifier 156 of the particular customer (e.g., an alphanumeric character string "CUSTID"), a temporal identifier 158 of the prior temporal interval (e.g., a numerical string "2021-10-31"), consolidated elements 160 of customer profile, account, delinquency, credit-bureau, and/or transaction data that characterize the particular customer during the prior temporal interval extending from Oct. 1, 2021, to Oct. 31, 2021 (e.g., as consolidated from the data records ingested by FI computing system 130 on Oct. 31, 2021). In some instances, consolidated data elements 160 may also elements of aggregated values of customer profile, account, delinquency, credit-bureau, and/or transaction parameters that characterize a behavior of the particular customer during the prior temporal interval, such as, but not limited to, the exemplary aggregated values described herein.

The disclosed embodiments are, however, not limited to the exemplary consolidated data records described herein, or to the exemplary temporal intervals described herein. In other examples, FI computing system 130 may generate, and the consolidated data store 144 may maintain any additional or alternate number of discrete sets of consolidated data records, having any additional or alternate composition, that would be appropriate to the elements of customer profile, account, delinquency, credit-bureau, and/or transaction data ingested by FI computing system 130 at the predetermined intervals described herein. Further, in some examples, FI computing system 130 may ingest elements of customer profile, account, delinquency, credit-bureau, and/or transaction data from source systems 102 or transaction system 110 at any additional, or alternate, fixed or variable temporal interval that would be appropriate to the ingested data or to the training of the machine learning or artificial intelligence processes described herein, including a continuous, real-time ingestion of the elements of customer profile, account, delinquency, or credit-bureau data.

In some instances, FI computing system 130 may perform operations that train adaptively a machine-learning or artificial-intelligence process to predict a likelihood of an occurrence of a default event involving one or more customers of the financial institution during a future temporal interval using training datasets associated with a first prior temporal interval (e.g., a "training" interval), and using validation datasets associated with a second, and distinct, prior temporal interval (e.g., an out-of-time "validation" interval). As described herein, and for a particular customer the financial institution that holds a credit card account, a default event may occur when the credit card account is associated with a past due balance (e.g., that accrues due to scheduled payments missed, or delayed, by the particular customer), and when the past-due balance is associated with a corresponding past-due interval (e.g., as defined by the number of scheduled payments missed, or delayed, by the customer) that exceeds a predetermined threshold time period (e.g., ninety days, etc.). An occurrence of a default event may also be associated with an inability of the financial institution to recover all, or at least a portion of, an outstanding balance associated with the credit-card account (e.g., based on a determination of the financial institution to "charge off" or write down the past-due balance on the credit-card account, and to cease collection efforts involving the past due balance). For instance, the decision by the financial institution to "charge off" or write down the past-due balance on the credit-card account may be triggered by the particular customer's declaration of, or association with, a personal or business bankruptcy.

Further, and as described herein, the machine-learning or artificial-intelligence process may include an ensemble or decision-tree process, such as a gradient-boosted decision-tree process (e.g., the XGBoost process), and the training and validation datasets may include, but are not limited to, values of adaptively selected features obtained, extracted, or derived from the consolidated data records maintained within consolidated data store 144, e.g., from data elements maintained within the discrete data records of consolidated data records 142 or the additional consolidated data records 152. By way of example, the values of adaptively selected features of the training and validation datasets may be obtained, extracted, or derived from the consolidated elements of customer profile data, account data, delinquency data, credit-bureau data, and in some instances, transaction maintained within the consolidated data records of consolidated data store 144. The adaptive selected feature values may also include one, or more, of the elements of aggregated customer profile, account, delinquency, credit-bureau, or transaction data that characterize the customers of the financial institution during respective ones of the training and validation intervals.

For example, the distributed computing components of FI computing system 130 (e.g., that include one or more GPUs or TPUs configured to operate as a discrete computing cluster) may perform any of the exemplary processes described herein to train the machine learning or artificial intelligence process (e.g., the gradient-boosted, decision-tree process) in parallel through an implementation of one or more parallelized, fault-tolerant distributed computing and analytical processes. Based on an outcome of these training processes, FI computing system 130 may generate process coefficients, parameters, thresholds, and other data that collectively specify the trained machine learning or artificial intelligence process, and may store the generated process coefficients, parameters, thresholds, and other data within a portion of the one or more tangible, non-transitory memories, e.g., within consolidated data store 144.

For example, and with reference to FIG. 1B, a training engine 162 executed by the one or more processors of FI computing system 130 may access the consolidated data records maintained within consolidated data store 144, such as, but not limited to, the discrete data records of consolidated data records 142 or additional consolidated data records 152. As described herein, each of the consolidated data records, such as discrete data record 142A of consolidated data records 142 or discrete data record 154 of additional consolidated data records 152, may include a customer identifier of a corresponding one of the customers of the financial institution (e.g., customer identifiers 146 and 156 of FIG. 1A) and a temporal identifier that associates the consolidated data record with a corresponding temporal interval (e.g., temporal identifiers 148 and 158 of FIG. 1A). Each of the accessed consolidated data records may also include consolidated elements of customer profile, account, delinquency, credit-bureau, and/or transaction data that characterize the corresponding one of the customers during the corresponding temporal interval (e.g., consolidated data elements 150 and 160 of FIG. 1A), and aggregated values of customer profile, account, delinquency, credit-bureau, and/or transaction parameters that characterize the corresponding one of the customers during the corresponding temporal interval (e.g., aggregated data elements 151 and 161 of FIG. 1A).

In some instances, executed training engine 162 may parse the accessed consolidated data records, and based on corresponding ones of the temporal identifiers, determine that the consolidated elements of customer profile, account, delinquency, credit-bureau data, and/or transaction data characterize the corresponding customers across a range of prior temporal intervals. Further, executed training engine 162 may also perform operations that decompose the determined range of prior temporal intervals into a corresponding first subset of the prior temporal intervals (e.g., the "training" interval described herein) and into a corresponding second, subsequent, and disjoint subset of the prior temporal intervals (e.g., the "validation" interval described herein). For example, as illustrated in FIG. 1C, the range of prior temporal intervals (e.g., shown generally as $\Delta t$ along time-line 163 of FIG. 1C) may be bounded by, and established by, temporal boundaries $t_i$ and $t_f$. Further, the decomposed first subset of the prior temporal intervals (e.g., shown generally as training interval $\Delta t_{training}$ along timeline 163 of FIG. 1C) may be bounded by temporal boundary $t_i$ and a corresponding splitting point $t_{split}$, and the decomposed second subset of the prior temporal intervals (e.g., shown generally as validation interval $\Delta t_{validation}$ along timeline 163 of FIG. 1C) may be bounded by splitting point $t_{split}$ and temporal boundary $t_f$.

Referring back to FIG. 1B, executed training engine 162 may generate elements of splitting data 164 that identify and characterize the determined temporal boundaries of the consolidated data records maintained within consolidated data store 144 (e.g., temporal boundaries $t_i$ and $t_f$) and the range of prior temporal intervals established by the determined temporal boundaries Further, the elements of splitting data 164 may also identify and characterize the splitting point (e.g., the splitting point $t_{split}$ described herein), the first subset of the prior temporal intervals (e.g., the training interval $\Delta t_{training}$ and corresponding boundaries described herein), and the second, and subsequent subset of the prior temporal intervals (e.g., the validation interval $\Delta t_{validation}$ and corresponding boundaries described herein). As illustrated in FIG. 1B, executed training engine 162 may store the elements of splitting data 164 within the one or more tangible, non-transitory memories of FI computing system 130, e.g., within consolidated data store 144.

In some instances, each of the prior temporal intervals may correspond to a one-month interval, and executed training engine 162 may perform operations that establish adaptively the splitting point between the corresponding temporal boundaries such that a predetermined first percentage of the consolidated data records are associated with temporal intervals (e.g., as specified by corresponding ones of the temporal identifiers) disposed within the training interval, and such that a predetermined second percentage of the consolidated data records are associated with temporal intervals (e.g., as specified by corresponding ones of the temporal identifiers) disposed within the validation interval. For example, the first predetermined percentage may correspond to seventy percent of the consolidated data records, and the second predetermined percentage may corresponding to thirty percent of the consolidated data records, although in other examples, executed training engine 162 may compute one or both of the first and second predetermined percentages, and establish the decomposition point, based on the range of prior temporal intervals, a quantity or quality of the consolidated data records maintained within consolidated data store 144, or a magnitude of the temporal intervals (e.g., one-month intervals, two-week intervals, one-week intervals, one-day intervals, etc.).

In some examples, a training input module 166 of executed training engine 162 may perform operations that access the consolidated data records maintained within consolidated data store 144. Based on portions of splitting data 164, executed training input module 166 may perform operations that parse the consolidated data records and determine: (i) a first subset 168A of these consolidated data records that are associated with the training interval $\Delta t_{training}$ and may be appropriate to training adaptively the gradient-boosted, decision-tree process during the training interval; and a (ii) second subset 168B of these consolidated data records are associated with the validation interval $\Delta t_{validation}$ and may be appropriate to validating the trained, gradient-boosted, decision-tree process during the validation interval.

As described herein, FI computing system 130 may perform operations that adaptively train a machine-learning or artificial-intelligence process (e.g., the gradient-boosted, decision-tree process described herein) to predict, during a current temporal interval, a likelihood of an occurrence of a default event involving a customer during a future temporal interval using training datasets associated with the training interval, and using validation datasets associated with the validation interval. For example, and as illustrated in FIG. 1D, the current temporal interval may be characterized by a temporal prediction point $t_{pred}$ along timeline 163, and the executed training engine 162 may perform any of the exemplary processes described herein to train machine-learning or artificial-intelligence process (e.g., the gradient-boosted, decision-tree process described herein) to predict the likelihood of occurrences of default events during a future, target temporal interval $\Delta t_{target}$ based on input datasets associated with a corresponding prior extraction interval $\Delta t_{extract}$. The target temporal interval $\Delta t_{target}$ may be characterized by a predetermined duration, such as, but not limited to, twelve months, and the prior extraction interval $\Delta t_{extract}$ may be characterized by a corresponding, predetermined duration, such as, but not limited to, one month, three months, or six months.

Referring back to FIG. 1B, executed training input module 166 may perform operations that access the consolidated data records maintained within consolidated data store 144 (e.g., consolidated data records 142, 152), and parse each of the consolidated data records to obtain a corresponding customer identifier (e.g., which associates with the consolidated data record with a corresponding one of the customers of the financial institution) and a corresponding temporal identifier (e.g., which associated the consolidated data record with a corresponding temporal interval). For example, and based on the obtained customer and temporal identifiers, executed training input module 166 may generate sets of segmented data records associated with corresponding ones of the customer identifiers (e.g., customer-specific sets of segmented data records), and within each set of segmented data records, executed training input module 166 may order the consolidated data records sequentially in accordance with the obtained temporal interval. Through these exemplary processes, executed training input module 166 may generate sets of customer-specific, sequentially ordered data records (e.g., data tables), which executed training input module 166 may maintain locally within the consolidated data store 144 (not illustrated in FIG. 1B).

Executed training input module 166 may also perform operations that augment the sequentially ordered data records within each of the customer-specific sets to include additional information characterizing a ground truth associated with the corresponding customer and temporal interval (as established by the corresponding pair of customer and temporal identifiers). For example, and for a particular one of the sequentially ordered data records, such as discrete data record 142A of consolidated data records 142, executed training input module 166 may obtain customer identifier 146 (e.g., "CUSTID"), which identifies the corresponding customer, and temporal identifier 148, which indicates data record 142A is associated with Nov. 30, 2021. Based on customer identifier 146 and temporal identifier 148, executed training input module 166 may access delinquency data 104C (e.g., as maintained within aggregated data store 132 of FIG. 1A), and determine whether the corresponding customer experienced a default event involving a corresponding credit-card account within the target interval $\Delta t_{target}$. For example, executed training input module 166 may determine that Nov. 31, 2021, as identified by the temporal identifier 148, falls on or within the target interval $\Delta t_{target}$, that the delinquency data 140C identifies a default of the customer, and as such the corresponding customer experienced a default event within the target interval $\Delta t_{target}$. Executed training input module 166 may perform operations that modify data record 142A by appending an element of ground-truth data indicative of the presence or absence of the default event within the target interval $\Delta t_{target}$ to consolidated data elements 150. Executed training input module 166 may also perform any of the exemplary processes described herein to generate and append an appropriate element of ground-truth data to each additional, or alternate, one of the sequentially ordered data records within each of the customer-specific sets maintained within consolidated data store 144.

Executed training input module 166 may also perform operations that partition the customer-specific sets of sequentially ordered data records into subsets suitable for training the gradient-boosted, decision-tree process (e.g., which may be maintained in first subset 168A of consolidated data records within consolidated data store 144) and for validating the trained, gradient-boosted, decision-tree process (e.g., which may be maintained in second subset 168B of consolidated data records within consolidated data store 144). By way of example, executed training input module 166 may access splitting data 164, and establish the temporal boundaries for the training interval $\Delta t_{training}$ (e.g., temporal boundary $t_i$ and splitting point $t_{split}$) and the validation interval $\Delta t_{training}$ (e.g., splitting point $t_{split}$ and temporal boundary $t_f$). Further, executed training input module 166 may also parse each of the sequentially ordered data records of the customer-specific sets, access the corresponding temporal identifier, and determine the temporal interval associated with the each of sequentially ordered data records.

If, for example, executed training input module 166 were to determine that the temporal interval associated with a corresponding one of the sequentially ordered data records is disposed within the temporal boundaries for the training interval $\Delta t_{training}$, executed training input module 166 may determine that the corresponding data record may be suitable for training, and may perform operations that include the corresponding data record within a portion of the first subset 168A (e.g., that store the corresponding data record within a portion of consolidated data store 144 associated with first subset 168A). Alternatively, if executed training input module 166 were to determine that the temporal interval associated with a corresponding one of the sequentially ordered data records is disposed within the temporal boundaries for the validation interval $\Delta t_{validation}$, executed training input module 166 may determine that the corresponding data record may be suitable for validation, and may perform operations that include the corresponding data record within a portion of the second subset 168B (e.g., that store the corresponding data record within a portion of consolidated data store 144 associated with second subset 168B). Executed training input module 166 may perform any of the exemplary processes described herein to determine the suitability of each additional, or alternate, one of the sequentially ordered data records of the customer-specific sets for training, or alternatively, validation, of the gradient-boosted, decision-tree process.

In some instances, executed training input module 166 may also perform operations that filter the consolidated data records of first subset 168A and second subset 168B in accordance with one or more filtration criteria. By way of example, the one or more filtration criteria may cause executed training input module 166 to perform operations that exclude, from first subset 168A and second subset 168B, a consolidated data record of any customer associated with an occurrence of a default event involving a credit-card account during, or prior to, the temporal interval associated with the corresponding temporal identifier (e.g., a credit card account associated with a past-due balance having a corresponding past-due interval that exceeds a predetermined threshold time period, ninety days, or a past-due balance charged-off or written down by the financial institution). The one or more filtration criteria may also cause executed training input module 166 to perform operations that exclude, from first subset 168A and second subset 168B, a consolidated data record of any customer holding a credit-card account issued by the financial institution within a predetermined prior temporal interval (e.g., three months, etc.), a credit card account subject to prior fraudulent activity, or a credit card account revoked by the financial institution. Further, the one or more filtration criteria may cause executed training input module 166 to perform operations that exclude, from first subset 168A and second subset 168B, a consolidated data record of any customer associated with a personal or business bankruptcy, or any deceased customer. The disclosed embodiments are not limited to these exemplary filtration criteria, and in other instances, executed training input module 166 may also perform operations that filter the consolidated data records of first subset 168A and second subset 168B in accordance with any additional, or alternate, filtration criteria appropriate to the consolidated or aggregated elements of customer profile, account, delinquency, credit-bureau, and/or transaction data.

Referring back to FIG. 1B, executed training input module 166 may perform operations that generate a plurality of training datasets 170 based on elements of data obtained, extracted, or derived from all or a selected portion of first subset 168A of the consolidated data records. In some instances, the plurality of training datasets 170 may, when provisioned to an input layer of the gradient-boosted decision-tree process described herein, enable executed training engine 162 to train the gradient-boosted decision-tree process to predict, during a current temporal interval, a likelihood of occurrences of default events involving customers of the financial institution during a future temporal interval.

By way of example, each of the plurality of training datasets 170 may be associated with a corresponding one of the customers of the financial institution and a corresponding temporal interval, and may include, among other things a customer identifier associated with that corresponding customer and a temporal identifier representative of the corresponding temporal interval, as described herein. Each of the plurality of training datasets 170 may also include elements of data (e.g., feature values) that characterize the corresponding one of the customers, the corresponding customer's interaction with the financial institution or with another financial institution, and/or an occurrence (or lack thereof) of default events involving the corresponding customer during a temporal interval disposed prior to the corresponding temporal interval, e.g., the extraction interval $\Delta t_{extract}$ described herein.

For instance, plurality of training datasets 170 may include a value of one or more numerical input features, and examples of the numerical input features include, but are not limited to, a customer age, an outstanding balance associated with a credit products, such as the credit-card account described herein, a past-due balance or a past-due interval associated with the credit-card account, a time-averaged value of transactions involving the credit-card account, or a time-average value of deposits into a corresponding deposit account. Additionally, in some instances, the plurality of training datasets 170 may include a value one or more categorical input features, and examples of the categorical input features include, but are not limited to, a customer type (e.g., personal banking, small business banking), a type of credit-card account held by a customer (e.g., a secured credit-card account, a rewards-based credit card account), or a type of demand account held by the customer (e.g., high-yield checking, etc.). Further, and as described herein, each of training datasets 170 may also include an element of ground-truth data indicative of the presence or absence of a default event associated with a corresponding one of the customers within a temporal period, such as a twelve-month period, subsequent to the corresponding temporal interval (e.g., as specified by the corresponding temporal identifier).

In some instances, executed training input module 166 may perform operations that identify, and obtain or extract, one or more of the features values from the consolidated data records maintained within first subset 168A and associated with the corresponding one of the customers. The obtained or extracted feature values may, for example, include elements of the customer profile, account, delinquency, credit-bureau, or transaction data described herein (e.g., which may populate the consolidated data records maintained within first subset 168A). The disclosed embodiments are, however, not limited to these examples of obtained or extracted feature values, and in other instances, training datasets 170 may include any additional or alternate element of data extracted or obtained from the consolidated data records of first subset 168A, associated with corresponding one of the customers, and associated with the extraction interval $\Delta t_{extract}$ described herein.

Further, in some instances, executed training input module 166 may perform operations that compute, determine, or derive one or more of the features values based on elements of data extracted or obtained from the consolidated data records maintained within first subset 168A. Examples of these computed, determined, or derived feature values may include, but are not limited to, time-average values of payments associated with one or more financial products or payment instruments held by corresponding ones of the customer, time-average balances associated with these financial products, sums of balances associated with various financial products or payment instruments held by corresponding ones of the customers, total amounts of credit available to corresponding ones of the customers, and/or total numbers of past-due balances or delinquencies associated with corresponding ones of the customers. These disclosed embodiments are, however, not limited to these examples of computed, determined, or derived feature values, and in other instances, training datasets 170 may include any additional or alternate featured computed, determine, or derived from data extracted or obtained from the consolidated data records of first subset 168A, associated with corresponding one of the customers, and associated with the extraction interval $\Delta t_{extract}$ described herein.

Referring back to FIG. 1B, executed training input module 166 may provide training datasets 170 as an input to an adaptive training and validation module 172 of executed training engine 162. In some instances, and upon execution by the one or more processors of FI computing system 130, adaptive training and validation module 172 may perform operations that establish a plurality of nodes and a plurality of decision trees for the gradient-boosted, decision-tree process, with may ingest and process the elements of training data (e.g., the customer identifiers, the temporal identifiers, the feature values, etc.) maintained within each of the plurality of training datasets 170. Further, and based on the execution of adaptive training and validation module 172, and on the ingestion of each of training datasets 170 by the established nodes of the gradient-boosted, decision-tree process, FI computing system 130 may perform operations that train the gradient-boosted, decision-tree process against the elements of training data included within each of training datasets 170.

In some examples, the distributed components of FI computing system 130 may execute adaptive training and validation module 172, and may perform any of the exemplary processes described herein in parallel to train the gradient-boosted, decision-tree process against the elements of training data included within each of training datasets 170. The parallel implementation of adaptive training and validation module 172 by the distributed components of FI computing system 130 may, in some instances, be based on an implementation, across the distributed components, of one or more of the parallelized, fault-tolerant distributed computing and analytical protocols described herein.

Through the performance of these exemplary training processes, executed adaptive training and validation module 172 may perform operations that compute one or more candidate process parameters that characterize the trained, gradient-boosted, decision-tree process, and package the candidate process parameters into corresponding portions of candidate process data 173A. In some instances, the candidate process parameters included within candidate process data 173A may include, but are not limited to, a learning rate associated with the trained, gradient-boosted, decision-tree process, a number of discrete decision trees included within the trained, gradient-boosted, decision-tree process (e.g., the "n_estimator" for the trained, gradient-boosted, decision-tree process), a tree depth characterizing a depth of each of the discrete decision trees included within the trained, gradient-boosted, decision-tree process, a minimum number of observations in terminal nodes of the decision trees, and/or values of one or more hyperparameters that reduce potential process overfitting (e.g., regularization of pseudo-regularization hyperparameters). Further, and based on the performance of these exemplary training processes, executed adaptive training and validation module 172 may also generate candidate input data 173B, which specifies a candidate composition of an input dataset for the trained, gradient-boosted, decision-tree process (e.g., which be provisioned as inputs to the nodes of the decision trees of the trained, gradient-boosted, decision-tree process).

As illustrated in FIG. 1B, executed adaptive training and validation module 172 may provide candidate process data 173A and candidate input data 173B as inputs to executed training input module 166 of training engine 162, which may perform any of them exemplary processes described herein to generate a plurality of validation datasets 174 having compositions consistent with candidate input data 173B. As described herein, the plurality of validation datasets 174 may, when provisioned to, and ingested by, the nodes of the decision trees of the trained, gradient-boosted, decision-tree process, enable executed training engine 162 to validate the predictive capability and accuracy of the trained, gradient-boosted, decision-tree process, for example, based on elements of ground truth data incorporated within the validation datasets 174, or based on one or more computed metrics, such as, but not limited to, computed precision values, computed recall values, and computed area under curve (AUC) for receiver operating characteristic (ROC) curves or precision-recall (PR) curves.

By way of example, executed training input module 166 may parse candidate input data 173B to obtain the candidate composition of the input dataset, which not only identifies the candidate elements of customer-specific data included within each validation dataset (e.g., the candidate feature values described herein), but also a candidate sequence or position of these elements of customer-specific data within the validation dataset. Examples of these candidate feature values include, but are not limited to, one or more of the feature values extracted, obtained, computed, determined, or derived by executed training input module 166 and packaged into corresponding portions of training datasets 170, as described herein. For instance, the candidate feature values may include one or more of the feature values extracted, obtained, computed, determined, or derived from elements of the customer account, account, or delinquency data described herein, either alone or in conjunction with one or more additional feature values extracted, obtained, computed, determined, or derived from the elements of credit-bureau data described herein.

Further, in some examples, each of the plurality of validation datasets 174 may be associated with a corresponding one of the customers of the financial institution, and with a corresponding temporal interval within the validation interval $\Delta t_{validation}$, and executed training input module 166 may access the consolidated data records maintained within second subset 168B of consolidated data store 144, and may perform operations that extract, from an initial one of the consolidated data records, a customer identifier (which identifies a corresponding one of the customers of the financial institution associated with the initial one of the consolidated data records) and a temporal identifier (which identifies a temporal interval associated with the initial one of the consolidated data records). Executed training input module 166 may package the extracted customer identifier and temporal identifier into portions of a corresponding one of validation datasets 174, e.g., in accordance with candidate input data 173B.

Executed training input module 166 may perform operations that access one or more additional ones of the consolidated data records that are associated with the corresponding one of the customers (e.g., that include the customer identifier) and as associated with a temporal interval (e.g., based on corresponding temporal identifiers) disposed prior to the corresponding temporal interval, e.g., within the extraction interval $\Delta t_{extract}$ described herein. Based on portions of candidate input data 173B, executed training input module 166 may identify, and obtain or extract, one or more of the feature values of the validation datasets from within the additional ones of the consolidated data records within second subset 168B. Further, in some examples, and based on portions of candidate input data 173B, executed training input module 166 may perform operations that compute, determine, or derive one or more of the features values based on elements of data extracted or obtained from further ones of the consolidated data records within second subset 168B. Executed training input module 166 may package each of the obtained, extracted, computed, determined, or derived feature values into corresponding positions within the initial one of validation datasets 174, e.g., in accordance with the candidate sequence or position specified within candidate input data 173B. Additionally, and in some examples, executed training input module 166 may also package, into an appropriate position within a portion of the corresponding one of validation datasets 174, an element of ground-truth data indicative of the presence or absence of a default event associated with the corresponding one of the customers within a temporal period, such as a twelve-month period disposed subsequent to the corresponding temporal interval.

In some instances, executed training input module 166 may perform any of the exemplary processes described herein to generate additional, or alternate, ones of validation datasets 174 based on the elements of data maintained within the consolidated data records of second subset 168B. For example, each of the additional, or alternate, ones of validation datasets 174 may be, associated with a corresponding, and distinct, pair of customer and temporal identifiers, and as such, corresponding customers of the financial institution and corresponding temporal intervals within validation interval $\Delta t_{validation}$. Further, executed training input module 166 may perform any of the exemplary processes described herein to generate an additional, or alternate, ones of validation datasets 174 associated with each unique pair of customer and temporal identifiers maintained within the consolidated data records of second subset 168B, and in other instances a number of discrete validation datasets within validation datasets 174 may be predetermined or specified within candidate input data 173B.

Referring back to FIG. 1B, executed training input module 166 may provide the plurality of validation datasets 174 as inputs to executed adaptive training and validation module 172. In some examples, executed adaptive training and validation module 172 may perform operations that apply the trained, gradient-boosted, decision-tree process to respective ones of validation datasets 174 (e.g., based on the candidate process parameters within candidate process data 173A, as described herein), and that generate elements of validation output data 176 based on the application of the trained, gradient-boosted, decision-tree process to corresponding ones of validation datasets 174.

As described herein, each of the each of elements of validation output data 176 may be generated through the application of the trained, gradient-boosted, decision-tree process to a corresponding one of validation datasets 174, which may include, among other things, a customer identifier (e.g., identifying a corresponding customer of the financial institution), a temporal identifier (e.g., identifying a corresponding temporal interval), and an element of ground-truth data, which indicates whether the corresponding customer is involved in an actual default event during a future temporal interval, e.g., the target interval $\Delta t_{target}$. Further, as described herein, each of elements of validation output data 176 may be representative of a predicted likelihood of an occurrence of a default event involving, or associated with, the corresponding customer during the target interval $\Delta t_{target}$, and in some instances, the predicted likelihood may be represented by a numerical score of either zero (e.g., indicative of a predicted non-occurrence of the default event during the target interval $\Delta t_{target}$) or unity (e.g., indicative of a predicted occurrence of the default event during the target interval $\Delta t_{target}$).

Executed adaptive training and validation module 172 may perform operations that compute a value of one or more metrics that characterize a predictive capability, and an accuracy, of the trained, gradient-boosted, decision-tree process based on the generated elements of validation output data 176 and corresponding ones of validation datasets 174. The computed metrics may include, but are not limited to, one or more recall-based values for the trained, gradient-boosted, decision-tree process (e.g., "recall@5," "recall@10," "recall@20," etc.), and additionally, or alternatively, one or more precision-based values for the trained, gradient-boosted, decision-tree process. Further, in some examples, the computed metrics may include a computed value of an area under curve (AUC) for a precision-recall (PR) curve associated with the trained, gradient-boosted, decision-tree process, and additional, or alternatively, computed value of an AUC for a receiver operating characteristic (ROC) curve associated with the trained, gradient-boosted, decision-tree process. The disclosed embodiments are, however, not limited to these exemplary computed metric values, and in other instances, executed adaptive training and validation module 172 may compute a value of any additional, or alternate, metric appropriate to validation output data 176, validation datasets 174, the elements of ground-truth data, or the trained, gradient-boosted, decision-tree process.

In some examples, executed adaptive training and validation module 172 may also perform operations that determine whether all, or a selected portion, of the computed metric values satisfy one or more threshold conditions for a deployment of the trained, gradient-boosted, decision-tree process and a real-time application to elements of customer profile, account, transaction, delinquency, or credit-bureau data, as described herein. For instance, the one or more threshold conditions may specify one or more predetermined threshold values for the trained, gradient-boosted, decision-tree process, such as, but not limited to, a predetermined threshold value for the computed recall-based values, a predetermined threshold value for the computed precision-based values, and/or a predetermined threshold value for the computed AUC values. In some examples, executed adaptive training and validation module 172 performs operations that establish whether one, or more, of the computed recall-based values, the computed precision-based values, or the computed AUC values exceed, or fall below, a corresponding one of the predetermined threshold values and as such, whether the trained, gradient-boosted, decision-tree process satisfies the one or more threshold requirements for deployment.

If, for example, executed adaptive training and validation module 172 were to establish that one, or more, of the computed metric values fail to satisfy at least one of the threshold requirements, FI computing system 130 may establish that the trained, gradient-boosted, decision-tree process is insufficiently accurate for deployment and a real-time application to the elements of customer profile, account, transaction, delinquency, and/or credit-bureau data described herein. Executed adaptive training and validation module 172 may perform operations (not illustrated in FIG. 1B) that transmit data indicative of the established inaccuracy to executed training input module 166, which may perform any of the exemplary processes described herein to generate one or more additional training datasets and to provision those additional training datasets to executed adaptive training and validation module 172. In some instances, executed adaptive training and validation module 172 may receive the additional training datasets, and may perform any of the exemplary processes described herein to train further the gradient-boosted, decision-tree process against the elements of training data included within each of the additional training datasets.

Alternatively, if executed adaptive training and validation module 172 were to establish that each computed metric value satisfies threshold requirements, FI computing system 130 may deem the gradient-boosted, decision-tree process trained, and ready for deployment and real-time application to the elements of customer profile, account, transaction, delinquency, and/or credit-bureau data described herein. In some instances, executed adaptive training and validation module 172 may generate process parameter data 175A that includes the process parameters of the trained, gradient-boosted, decision-tree process, such as, but not limited to, each of the candidate process parameters specified within candidate process data 173A. Further, executed adaptive training and validation module 172 may also generate process input data 175B, which characterizes a composition of an input dataset for the trained, gradient-boosted, decision-tree process and identifies each of the discrete data elements within the input data set, along with a sequence or position of these elements within the input data set (e.g., as specified within candidate input data 173B). As illustrated in FIG. 1B, executed adaptive training and validation module 172 may perform operations that store process parameter data 175A and process input data 175B within the one or more tangible, non-transitory memories of FI computing system 130, such as consolidated data store 144.

B. Exemplary Techniques for Training Explainability Processes Associated with Trained, Gradient-Boosted Decision-Tree Processes within a Distributed Computing Environment In some examples, one or more of the distributed components of FI computing system 130 may perform operations, described herein, that adaptively train a machine learning or artificial intelligence process to predict, during a current temporal interval, a likelihood of an occurrence of an event, such as one or more of the exemplary default events described herein, during a future temporal interval using training data associated with a first prior temporal interval, and using validation data associated with a second, and distinct, prior temporal interval. As described herein, the machine-learning or artificial-intelligence process may include an ensemble or decision-tree process, such as a gradient-boosted, decision-tree process, and upon completion of the training and validation processes described herein, the one or more distributed components of FI computing system 130 may perform any of the exemplary processes described herein to generate elements of process parameter data that includes the process parameters of the trained, gradient-boosted, decision-tree process, such as, but not limited to, the exemplary process parameters described herein (e.g., process parameter data 175A of FIG. 1B), and to generate elements of process input data that characterizes a structure and a composition of a customer-specific input dataset for the trained, gradient-boosted, decision-tree process (e.g., process input data 175B of FIG. 1B).

The elements of process input data may identify each of the numerical or categorical input features included within the customer-specific input dataset, and along with a sequence or position of a value of each of the numerical or categorical input features within the customer-specific input dataset. FI computing system may perform operations that store the elements of process parameter data and process input data within a data repository, such as consolidated data store 144, in conjunction with all, or a subset of the validation datasets, which may be structured in accordance with the elements of process input data (e.g., validation datasets 174 of FIG. 1B), and corresponding elements of output data generated through the application of the trained, gradient-boosted decision tree process to corresponding ones of the validation datasets (e.g., validation output data 176 of FIG. 1B).

Further, the one or more distributed components of FI computing system 130 may also perform operations, described herein, that train an explainability process against elements of one or more validation datasets associated with the trained, gradient-boosted, decision-tree process, such as, but not limited to, one or more of validation datasets 174B of FIG. 1B. As described herein, each of validation datasets 174B may include values of numerical or categorical input features specified by the elements of process input data 175B, and the explainability process may include, but us not limited to, a Shapley splitter process that leverages Shapley additive explanations to decompose output data generated through an application of the trained gradient-boosted, decision-tree processes to a corresponding input dataset, and to characterize an impact of a value of each of the numerical or categorical input features on the predicted output, e.g., based on a magnitude of a corresponding, input-feature-specific Shapley value.

By way of example, and for a particular input feature, a Shapley value of large magnitude may imply that a value of the particular input feature is associated with a corresponding, large contribution to the predicted output, which may drive an increase a magnitude of that predicted output. Further, for a particular input feature, a Shapley value of small magnitude may imply that a value of the particular input feature is associated with a corresponding, small contribution to the predicted output and to any increase in the magnitude of that predicted output. Further, and in view of these relationships, if a value of the particular input feature were to exceed a determined, threshold feature value, then a Shapley value associated with the particular input feature value would be likely to exceed a corresponding threshold Shapley value, which may indicate that any increase in the value of the particular input feature would also drive an increase in the predicted output of the trained, gradient-boosted decision-tree process (e.g., a value indicative of a predicted likelihood of an occurrence of a default event involving a customer of the financial institution and a corresponding credit-card account during the future temporal interval, as described herein).

The input dataset may, for instance, include values of one or more numerical input features, and the one or more distributed computing components of FI computing system 130 may perform any of the exemplary processes described herein to train the Shapley splitter process against the elements of one or more of validation datasets 174 and generate, for each of the numerical input features (e.g., as specified by the elements of process input data 175), a threshold feature value v* and a threshold Shapley value s*. Further, and as described herein, when a value of a particular numerical input feature v within validation datasets 174 exceeds the corresponding threshold feature value (e.g., v≥v*), the resulting Shapley value s would be likely to exceed the corresponding threshold Shapley value (e.g., s≥s*).

Figure 2A:
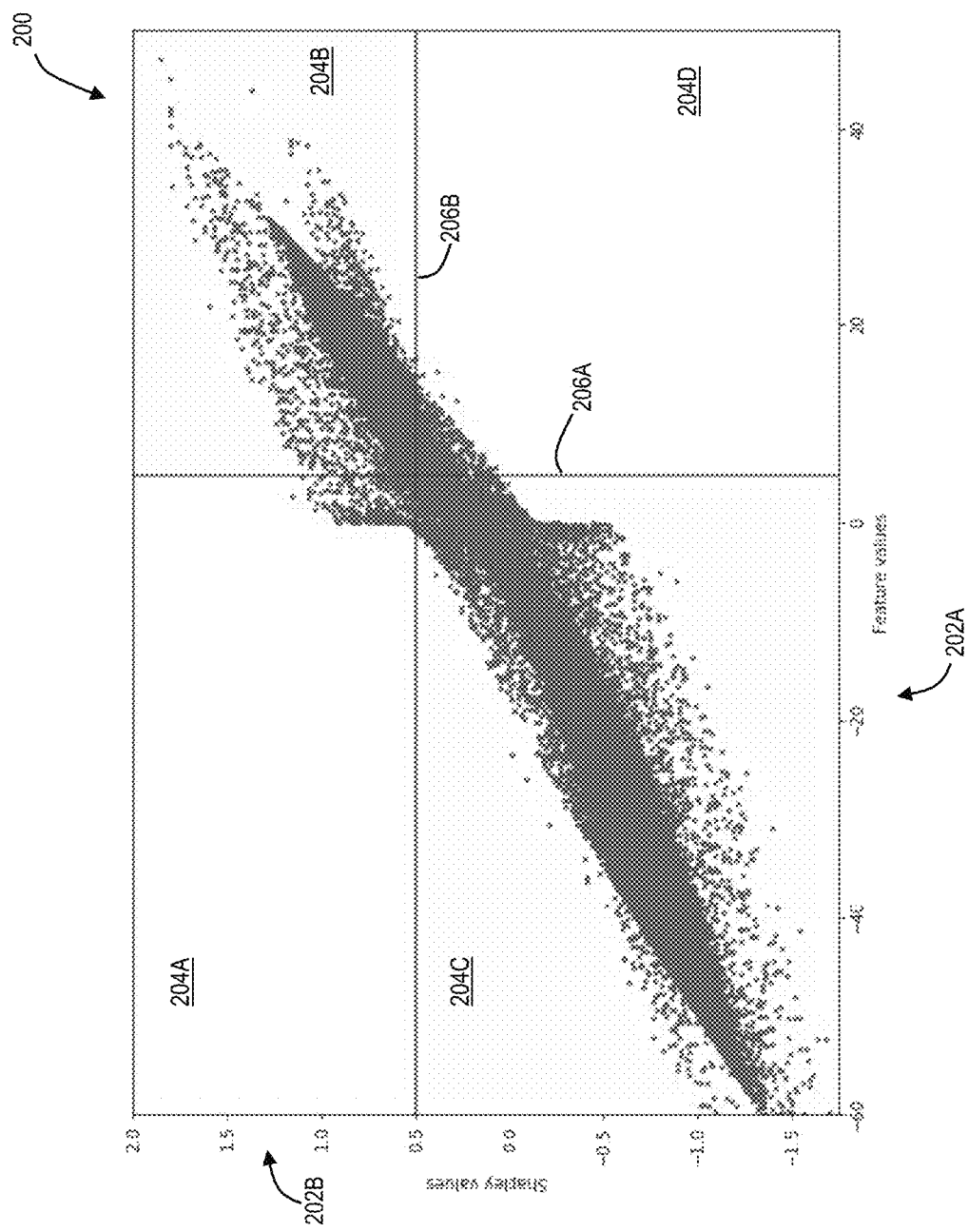
FIG. 2A illustrates an exemplary Shapley scatter plot, in accordance with some exemplary embodiments.

By way of example, and for a particular one of the numerical input feature, the one or more distributed computing components of FI computing system 130 may perform operations that associate each of the feature value of the particular numerical input feature (e.g., as included within a plurality N of validation datasets) with a corresponding Shapley feature value, and generate a corresponding plurality of pairs $x_i$ of associated feature values $v_i$ and Shapley feature values $s_i$ (e.g., $x_i|_{i=1}^{N}\{(v_i,s_i)\}_{i=1}^{N}$). FIG. 2A illustrates an exemplary Shapley scatter plot 200 of the corresponding plurality of pairs $x_i$ of associated feature values $v_i$ and Shapley feature values $s_i$ for the particular numerical input feature. As illustrated in FIG. 2A, Shapley scatter plot 200 identifies values of the particular numerical input feature along axis 202A, and corresponding Shapley values along axis 202B, and each of the discrete points within Shapley scatter plot 200 may corresponding to a discrete one of the pairs $x_i$ of associated feature values $v_i$ and Shapley feature values $s_i$. Further, in some instances, Shapley scatter plot 200 may be decomposed into four discrete regions, shown generally as regions 204A, 204B, 204C, and 204D, by lines 206A and 206B representative, respectively, a threshold value v* and a threshold Shapley feature value s* for the particular numerical input feature.

For example, region 204A may include those validation instances characterized by feature values $v_i$ that fail to exceed the threshold feature value v* and Shapley values $s_i$ that exceed the threshold Shapley value s*, and region 204B may include those validation instances characterized by feature values $v_i$ that exceed the threshold feature value v* and Shapley values $s_i$ that exceed the threshold Shapley value s*. Further, as illustrated in FIG. 2A, region 204C may include those validation instances characterized by feature values $v_i$ that fail to exceed the threshold feature value v* and Shapley values $s_i$ that fail to exceed the threshold Shapley value s*, and region 204D may include those validation instances characterized by feature values $v_i$ that exceed the threshold feature value v* and Shapley values $s_i$ that fail to exceed the threshold Shapley value s*. By way of example, regions 204A, 204B, 204C, and 204D may collectively establish a confusion matrix, with regions 204B and 204D (e.g., including the validation instances characterized by feature values $v_i$ that exceed the threshold feature value v*) corresponding to "predicted positive" sample, and with regions 204A and 204B (e.g., including the validation instances characterized by Shapley values $s_i$ that exceed the threshold Shapley value s) corresponding to "ground-truth" positive samples.

Further, a number of discrete validation instances disposed within respective ones of regions 204A, 204B, and 204D of Shapley scatter plot 200 may facilitate a computation of corresponding ones of a precision value and a recall value for the particular numerical input feature associated with Shapley scatter plot 200. For example, the precision value may be defined as B/B+D, and the recall value may be defined as B/A+B, where A corresponds to the number of discrete validation instances disposed within region 204A of Shapley scatter plot 200, B corresponds to the number of discrete validation instances disposed within region 204B of Shapley scatter plot 200, and D corresponds to the number of discrete validation instances disposed within region 204D of Shapley scatter plot 200. Additionally, an $F_1$ score for the particular numerical input feature associated with Shapley splitter plot 200 may be defined as a harmonic mean of the recall value and the precision value, and may be expressed as 2B/2B+A+D. In some instances, illustrated in FIG. 2B, the one or more distributed components of FI computing system 130 may perform any of the exemplary processes described herein to determine a threshold feature value v* and a threshold Shapley value s* for the particular numerical input feature that minimizes a number of the corresponding validation instances x; that are disposed within regions 204A and 204D the Shapley scatter plot 200, and as such, that maximize a corresponding $F_1$ score for the particular numerical input feature associated with Shapley splitter plot 200.

As described herein, when applied to a customer-specific input dataset that includes a corresponding value of the particular numerical input feature by the one or more distributed components of FI computing system 130, the trained Shapley splitter process may generate elements of textual content that associate a magnitude of the corresponding value with the output data generated through the application of the trained gradient-boosted, decision-tree process to the customer-specific input dataset and as such, with an adverse decision associated with the output data (e.g., that the corresponding numerical feature value is "too high or too low"). Further, and as described herein, the one or more distributed components of FI computing system 130 may also perform any of these exemplary processes to train further the Shapley splitter process against the elements of one or more of validation datasets 174B and generate a corresponding threshold feature value v* and a corresponding threshold Shapley value s* for each additional, or alternate, ones of the numerical input features specified within the elements of process input data 175B.

Figure 2B:
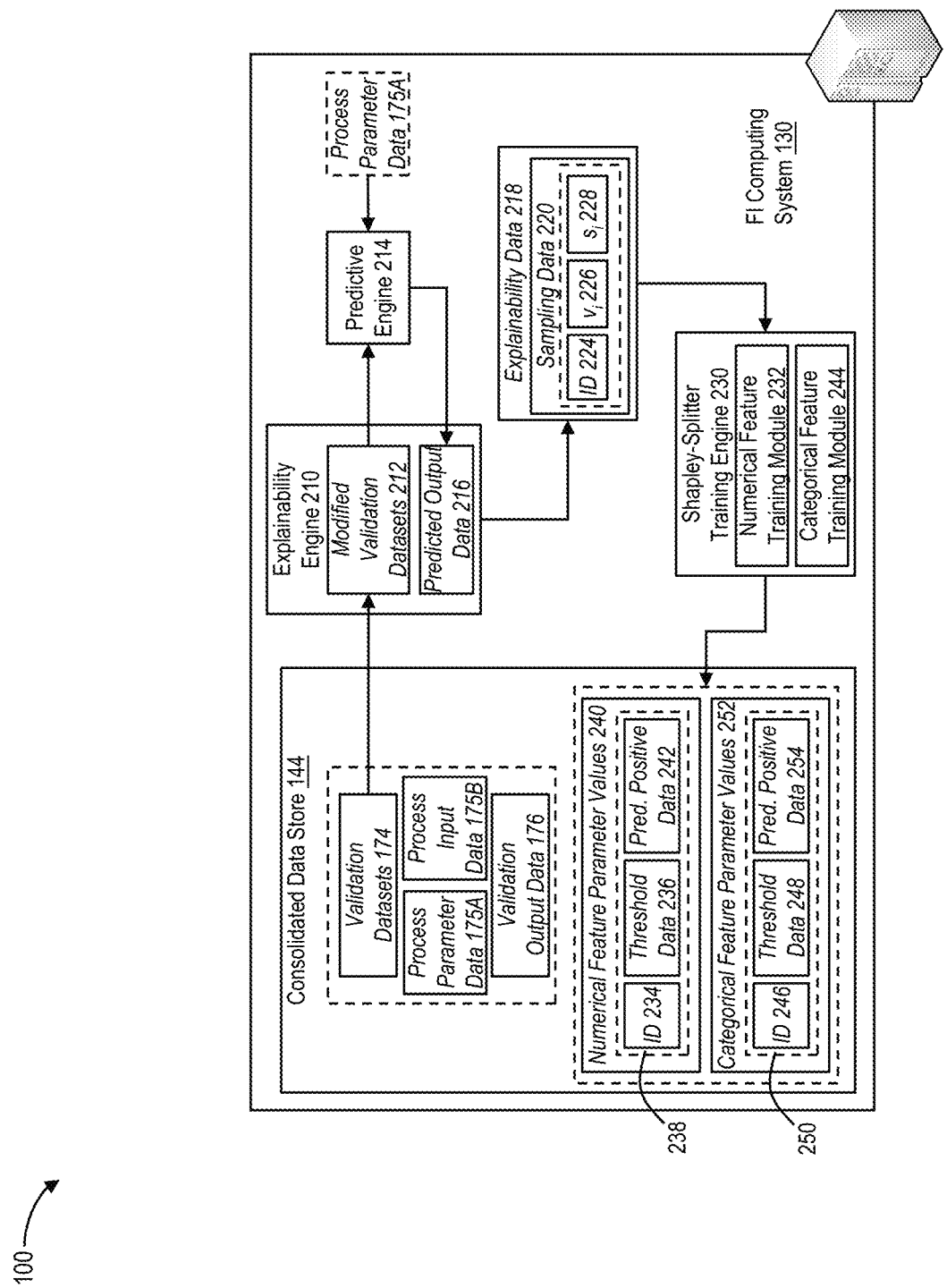
FIGS. 2B, 3A, 3B, and 3C are block diagrams illustrating additional portions of the exemplary computing environment, in accordance with some exemplary embodiments.

The input dataset may also include, among other things, values of one or more categorical input features, and as illustrated in FIG. 2B, the one or more distributed components of FI computing system 130 may also perform any of the exemplary described herein to train the Shapley splitter process against the elements of one or more of validation datasets 174B and to determine a threshold Shapley value s*for each of the categorical input features. When applied to a customer-specific input dataset that includes a corresponding value of a particular categorical input feature by the one or more distributed components of FI computing system 130, the trained Shapley splitter process may generate elements of textual content that associate a category specified by the corresponding value, and a Shapley value that exceeds the corresponding threshold Shapley value s*, with the output data generated through the application of the trained gradient-boosted, decision-tree process to the customer-specific input dataset and as such, with an adverse decision associated with the output data (e.g., that the particular categorical feature value "does or does not belong to a category").

Referring to FIG. 2B, an explainability engine 210 executed by the one or more processors of FI computing system 130 (e.g., by one, or more, distributed components of FI computing system 130, described herein), may perform operations that access validation datasets 174 and corresponding elements of validation output data 176 maintained within consolidated data store 144. As described herein, each of the elements of validation output data 176 may be associated with a corresponding one of validation datasets 174 and may be generated through an application of the trained, gradient-boosted, decision-tree process to the corresponding one of validation datasets 174. Further, each of obtained validation datasets 174 may be structured in accordance with the elements of process input data 175B, and may include values of a plurality of input features identified and specified by the elements of process input data 175B, such as the numerical or categorical input features described herein. In some instances, executed explainability engine 210 may perform any of the exemplary processes described herein to compute, based on validation datasets 174 and the elements of output data 176, a feature value contribution, such as a Shapley feature value contribution, for each of the plurality of input features that characterizes a contribution of the corresponding input feature on the outcome of the trained, gradient-boosted, decision-tree process, such as, but not limited to, the predicted likelihood of an occurrence of a default involving a corresponding customer and a credit-card account during a future temporal interval.

By way of example, executed explainability engine 210 may perform operations that, based on one or more of validation datasets 174, generate a plurality of modified validation datasets 212 associated with corresponding ones of the input features specified within the elements of process input data 175B, and that provision each of modified validation datasets 212 as an input to a predictive engine 214 executed by the one or more processors of FI computing system 130 (e.g., based on a programmatic signal generated by executed explainability engine 210, etc.). For instance, and for a numerical input feature identified within process input data 175B, executed explainability engine 210 may determine a range of the corresponding input feature values included within validation datasets 174, and may perform operations that discretize the determined range into discrete intervals (e.g., consistent with a predetermined number of interpolation points, etc.) and that compute, for each of the discrete intervals, a discretized feature value. By way of example, the discretized feature values may vary linearly across the discretized intervals of the feature range, or in accordance with any additional, or alternate non-linear or linear function.

Executed explainability engine 210 may perform operations that package the discretized feature values into a corresponding set of discretized feature values for the numerical input feature, and that generate, for the numerical input feature, a subset of modified validation datasets 212 based on a perturbation of one, or more, of validation datasets 174 based on the corresponding set of discretized feature values. By way of example, and for corresponding one of validation datasets 174 and the numerical input feature, executed explainability engine 210 may perform any of the exemplary processes described herein to identify, within the corresponding one of validation datasets 174, the input feature value associated with the numerical input feature, and to generate corresponding ones of modified validation datasets 212 by replacing that feature value with a corresponding one of the discretized feature values for the numerical input feature.

Further, in some instances, and for a categorical input feature identified within process input data 175B, executed explainability engine 210 may identify each of the discrete feature values (e.g., distinct categories) associated with the categorical input feature, and may perform operations that generate, for the categorical input feature, a subset of modified validation datasets 212 based on the corresponding ones of the discrete feature values. By way of example, and for corresponding one of validation datasets 174 and the categorical input feature, executed explainability engine 210 may perform any of the exemplary processes described herein to identify, within the corresponding one of validation datasets 174, the input feature value associated with the categorical input feature, and to generate corresponding ones of modified validation datasets 212 by replacing that feature value with a corresponding one of the discretized feature values for the categorical input feature (the distinct categories, including, in some instances, a null value). The disclosed embodiments are, however, not limited to these exemplary processes, and in other instances, executed explainability engine 210 generate subsets of modified validation datasets 212 for corresponding ones of the numerical or categorical features using any additional, or alternate, process appropriate to the categorical or numerical features or to the feature values maintained within validation datasets.

Executed explainability engine 210 may also perform one or more of the exemplary processes described herein to generate a corresponding subset of modified validation datasets 212 for each additional, or alternate, one of the numerical or categorical features specified by the elements of process input data 175B, and executed explainability engine 210 may provision each of modified validation datasets 212 as input to executed predictive engine 214. In some instances, illustrated in FIG. 2B, executed predictive engine 214 may perform operations that obtain, from consolidated data store 144, process parameter data 175A that includes one or more process parameters of the trained, gradient-boosted, decision-tree process, and based on portions of process parameter data 175A, executed predictive engine 214 may perform operations that establish a plurality of nodes and a plurality of decision trees for the trained, gradient-boosted, decision-tree process, each of which receive, as inputs (e.g., "ingest"), corresponding elements of modified validation datasets 212. Based on the execution of predictive engine 214, and based on the ingestion of modified validation datasets 212 by the established nodes and decision trees of the trained, gradient-boosted, decision-tree process, FI computing system 130 may perform operations that apply the trained, gradient-boosted, decision-tree process to each of modified validation datasets 212, and that generate an element of predicted output data 216 associated with a corresponding one of modified validation datasets 212.

Based on elements of predicted output data 216, executed explainability engine 210 may perform any of the exemplary processes described herein to generate one or more elements of explainability data 218 that characterize, among other things, a marginal effect of a perturbation in a value of each of the input features specified within process input data 175B on an outcome of the trained, gradient-boosted, decision-tree process, and a contribution of each of the input features (e.g., the numerical or categorical features described herein) to the predicted output data generated by an application of the trained, gradient-boosted, decision-tree process to customer-specific input datasets (e.g., the predicted likelihood that the corresponding one of the customers will be involved in a default event associated with a credit-card account during the future temporal interval, etc.). By way of example, and as described herein, executed explainability engine 210 may compute a Shapley value feature for each of the input features based on the elements of validation output data 176, the elements of predicted output data 216, and additionally, or alternatively, corresponding ones of modified validation datasets 212. In some instances, executed explainability engine 210 may calculate the Shapley feature values in accordance with a Shapley Additive exPlanations (SHAP) algorithm (e.g., when the selected machine learning or artificial intelligence process corresponds to a gradient-boosted decision tree algorithm), or in accordance with an integrated gradient algorithm (e.g., when the selected machine learning or artificial intelligence process corresponds to a deep neural-network models).

Executed explainability engine 210 may perform operations that package each of the Shapley value features into a corresponding portion of explainability data 218, wither alone or in conjunction with corresponding feature values maintained within validation datasets 174. In some instances, executed explainability engine 210 may perform operations that extract, from one or more of validation datasets 174, values of each of the input features, and may generate a plurality of elements of sampling data 220, each of which includes a training sample that associate a corresponding one of the extracted values of the input features, with a corresponding feature identifier (e.g., as obtained from the elements of process input data 175B) and with a corresponding one of the computed Shapley feature values. By way of example, the training sample included within element 222A may include a feature identifier 224 of a numerical or categorical feature specified within elements of process input data 175B (e.g., an alphanumeric character string associated with, or assigned by, FI computing system 130, etc.), a corresponding value 226 of a numerical or categorical feature (e.g., feature value $v_i$), and a corresponding Shapley feature value 228 associated with that numerical or categorical feature (e.g., Shapley feature value $s_i$). In some instances, executed explainability engine 210 may provide explainability data 218, including the discrete elements of sampling data 220 as an input to a training engine 230 that, upon execution by one or more processors of FI computing system 130, train a Shapley-splitter process against the training samples maintained within the elements of sampling data 220 to generate, for each of the input features (e.g., as specified by the elements of process input data 175B), a threshold feature value v* (or a threshold category c*) and a threshold Shapley value s*.

As described herein, the threshold feature value v* associated with a numerical feature may include a numerical value, and the threshold feature value v* associated with a categorical feature may include an alphanumeric character string identifying a corresponding category. Further, when applied to a customer-specific input dataset (e.g., that includes values of the input features specified within process input data 175B), the trained Shapley splitter process may leverage a relationship between the feature values of customer-specific input dataset and the corresponding Shapley feature values, which characterizes a contribution of the at least one feature value to the predicted output of the trained gradient-boosted, decision-tree process, and generate elements of textual content that characterize an association between the one or more of the feature values and the predicted output (e.g., a feature value is "too high or too low," or a feature value "does or does not belong to a category," etc.).

Referring back to FIG. 2B, training engine 230 may receive explainability data 218, including the elements of sampling data 220, from executed explainability engine 210, and a numerical-feature training module 232 of executed training engine 230 parse the feature identifiers maintained within the elements of sampling data 220 to obtain a plurality of the training samples associated with each, or a targeted subset of, the numerical input features specified by the elements of process input data 175B. In some instances, executed numerical-feature training module 232 may perform operations that sort obtained training samples into feature-specific subsets associated with corresponding ones of the numerical input features, and further, that sort the training samples within each of the feature-specific subsets in accordance with the Shapley feature values (e.g., in descending order based on the corresponding Shapley feature values, etc.). In some instances, executed numerical-feature training module 232 may select one of the numerical input feature for training (e.g., numerical feature f associated with a corresponding feature identifier $f_{ID}$) and may obtain the sorted training samples maintained within the feature-specific subset associated with the selected numerical input feature (e.g., a plurality of N training samples $\{(f_{ID}, v_i, s_i)\}_{i=1}^N$, where $v_i$ corresponds to the feature value of the selected numerical input feature within the $i^{th}$ training sample, and $s_i$ corresponds to the Shapley feature value of the selected numerical input feature within the $i^{th}$ training sample).

By way of example, the numerical feature values $v_i$ and associated Shapley feature values $s_i$ maintained with the sorted training samples may establish a corresponding Shapley scatter plot associated selected numerical input feature, such as Shapley scatter plot 200 of FIG. 2A, and each of the N pairs of the numerical feature values $v_i$ and associated Shapley feature values $s_i$ may represent a corresponding "point" within the Shapley scatter plot. In some instances, in training the Shapley splitter process, executed numerical-feature training module 232 may perform operations that determine the threshold feature value v* and the threshold Shapley value s* for the selected numerical input feature that maximize the values of precision and recall for the selected numerical input feature and as such, that maximize the $F_1$ score associated with the selected numerical feature. By way of example, and through an implementation of one or more of the exemplary training processes described herein, executed numerical-feature training module 232 the threshold feature value v* and the threshold Shapley value s* for the selected numerical input feature in accordance with:

$$(v^*, s^*) = \underset{(v,s) \in R^2}{\mathrm{argmax}} \frac{2B(v, s)}{2B(v, s) + A(v, s) + D(v, s)},$$

where: A(v,s) corresponds to a number of the sorted training samples having a numerical feature value $v_i$ that fails to exceed the threshold feature value v* and a Shapley feature value $s_i$ that exceeds the threshold Shapley value s*; B(v,s) corresponds to a number of the sorted training samples having a numerical feature value $v_i$ that exceeds the threshold feature value v* and a Shapley feature value $s_i$ that exceeds the threshold Shapley value s*; and D(v,s) corresponds to a number of the sorted training samples having a numerical feature values $v_i$ that exceed the threshold feature value v* and a Shapley feature value $s_i$ that fails exceeds the threshold Shapley value s*.

By way of example, executed numerical-feature training module 232 may perform operations that assign each the Shapley feature values $s_i$ maintained within the sorted training samples to a corresponding one of a predetermined number $n_{bin}$ of Shapley-value bins (e.g., that "bin" the Shapley feature values into the predetermined number of Shapley-value bins), and based on the binned Shapley feature values, determine a plurality of candidate Shapley threshold values for the selected numerical input feature (e.g., $s^{(j)}$, where j=1, . . . , $n_{bin}$). In some instances, the Shapley feature values $s_i$ maintained within the sorted, training samples of the feature-specific subset associated with the selected numerical input feature may include, and may be bounded by, a maximum Shapley feature value $s_{MAX}$. Executed numerical-feature training module 232 may also establish a predetermined, minimum value $s_{min}$ for the threshold Shapley value s*(e.g., such that s*≥$s_{min}$), and may establish a predetermined, maximum percentage $p_{min}$ of the sorted, training samples that are characterized by Shapley feature values $s_i$ that exceed the threshold Shapley value s*. In some instances, executed numerical-feature training module 232 may perform operations that compute the plurality of candidate Shapley threshold values $s^{(j)}$ for the selected numerical input feature across a range of Shapley feature values having an upper bound defined by the maximum Shapley feature value $s_{MAX}$, and a lower bound $s_m$ defined by a maximum of the predetermined, minimum value $s_{min}$, or by a corresponding one of the Shapley feature values $s_i$ associated within the predetermined, maximum percentage $p_{min}$ of the sorted, training samples, e.g., in accordance with $s^{(j)}=(1-t_j)s_m+t_j s_{MAX}$, where $t_j=j/n_{bin}$, and where $j=1, \ldots, n_{bin}$.

Further, and for each of the j candidate Shapley threshold values $s^{(j)}$, executed numerical-feature training module 232 may also: (i) establish $F_1(i,j)$ as the $F_1$ score computing using $s^*=s^{(j)}$ and $v^*$ being equivalent to a corresponding one of the numerical feature values having the $i^{th}$ largest magnitude; and (ii) establish $\hat{F}_1(i,j)$ as the $F_1$ score computing using $s^*=s^{(j)}$ and $v^*$ being equivalent to a corresponding one of the numerical feature values having the $i^{th}$ smallest magnitude. In some instances, executed numerical-feature training module 232 may also perform operations that determine the integer values of index i (e.g., ranging from unity to N) and index j (e.g., ranging from unity to $n_{bin}$) resulting in a maximum value of $F_1(i,j)$ or alternatively, a maximum value of $\hat{F}_1(i,j)$. In some instances, the operations performed by executed numerical-feature training module 232, which determine the integer values of indices i and j that maximize $F_1(i,j)$ or $\hat{F}_1(i,j)$, may include one or more optimization processes (e.g., constrained optimization processes, etc.), that determine the integer values of indices i and j that maximize $F_1(i,j)$ or $\hat{F}_1(i,j)$ for the selected numerical input feature subject to one or more constraints on a composition of the training samples associated with the selected numerical input feature, or on a magnitude of the maximized values of $F_1(i,j)$ or $\hat{F}_1(i,j)$.

For example, if the number B(v,s) of the sorted training samples having numerical feature values that exceed the corresponding numerical feature values having the $i^{th}$ largest magnitude, and having Shapley feature values that exceed the threshold Shapley value $s^*=s^{(j)}$, fails to include at least a threshold number $B_{min}$ of the sorted training samples for a particular combination of indices i and j, executed numerical-feature training module 232 may skip any computation of $F_1(i,j)$ for that particular combination of indices i and j. Similarly, if a number B(v,s) of the sorted training samples having numerical feature values that exceed the corresponding numerical feature values having the $i^{th}$ smallest magnitude, and having Shapley feature values that exceeds the threshold Shapley value $s^*=s^{(j)}$, fails to include at least the threshold number $B_{min}$ of the sorted training samples for a particular combination of indices i and j, executed numerical-feature training module 232 may skip any computation of $\hat{F}_1(i,j)$ for that particular combination of indices i and j. Further, in some examples, numerical-feature training module 232 may perform operations that discard any computed value of $F_1(i,j)$ or $\hat{F}_1(i,j)$ that fails to exceed a predetermined threshold value $F_{min}$.

By way of example, and subject to these constraints, executed numerical-feature training module 232 may implement one or more of the optimization processes to determine value of indices i and j that maximize the computed value of $F_1(i,j)$ or alternatively, the computed value of $\hat{F}_1(i,j)$, Based on the determination of the integer values of indices i and j, executed numerical-feature training module 232 may establish the corresponding one of candidate Shapley threshold values $s^{(j)}$ as the threshold Shapley value $s^*$ for the selected numerical input feature, and establish either the corresponding one of the numerical feature values having the $i^{th}$ largest magnitude (e.g., when the determined indices i and j result in a maximum value of $F_1(i,j)$), or the corresponding one of the numerical feature values having the $i^{th}$ smallest magnitude (e.g., when the determined indices i and j result in a maximum value of $\hat{F}_1(i,j)$), as the threshold feature value $v^*$ for the selected numerical feature.

Executed numerical-feature training module 232 may perform operations that package a feature identifier 234 of the selected numerical feature (e.g., an alphanumeric character string, etc.) and threshold data 236 that specifies the threshold feature value $v^*$ and the threshold Shapley value $s^*$ for the selected numerical input feature into corresponding portions of an element 238 of numerical feature parameter data 240. Further, executed numerical-feature training module 232 may also perform operations that generate one or more elements of predicted-positive data 242 that characterizes an occurrence of a predicted positive for the selected numerical feature and that specifies textual content associated with the occurrence of the predicted positive.

By way of example, if the determined indices i and j were to result in a maximum value of $F_1(i,j)$), the predicted positive for the selected numerical feature may occur when the numerical feature values exceed the threshold feature value $v^*$ (e.g., $v>v^*$). In some instances, executed numerical-feature training module 232 may package, into predicted-positive data 242, an indicator of the predicted positive condition (e.g., $v>v^*$) and textual content that characterizes, or explains, the predicted positive condition (e.g., "feature value being too high"). Alternatively, if the determined indices i and j were to result in a maximum value of $\hat{F}_1(i,j)$, the predicted positive for the selected numerical feature may occur when the numerical feature values fails to exceed the threshold feature value $v^*$ (e.g., $v \leq v^*$), and executed numerical-feature training module 232 may package, into predicted-positive data 242, an indicator of the predicted positive condition (e.g., $v \leq v^*$) and textual content that characterizes, or explains, the predicted positive condition (e.g., "feature value being too low"). Executed numerical-feature training module 232 may also perform operations that incorporate predicted-positive data 242 into a corresponding portion of element 238.

Further, although not illustrated in FIG. 2B, executed numerical-feature training module 232 may also perform any of the exemplary processes described herein to determine, for additional, or alternate, ones of the numerical input values specified within process input data 175B and associated with corresponding ones of the feature-specific subsets of the training samples, a corresponding threshold feature value $v^*$ and threshold Shapley value $s^*$, e.g., subject to the exemplary constraints described herein. Further, and for each of the additional, or alternate, ones of the numerical input values, executed numerical-feature training module 232 may generate an additional element of numerical feature parameter data that includes a corresponding feature identifier, threshold data includes the corresponding threshold feature value $v^*$ and threshold Shapley value $s^*$, and corresponding elements of predicted-positive data.

As described herein, the elements of process input data 175B mays also specify one or more categorical features, and a categorical-feature training module 244 of executed training engine 230 parse the feature identifiers maintained within the elements of sampling data 220 to obtain a plurality of the additional training samples associated with each, or a targeted subset of, the categorical input features specified by the elements of process input data 175B. In some instances, executed categorical-feature training module 244 may perform any of the examples described herein to sort training samples into feature-specific subsets associated with corresponding ones of the categorical input features, and further, that sort the training samples within each of the feature-specific subsets in accordance with the Shapley feature values (e.g., in descending order based on the corresponding Shapley feature values, etc.). In some instances, executed categorical-feature training module 244 may select one of the categorical input features for training (e.g., categorical feature associated with a corresponding feature identifier $f_{ID}$) and may obtain the sorted training samples maintained within the feature-specific subset associated with the selected categorical input feature (e.g., a plurality of N training samples $\{(f_{ID}, v_i, s_i)\}_{i=1}^N$, where $v_i$ corresponds to the feature value of the selected categorical input feature within the $i^{th}$ training sample, and $s_i$ corresponds to the Shapley feature value of the selected categorical input feature within the $i^{th}$ training sample).

As described herein, the categorical feature values $v_i$ maintained with the sorted training samples may specify one of a plurality of candidate categories associated with the selected categorical input feature (including, in some instances, a null value indicating an absence of a category, e.g., due to a missing one of the categorical feature values $v_i$ in one or more of the sorted training samples). By way of example, and for the selected categorical input feature, executed categorical-feature training module 244 may parse the categorical feature values $v_i$ maintained within the sorted training samples to identify each of the candidate categories associated with the selected categorical input feature (including the null value described herein), although in other instances (not illustrated in FIG. 2B), executed categorical-feature training module 244 may access elements of data that identify, and characterize, each of the candidate categories associated with the selected categorical input feature.

In some instances, in training further the Shapley splitter process, executed categorical-feature training module 244 may perform operations that determine the threshold category $c^*$ and the threshold Shapley value $s^*$ for the selected categorical input feature that maximize the values of precision and recall for the selected categorical input feature and as such, that maximize the $F_1$ score associated with the selected categorical feature. By way of example, and through an implementation of one or more of the exemplary training processes described herein, executed categorical-feature training module 244 the threshold category $c^*$ and the threshold Shapley value $s^*$ for the selected categorical input feature in accordance with:

$$(c^*, s^*) = \underset{(c,s) \in R^2}{\operatorname{argmax}} \frac{2B(c, s)}{2B(c, s) + A(c, s) + D(c, s)},$$

where: $A(c,s)$ corresponds to a number of the sorted training samples having a categorical feature value $v_i$ inconsistent with the threshold category $c^*$ and a Shapley feature value $s_i$ that exceeds the threshold Shapley value $s^*$; $B(v,s)$ corresponds to a number of the sorted training samples having a categorical feature value $v_i$ that is consistent with the threshold category $c^*$ and a Shapley feature value $s_i$ that exceeds the threshold Shapley value $s^*$; and $D(v,s)$ corresponds to a number of the sorted training samples having a categorical feature value $v_i$ that is consistent with the threshold category $c^*$ and a Shapley feature value $s_i$ that fails exceeds the threshold Shapley value $s^*$. For example, a categorical feature value may be consistent with the threshold category $c^*$ when that categorical feature value includes, and corresponds to, the threshold category $c^*$, and a categorical feature value may be inconsistent with the threshold category $c^*$ when that categorical feature value fails to include, and fails to correspond to, the threshold category $c^*$.

Further, and for each of the candidate categories c associated with the selected categorical input feature (including, in some instances, the null value described herein), executed categorical-feature training module 244 may also: (i) establish $F_1(i,c)$ as the $F_1$ score computed based on one or more of the sorted training samples having categorical feature values that include the corresponding candidate category c; and (ii) establish $\hat{F}_1(i,c)$ as the $F_1$ score computed based on one or more of the sorted training samples having categorical feature values fail to include the corresponding candidate category c. In some instances, executed categorical-feature training module 244 may also perform operations to determine the integer value of index i (e.g., ranging from unity to N) and a corresponding one of candidate categories c that result in a maximum value of $F_1(i,c)$ or alternatively, a maximum value of $\hat{F}_1(i,c)$, and through an implementation of one or more of these exemplary training processes, categorical-feature training module 244 may compute the values of $F_1(i,c)$ and $\hat{F}_1(i,c)$ under an assumption that a top number k of the Shapley feature values of the sorted training samples predict positive (e.g., using $s^*=s_k$, where $k \in [1,N]$).

In some instances, the operations performed by executed categorical-feature training module 244, which determine the integer value of index i and j that maximize $F_1(i,j)$ or $\hat{F}_1(i,j)$, may include one or more optimization processes (e.g., constrained optimization processes, etc.) that determine the integer values of indices i and the corresponding one of candidate categories c that maximize $F_1(i,j)$ or $\hat{F}_1(i,j)$ for the selected categorical input feature subject to one or more constraints on index i, a composition of the training samples associated with the selected categorical input feature, or on a magnitude of the maximized values of $F_1(i,j)$ or $\hat{F}_1(i,j)$. For example, when calculating the values of $F_1(i,c)$ and $\hat{F}_1(i,c)$ for corresponding ones of the candidate categories c, executed categorical-feature training module 244 may iterate across values of index i that fail to exceed that the value of $s_m$, as described herein.

Further, if the number $B(v,s)$ of the sorted training samples having categorical feature values that include a corresponding candidate category c, and having Shapley feature values that exceed the threshold Shapley value $s^*=s^{(j)}$, fails to include at least a threshold number $B_{min}$ of the sorted training samples for a particular combination of index i and candidate category c, executed categorical-feature training module 244 may skip any computation of $F_1(i,j)$ for that particular combination of index i and candidate category c. Similarly, if a number $B(v,s)$ of the sorted training samples having categorical feature values that fail to include a corresponding candidate category c, and having Shapley feature values that exceeds the threshold Shapley value $s^*=s(i)$, fails to include at least the threshold number $B_{min}$ of the sorted training samples for a particular combination of index i and candidate category c, executed categorical-feature training module 244 may skip any computation of $\hat{F}_1(i,j)$ for that particular combination of index i and candidate category c. In some instances, categorical-feature training module 244 may also perform operations that discard any computed value of $F_1(i,j)$ or $\hat{F}_1(i,j)$ that fails to exceed a predetermined threshold value $F_{min}$.

By way of example, and subject to these constraints, executed categorical-feature training module 244 may implements on or more of the optimization processes to determine value of index i and candidate category c that maximize the computed value of $F_1(i,j)$ or alternatively, the computed value of $\hat{F}_1(i,j)$, Based on the determination of the integer values of index i and candidate category c, executed categorical-feature training module 244 may establish Shapley feature value $s_i$ the threshold Shapley value $s^*$ for the selected categorical input feature, and establish candidate category c as the threshold category c* for the selected categorical feature. Executed categorical-feature training module 244 may also perform operations that package a feature identifier 246 of the selected categorical feature (e.g., an alphanumeric character string, etc.) and threshold data 248 that specifies the threshold category c* and the threshold Shapley value s* for the selected categorical input feature into corresponding portions of an element 250 of categorical feature parameter data 252.

Further, executed categorical-feature training module 244 may also perform operations that generate one or more elements of predictive-positive data 254 that characterize an occurrence of a predicted positive based on the application of the trained, gradient-boosted, decision-tree process to the categorical feature values of the selected numerical feature, and to package predictive-positive data 254 into a corresponding portion of element 250. By way of example, if the determined index i and candidate category c were to result in a maximum value of $F_1(i,c)$), the predicted positive for the selected categorical feature may occur when the categorical feature values are consistent with the threshold category c* (e.g., v=c*). Alternatively, if the determined index i and candidate category c were to result in a maximum value of $\hat{F}_1(i,c)$, the predicted positive for the selected numerical feature may occur when the categorical feature values are inconsistent with the threshold category c* (e.g., v≠c*).

Further, although not illustrated in FIG. 2B, executed categorical-feature training module 244 may also perform any of the exemplary processes described herein to determine, for additional, or alternate, ones of the categorical input values specified within process input data 175B and associated with corresponding ones of the feature-specific subsets of the training samples, a corresponding threshold category c* and threshold Shapley value s*, e.g., subject to the exemplary constraints described herein. Further, and for each of the additional, or alternate, ones of the categorical input features, executed categorical-feature training module 244 may generate an additional element of categorical feature parameter data 252 that includes a corresponding feature identifier, threshold data includes the corresponding threshold category c* and threshold Shapley value s*, and further data that characterizes an occurrence of a predicted positive based on the application of the trained, gradient-boosted, decision-tree process to the numerical feature values of the additional, or alternate, one of selected categorical feature.

C. Exemplary Techniques for Applying Trained Explainability Processes to Predicted, Customer-Specific Output of Trained, Gradient-Boosted, Decision-Tree Processes In some instances, described herein, a machine-learning or artificial-intelligence process, such as a gradient-boosted decision-tree process, may be trained to predict, at a temporal prediction point, a likelihood of an occurrence of one or more events associated with, or involving, a customer of the financial institution during a future temporal interval using training data associated with a first prior temporal interval, and using validation data associated with a second, and distinct, prior temporal interval. Further, and based on an application of the trained gradient-boosted, decision-tree process to input datasets associated with one or more customers of the financial institution, the one or more distributed components of FI computing system 130 may generate elements of output data indicative of a likelihood of an occurrence of one or more events involving corresponding ones of the customers and the corresponding financial product or service during a future temporal interval disposed subsequent to a prediction date. The generated elements of output data may include, for corresponding ones of the customers, a numerical value indicative of a predicted likelihood of the future occurrence of the one of more events, and in some instances, the elements of customer-specific output data may inform an implementation by the financial institution of one or more risk management, risk mitigation, or collections strategies involving corresponding ones of the customers.

For example, the one or more distributed components of FI computing system 130 may perform any of the exemplary processes described herein to generate input datasets associated with all, or a selected subset, of the customers of the financial institution, and to apply the trained, gradient-boosted, decision-tree process described herein, to each of the input datasets. The selected subset may include one or more customers of the financial institution that hold a credit product issued by the financial institution, such as, but not limited to, the secured or unsecured credit-card accounts described herein, and in some instances, the one or more distributed components of FI computing system 130 may perform any of the exemplary processes described herein to generate input datasets associated with the selected subset of the customers of the financial institution, and to apply the trained machine-learning or artificial-intelligence process to each of the input datasets in accordance with a predetermined temporal schedule (e.g., on a daily, weekly, or monthly basis), or in response to a detection of a triggering event (e.g., based on the usage of the credit-card account or based on a request by a customer to modify a term or condition of the credit-card account). As described herein, each of the generated elements of output data may include a numerical score (e.g., either zero or unity) indicative of a predicted likelihood that a corresponding one of the customers will be involved in a default event during the future temporal interval, e.g., with a score of zero being indicative of a predicted non-occurrence of the future default event, and with a score of unity being indicative of a predicted occurrence of the future default event.

In some instances, the generated elements of output data, e.g., the numerical scores, may classify the customers of the financial institution based on the predicted likelihood of their involvement in the future occurrences of the default events, and the elements of customer-specific output data may inform not only a determination by the financial institution of an initial set of terms and conditions associated with a newly issued financial product (e.g., a credit-card account, etc.), but may also inform decisions, by the financial institution, to approve or decline requests for modifications to an initial set of terms and conditions, or to authorize a transaction involving the issued financial product, as well as decisions, by the financial institution, to suspend, close, or subsequently reissue the credit product, and decisions to implement one or more collection processes or strategies involving the financial product. For instance, and as described herein, FI computing system 130 may perform operations that, in conjunction with one or more computing systems of the financial institution, modify a term or condition of a product or service (e.g., a credit-card account, etc.) held by one or more of the selected subset of the customers based on the predicted likelihood of the involvement of these customers in the future occurrences of the default events.

For example, a customer of the financial institution may request an increase in a credit limit associated with a credit-card account issued by the financial institution. A device operable by, or associated with, the customer may execute one or more application programs (e.g., a web browser or mobile application associated with the financial institution), and the executed application program may generate elements of data that identify and characterize the customer and the requested credit-card account, and may perform operations that cause the device to transmit the generated elements of data across a communications network, such as network 120, to one or more additional computing systems of the financial institution, such as an issuer system associated with the credit-card account.

In some instances, and prior to implementing the requested increased to the credit limit, the issuer system may provision data identifying the customer to FI computing system 130, e.g., across network 120. The one or more distributed components of FI computing system 130 may perform any of the exemplary processes described herein to generate an input dataset associated with the customer (e.g., in accordance with the elements of process input data 175B), to apply the trained gradient-boosted, decision-tree process to the generated input dataset (e.g., in accordance with the elements of process parameter data 175A), and based on the application of the trained gradient-boosted, decision-tree process to the input dataset, generate an element of output data (e.g., the numerical score described herein) that indicates a predicted likelihood of an occurrence of a default event involving the customer during the future temporal interval. Further, and concurrently with the application of the trained gradient-boosted, decision-tree process to the input dataset, the one or more distributed components of FI computing system 130 may also perform any of the exemplary processes described herein to apply to the input dataset one or more explainability processes, such as, but not limited to, the trained Shapley splitter process described herein.

Based on the application of the explainability processes to the input dataset, the one or more distributed components of FI computing system 130 may perform operations, described herein, that generate elements of elements of natural language that characterize a causal relationship between the value of one or more input features within a customer-specific input dataset on a magnitude of a corresponding, customer-specific element of predicted output data, and that provision the customer-specific element of predicted output, and the corresponding elements of natural language, to the issuer system. Certain of the exemplary processes described herein provide, in real-time and contemporaneously with the requested credit-limit increase, an indication to the issuer system of the likelihood of the future default event involving the customer and the credit-card account, and based on the provisioned element of output data, the issuer system may elect to approve the requested credit-limit increase (e.g., to issue a "positive" decision) or alternatively, to decline the requested credit-limit increase (e.g., to issue an "adverse" decision). Further, the elements of natural language may characterize one or more reasons for the adverse decision (or alternatively, the positive decision) regarding the requested credit-limit increase, and when provisioned to the customer device for presentation in a digital interval, may enable to customer to appreciate readily the reasons for the adverse (or positive) decision.

Figure 3A:
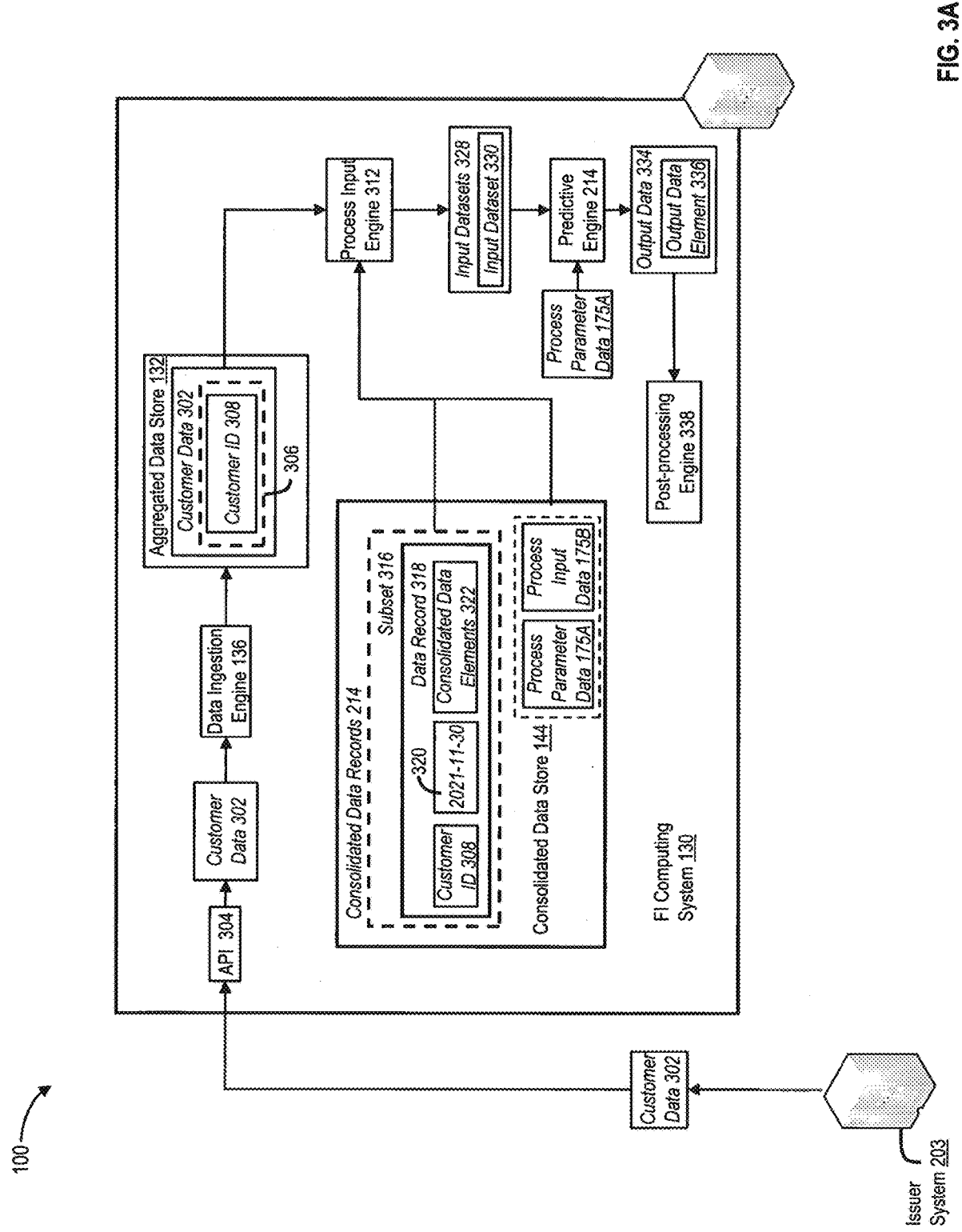

Referring to FIG. 3A, aggregated data store 132 of FI computing system 130 may maintain one or more elements of customer data 302. In some instances, each of the one or more elements of customer data 302 may be associated with a customer of the financial institution that holds one, or more issued financial products, such as one or more secured or unsecured credit-card accounts. The disclosed embodiments are, however, not limited to the exemplary credit-card accounts described herein, and in other instances, the elements of customer data 302 may be associated with customers of the financial institution that hold additional, or alternate, financial products issued by the financial institution, such as, but not limited to, a secured financial product (e.g., a home mortgage, an automobile loan, etc.) or another, unsecured credit product (e.g., an unsecured personal loan, an unsecured line-of-credit, etc.).

FI computing system 130 may, for example, receive all, or a selected portion, of customer data elements 302 from one or more issuer systems associated with the credit-card accounts, such as, but not limited to, issuer system 301 of FIG. 3A. In some instances, issuer system 301 may represent a computing system that includes one or more servers and tangible, non-transitory memories storing executable code and application modules. Further, the one or more servers may each include one or more processors (such as a central processing unit (CPU)), which may be configured to execute portions of the stored code or application modules to perform operations consistent with the disclosed embodiments. Issuer system 301 may also include a communications interface, such as one or more wireless transceivers, coupled to the one or more processors for accommodating wired or wireless internet communication with other computing systems and devices operating within environment 100. In some instances, issuer system 301 may be incorporated into a respective, discrete computing system, although in other instances, issuer system 301 may correspond to a distributed computing system having a plurality of interconnected, computing components distributed across an appropriate computing network, such as communications network 120 of FIG. 1A, or to a publicly accessible, distributed or cloud-based computing cluster.

Referring back to FIG. 3A, an application program executed by the one or more processors of issuer system 301, may transmit portions of customer data elements 302 across network 120 to FI computing system 130. The transmitted portions may be encrypted using a corresponding encryption key, such as a public cryptographic key associated with FI computing system 130, and a programmatic interface established and maintained by FI computing system 130, such as application programming interface (API) 304, may receive the portions of customer data 302 from issuer system 301, or from additional, or alternate, ones of the issuer systems.

API 304 may, for example, route each of the elements of customer data 302 to executed data ingestion engine 136, which may perform operations that store the elements of customer data 302 within one or more tangible, non-transitory memories of FI computing system 130, such as within aggregated data store 132. In some instances, and as described herein, the received elements of customer data 302 may be encrypted, and executed data ingestion engine 136 may perform operations that decrypt each of the encrypted elements of customer data 302 using a corresponding decryption key (e.g., a private cryptographic key associated with FI computing system 130) prior to storage within aggregated data store 132. Further, although not illustrated in FIG. 3A, aggregated data store 132 may also store one or more additional elements of customer data identifying customers of the financial institution that hold corresponding ones of the unsecured credit products, and executed data ingestion engine 136 may perform one or more synchronization operation that merge the received elements of customer data 302 with the previously stored elements of customer data, and that eliminate any duplicate elements existing among the received elements of customer data 302 with the previously stored elements of customer data (e.g., through an invocation of an appropriate Java-based SQL "merge" command).

As described herein, each of the elements of customer data 302 may be associated with, and include a unique identifier of a customer of the financial institution, and FI computing system 130 may receive each of the elements of customer data 302 from a corresponding one of issuer systems 301, such as issuer system 301. For example, as illustrated in FIG. 3A, element 306 of customer data 302, which may be associated with a particular one of the customers and received from issuer system 301, may include a customer identifier 308 assigned to the particular customer by FI computing system 130 (e.g., an alphanumeric character string, etc.), and a system identifier associated with issuer system 301 (e.g., an Internet Protocol (IP) address, a media access control (MAC) address, etc.). Further, although not illustrated in FIG. 3A, each additional, or alternate, element of customer data 302 may be associated with an additional customer of the financial institution that holds an unsecured credit product and received from a corresponding one of issuer systems 301, and may include a customer identifier associated with that additional customer and a system identifier associated with the corresponding one of issuer systems 301.

As described herein, FI computing system 130 may perform any of the exemplary processes described herein to generate an input dataset associated with each of the customers identified by the discrete elements of customer data 302, and to apply the trained, gradient-boosted, decision-tree process described herein to each of the input datasets, in accordance with a predetermined temporal schedule (e.g., on a daily, weekly, or monthly basis, etc.), or in response to a detection of a triggering event. By way of example, the triggering event may correspond to a detected change in a composition of the elements of customer data 302 maintained within aggregated data store (e.g., to an ingestion of additional elements of customer data 302, etc.) or to a receipt of an explicit request received from one or more of issuer systems 301.

In some instances, and in accordance with the predetermined temporal schedule, or upon the detection of the triggering event, a process input engine 312 executed by FI computing system 130 may perform operations that access the elements of customer data 302 maintained within aggregated data store 132, and that obtain the customer identifier maintained within a corresponding one of the accessed elements of customer data 302. For example, as illustrated in FIG. 3A, executed process input engine 312 may access element 306 of customer data 302 (e.g., as maintained within aggregated data store 132) and obtain customer identifier 308, which includes, but is not limited to, the alphanumeric character string assigned to the particular customer of the financial institution (e.g., one of customer identifiers 146 and 156 of FIGS. 1A, and 1B, as described herein).

Executed process input engine 312 may also access consolidated data store 144, and perform operations that identify, within consolidated data records 314, a subset 316 of consolidated data records that include customer identifier 308 and as such, are associated with the particular customer of the financial institution identified by element 306 of customer data 302. As described herein, each of consolidated data records 314 may be associated with a customer of the financial institution, and may characterize that customer, the interaction of that customer with the financial institution and with other financial institutions, and any associated default events involving that customer during a corresponding temporal interval. For example, and as described herein, each of consolidated data records 314 may include a corresponding customer identifier (e.g., an alphanumeric character string assigned to a corresponding customer), a corresponding temporal identifier (e.g., that identifies the corresponding temporal interval), and one or more consolidated data elements associated with the corresponding customer. Examples of these consolidated data elements may include, but are not limited to, elements customer profile data, account data, delinquency data, or credit-bureau data, which may be ingested, processed, aggregated, or filtered by FI computing system 130 using any of the exemplary processes described herein.

In some instances, and as illustrated in FIG. 3A, each data record within subset 316 may include customer identifier 308 and as such, may be associated with the particular customer identified by element 306 of customer data 302. Each of subset 316 of consolidated data records 314 may also include a temporal identifier of a corresponding temporal interval, and one or more consolidated elements associated with the particular customer, the interaction of particular customer with the financial institution and with other financial institutions, and any associated default events involving the particular customer during corresponding ones of the temporal intervals. By way of example, data record 318 of subset 316 may include customer identifier 308, a corresponding temporal identifier 320 (e.g., "2021-11-30," indicating a temporal interval spanning Nov. 1, 2021, through Nov. 30, 2021), and consolidated data elements 322, which identify and characterize the particular customer during the temporal interval.

Executed process input engine 312 may also perform operations that obtain, from consolidated data store 144, elements of process input data 175B that characterizes a composition of an input dataset for the trained, gradient-boosted, decision-tree process. In some instances, executed process input engine 312 may parse process input data 175B to obtain the composition of the input dataset, which not only identifies the elements of customer-specific data included within each input data set dataset (e.g., feature identifiers of numerical or categorical input feature values, as described herein), but also a specified sequence or position of these input feature values within the input dataset. Based on the parsed portions of process input data 175B, executed process input engine 312 may perform operations that identify, and obtain or extract, one or more of the input feature values from one or more of data records maintained within subset 316 of consolidated data records 314 and associated with temporal intervals disposed within the extraction interval $\Delta t_{extract}$, as described herein, and further that compute one or more of the input features values based on the elements of extracted or obtained data. Executed process input engine 312 may perform operations that package the obtained, or extracted, input feature values within a corresponding one of input datasets 328, such as input dataset 330 associated with the particular customer identified by element 306 of customer data 302, in accordance with their respective, specified sequences or positions.

Through an implementation of these exemplary processes, executed process input engine 312 may populate an input dataset associated with the particular customer identified by element 306 of customer data 302, such as input dataset 330 of input datasets 328, with input feature values obtained or extracted from, or computed, determined or derived from, elements of data within the data records of subset 316. Further, in some instances, executed process input engine 312 may also perform any of the exemplary processes described herein to generate, and populate with input feature values, an additional one of input datasets 328 for each of the additional, or alternate, customers of the financial institution (e.g., which are associated with additional, or alternate, elements of customer data 302). Executed process input engine 312 may package each of the customer-specific input datasets within input datasets 328, and executed process input engine 312 may provide input datasets 328 as an input to a predictive engine executed by the one or more processors of FI computing system 130, such as executed predictive engine 214.

As illustrated in FIG. 3A, executed predictive engine 214 may perform operations that obtain, from consolidated data store 144, process parameter data 175A that includes one or more process parameters of the trained, gradient-boosted, decision-tree process, such as one or more of the exemplary process parameters described herein. In some instances, and based on portions of process parameter data 175A, executed predictive engine 214 may perform operations that establish a plurality of nodes and a plurality of decision trees for the trained, gradient-boosted, decision-tree process, each of which receive, as inputs (e.g., "ingest"), corresponding elements of input datasets 328. Further, and based on the execution of predictive engine 214, and on the ingestion of input datasets 328 by the established nodes and decision trees of the trained, gradient-boosted, decision-tree process, FI computing system 130 may perform operations that apply the trained, gradient-boosted, decision-tree process to each of the input datasets of input datasets 328, including input dataset 330, and that generate an element of output data 334 associated with a corresponding one of input datasets 328, and as such, a corresponding one of the customers identified by the elements of customer data 302. For example, output data 334 may include an element 336 associated with input dataset 330 and with the customer identified by element 306 of customer data 302.

By way of example, and as described herein, each of the generated elements of output data 334 may include a numerical score indicative of a predicted likelihood that the corresponding one of the customers will be involved in a default event during the future temporal interval (e.g., the target interval $\Delta t_{target}$, described herein). In some instances, the numerical score within each of the elements of output data 334 may correspond to either zero or unity, with a score of zero being indicative of a predicted non-occurrence of the default event during the future temporal interval, and with a score of unity being indicative of a predicted occurrence of the default event during the future temporal interval. Executed predictive engine 214 may provide the generated elements of output data 334 (e.g., either alone, or in conjunction with corresponding ones of input datasets 328) as an input to a post-processing engine 338 executed by the one or more processors of FI computing system 130.

The one or more processors of FI computing system 130 may also perform operations that, either concurrently with, or subsequent to, the application of the trained, gradient-boosted, decision-tree process to input datasets 328 by executed predictive engine 214, generate, for each, or a selected subset, of input datasets 328, a plurality of discrete elements of textual content that characterize an impact of one or more numerical or categorical feature values on a corresponding element of output data 334. By way of example, and for a corresponding one of input datasets 328, such as input dataset 330, the one or more processors of FI computing system 130 may perform any of the exemplary processes described herein to compute, for each of values of the input features (e.g., as specified within process input data 175B), a metric value that characterizes a contribution of the input feature value to the predicted output of the trained, gradient-boosted decision-tree process, such as, but not limited to, a Shapley feature value. Further, in some examples, and based on the computed Shapley feature values, the one or more processors of FI computing system 130 may perform operations, described herein, to select a subset of the input feature values of input dataset 330 (e.g., a predetermined number of the input feature values associated with the largest Shapley feature values, etc.) and generate, for each of the subset of the input feature values, elements of textual content that identify and characterize a feature-specific reason for the corresponding element of predicted output data 334.

As described herein, the elements of textual content associated with a particular one of the input feature values of input dataset 330, and of other ones of input datasets 328, may specify, among other things, that the particular input feature value is "too low" or "too high" (e.g., a feature-specific reason associated with a numerical input feature) or that the particular input feature value is, or is not, associated with a threshold category (e.g., a feature-specific reason associated with a categorical input feature). In some instances, the one or more processors of FI computing system 130 may perform operations that map the elements of textual content, and the corresponding feature-specific reasons, to corresponding elements of natural that characterize the feature-specific reason (e.g., to generate adverse reasons), and to the financial institution and its customers, and that provision data specifying at least a subset of the adverse reasons, and a corresponding element of output data 334, to issuer system 203.

Figure 3B:
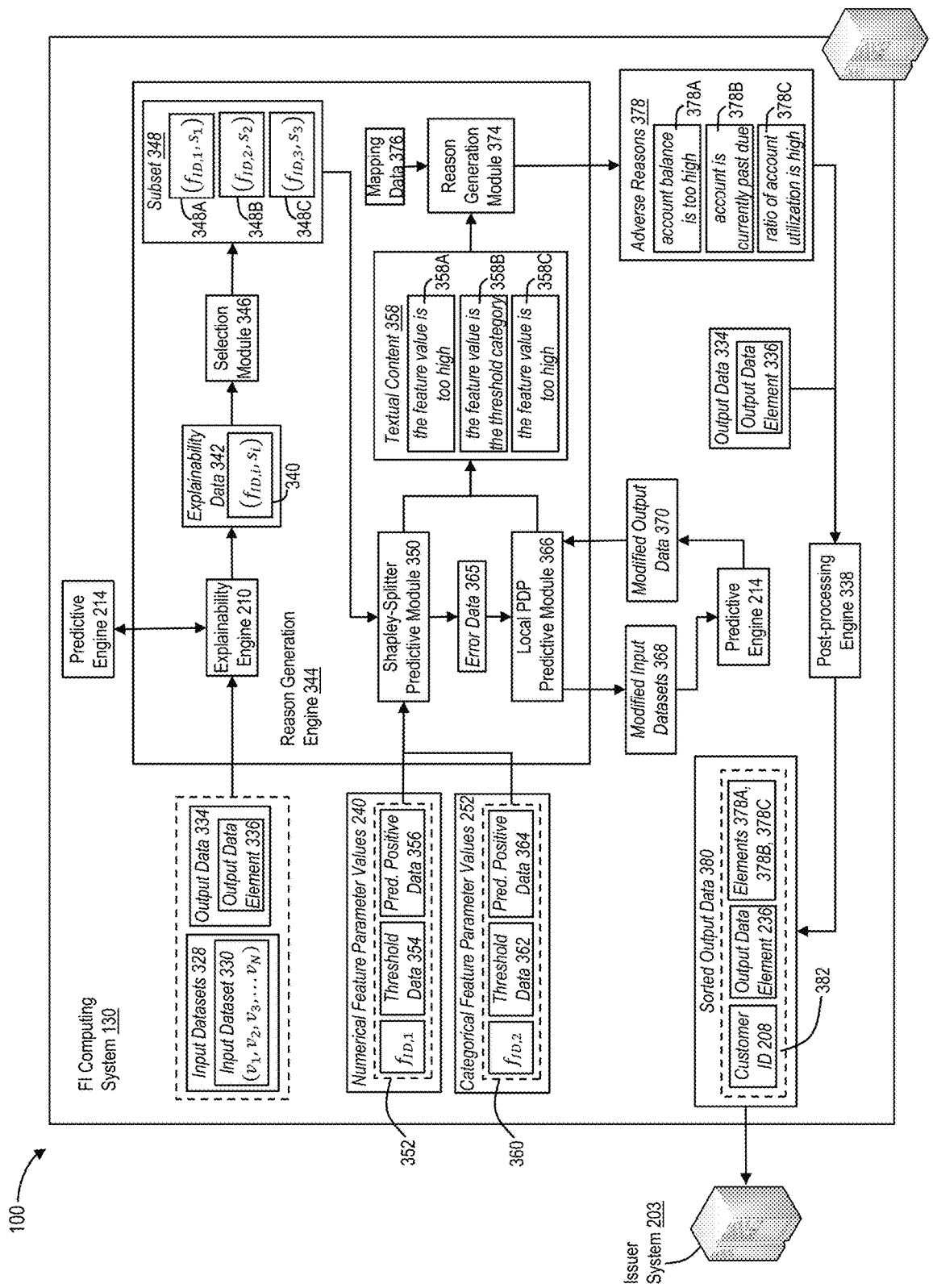

Referring to FIG. 3B, an explainability engine executed by the one or more processors of FI computing system 130, such as executed explainability engine 210, may obtain one or more of input datasets 328, such as input dataset 330, and may obtain an element of output data 334 associated with each of the one or more of input datasets 328, such as output data element 336. In some instances, and based on input datasets 328 and output data 334, executed explainability engine 210 may perform any of the exemplary processes described herein, in conjunction with executed predictive engine 214, to compute Shapley feature values that characterize a contribution of corresponding ones of the input features (e.g., the numerical and categorical input features described herein) to the outcome of the trained, gradient-boosted, decision-tree process (e.g., the numerical values indicative predicted likelihood of an occurrence of a default involving a corresponding customer and a credit-card account during a future temporal interval, as maintained within the elements of output data 334). Executed explainability engine 210 may, for example, associated each of the computed Shapley feature values with an identifier of the corresponding numerical or categorical input feature (e.g., one of the exemplary feature identifiers maintained within process input data 175B), and may rank each of the associated pairs feature identifiers and Shapley feature values based on corresponding ones of Shapley feature values (e.g., in descending order), and package ranked pairs 340 of feature identifiers (e.g., $f_{ID,i}$) and Shapley feature values (e.g., $s_i$) into corresponding portions of explainability data. $(f_{ID,i}, s_i)$ Further, executed explainability engine 210 may provision the explainability data 342, including the ranked pairs of feature identifiers and Shapley feature values, to a reason generation engine 344 executed by the one or more processors of FI computing system 130 (e.g., based on a programmatic signal generated by executed explainability engine 210). In some instances, and based on explainability data 342, executed reason generation engine 344 may perform any of the exemplary processes described herein to generate elements of textual content that identify and characterize a feature-specific reason associated with each, or a selected subset, of the input feature values maintained within corresponding ones of input datasets 328 and as such, with corresponding element of predicted output data 334. For example, as illustrated in FIG. 3B, a selection module 346 of executed reason generation engine 344 may receive explainability data 342, and may perform operations that parse ranked pairs 340 of feature identifiers and Shapley feature values, and extract a subset 348 of ranked pairs 340 associated with those numerical or categorical input features characterized by the largest of the ranked Shapley feature values. For example, extracted subset 348 may include a predetermined number of ranked pairs 340 of feature identifiers and Shapley feature values, and executed selection module 346 may provide subset 348, and input datasets 328, as an input to Shapley-splitter predictive module 350 of executed reason generation engine 344, which may perform operations that apply the trained, Shapley-splitter process described herein to one or more of the input feature values maintained within corresponding ones of input datasets 328, and generate, elements of textual content that identify and characterize a feature-specific reason for the corresponding element of predicted output data 334.

By way of example, as illustrated in FIG. 3B, executed Shapley-splitter predictive module 350 may perform operations that access a ranked pair of subset 348, such as pair 348A that includes a feature identifier $f_{ID,1}$ of a particular numerical input feature and an associated Shapley feature value $s_1$, and obtain an element 352 of numerical feature parameter data 240 that includes the feature identifier $f_{ID,1}$ as such, is associated with the particular numerical input feature. Executed Shapley-splitter predictive module 350 may obtain, from element 352, threshold data 354 includes a threshold feature value v* and a threshold Shapley value s* for the particular numerical input feature and elements of predicted-positive data 356 for the particular numerical input feature. Further, and based on feature identifier $f_{ID,1}$ and the elements of process input data 175B, executed Shapley-splitter predictive module 350 may also determine a position of the feature value of the particular numerical input feature within input dataset 330, and may perform operations that obtain the feature value of the particular numerical input feature (e.g., feature value $v_1$) from the determined position within input dataset 330.

In some instances, executed Shapley-splitter predictive module 350 may also perform operations that determine whether the Shapley feature value $s_1$ exceeds the threshold Shapley value s* for the particular numerical input feature (e.g., that $s_1 > s_1^*$), and further, whether the feature value $v_1$ of the particular numerical input feature, as maintained within input dataset 330, satisfies the predicted-position condition for the particular numerical input feature value, as specified within predicted-positive data 356. For example, and based on portions of predicted-positive data 356, Shapley-splitter predictive module 350 may establish that a predicted positive for the particular numerical input feature occur when a corresponding feature value exceeds the threshold feature value v* (e.g., v>v*), and that the feature value $v_1$ satisfies the predicted-positive condition for the particular numerical input feature when the feature value $v_1$ exceeds the threshold feature value $v_1$.

By way of example, as illustrated in FIG. 3B, executed Shapley-splitter predictive module 350 may determine that (i) the Shapley feature value $s_1$ exceeds the threshold Shapley value s* for the particular numerical input feature and (ii) feature value $v_1$ exceeds the threshold feature value v* for the particular numerical input feature. Based on the determination, executed Shapley-splitter predictive module 350 may perform operations that apply the trained Shapley-splitter process to the feature value $v_1$ of the particular numerical input feature. For instance, and based on the determination that the feature value $v_1$ of the particular numerical input exceeds the threshold feature value $v_1^*$, executed Shapley-splitter predictive module 350 may process predicted-positive data 356 and establish, for the satisfied predicted-positive condition (e.g., $v_1 > v_1^*$), that a feature-specific reason characterizing, or explaining, the predicted-positive condition includes the phrase "the feature value is too high." Executed Shapley-splitter predictive module 350 may perform operations that package the phrase "the feature value is too high" into and element 358A of textual content 358 (e.g., as the corresponding feature-specific reason).

In other examples, not illustrated in FIG. 3B, predicted-positive data 356 may specify that the predicted positive for the particular numerical input feature occurs when a corresponding feature value fails to exceed the threshold feature value v* (e.g., v≤v*). Based on a determination that the Shapley feature value $s_1$ exceeds the threshold Shapley value s* for the particular numerical input feature, and that the feature value $v_1$ satisfies the additional predicted-positive condition for the particular numerical input feature (e.g., that the feature value $v_1$ fails to exceeds the threshold feature value $v_1^*$), executed Shapley-splitter predictive module 350 may process predicted-positive data 356 and establish, for the additional predicted-positive condition (e.g., $v_1 \leq v_1^*$), that a feature-specific reason characterizing, or explaining, the additional predicted-positive condition includes the phrase "the feature value is too low." Executed Shapley-splitter predictive module 350 may perform operations that package the phrase "the feature value is too low" into an additional, or alternate, portion of textual content associated with the particular numerical input feature (e.g., as the corresponding feature-specific reason).

Further, and as illustrated in FIG. 3B, executed Shapley-splitter predictive module 350 may perform operations that access an additional ranked pair of subset 348, such as pair 348B that includes a feature identifier $f_{ID,2}$ of a particular categorical input feature and an associated Shapley feature value $s_2$. In some instances, executed Shapley-splitter predictive module 350 may parse the elements of categorical feature parameter data 252, determine that element 360 includes feature identifier $f_{ID,2}$ of particular the categorical input feature, and obtain, from element 360, threshold data 362 includes a threshold category c* and a threshold Shapley value s* for the particular numerical input feature and elements of predicted-positive data 364 for the particular categorical input feature. Further, and based on feature identifier $f_{ID,2}$ and the elements of process input data 175B, executed Shapley-splitter predictive module 350 may also determine a position of the feature value of the particular categorical input feature within input dataset 330, and may perform operations that obtain the feature value of the particular categorical input feature (e.g., feature value $v_2$) from the determined position within input dataset 330.

As described herein, executed Shapley-splitter predictive module 350 may also perform operations that determine whether the Shapley feature value $s_2$ exceeds the threshold Shapley value s* for the particular categorical input feature (e.g., that $s_2 > s_2^*$), and further, whether the feature value $v_2$ of the particular numerical input feature, as maintained within input dataset 330, satisfies the predicted-position condition for the particular numerical input feature value, as specified within predicted-positive data 356. For example, and based on portions of predicted-positive data 364, executed Shapley-splitter predictive module 350 may establish that a predicted positive for the particular categorical input feature occurs when a corresponding feature value is consistent with, or includes, the threshold category c* (e.g., c=c*), and that the feature value $v_1$ satisfies the predicted-positive condition for the particular categorical input feature when the feature value $v_1$ is consistent with, or includes, the threshold category c*.

By way of example, as illustrated in FIG. 3B, executed Shapley-splitter predictive module 350 may determine that (i) the Shapley feature value $s_2$ exceeds the threshold Shapley value s* for the particular categorical input feature and (ii) feature value $v_1$ includes threshold category c* for the particular categorical input feature. Based on the determination, executed Shapley-splitter predictive module 350 may perform operations that apply the trained Shapley-splitter process to the feature value $v_2$ of the particular categorical input feature. For instance, executed Shapley-splitter predictive module 350 may process predicted-positive data 364 and establish, for the satisfied predicted-positive condition (e.g., $c_1 = c^*$), that a feature-specific reason characterizing, or explaining, the predicted-positive condition includes the phrase "the feature value is the threshold category." Executed Shapley-splitter predictive module 350 may perform operations that package the phrase "the feature value is the threshold category" into an element 358B of textual content 358 (e.g., as the corresponding feature-specific reason).

In other examples, not illustrated in FIG. 3B, predicted-positive data 364 may specify that the predicted positive for the particular categorical input feature occurs when a corresponding feature value fails to be consistent with, or include, the threshold category c* (e.g., $v_2 \neq c^*$). Based on a determination that the Shapley feature value $s_1$ exceeds the threshold Shapley value s* for the particular categorical input feature, and that the feature value $v_2$ satisfies the additional predicted-positive condition for the particular categorical input feature (e.g., that the feature value $v_2$ fails to include the threshold category c*), executed Shapley-splitter predictive module 350 may process predicted-positive data 364 and establish, for the additional predicted-positive condition (e.g., $v_2 \neq c^*$), that a feature-specific reason characterizing, or explaining, the additional predicted-positive condition includes the phrase "the feature value is not the threshold category." Executed Shapley-splitter predictive module 350 may perform operations that package the phrase "the feature value is not the threshold category" into an additional, or alternate, portion of textual content associated with the particular numerical input feature (e.g., as the corresponding feature-specific reason).

Further, executed Shapley-splitter predictive module 350 may perform operations that access an additional ranked pair of subset 348, such as pair 348C that includes a feature identifier $f_{ID,3}$ of an additional numerical input feature and an associated Shapley feature value $s_3$, and obtain an additional element of numerical feature parameter data 240 (not illustrated in FIG. 3B) that includes the feature identifier $f_{ID,1}$ as such, is associated with the additional numerical input feature. As described herein, executed Shapley-splitter predictive module 350 may obtain, from the additional element, threshold data includes a threshold feature value $v_3^*$ and a threshold Shapley value $s_3^*$ for the additional numerical input feature and elements of predicted-positive data 356 for the particular numerical input feature. Further, and based on feature identifier $f_{ID,3}$ and the elements of process input data 175B, executed Shapley-splitter predictive module 350 may also determine a position of the feature value of the particular numerical input feature within input dataset 330, and may perform operations that obtain the feature value of the particular numerical input feature (e.g., feature value $v_3$) from the determined position within input dataset 330.

In some instances, executed Shapley-splitter predictive module 350 may perform operations determine that the Shapley feature value $s_3$ fails to exceeds the threshold Shapley value $s_3^*$ for the additional numerical input feature (e.g., that $s_3 \leq s_3^*$), and additionally, or alternatively, that the feature value $v_3$ of the additional numerical input feature, as maintained within input dataset 330, fails to satisfy the predicted-position condition for the additional numerical input feature value, as specified within predicted-positive data of the additional element. Based on the additional determination, executed Shapley-splitter predictive module 350 may establish that the trained Shapley-splitter process is incapable of generating a feature-specific reason for the additional numerical input feature based on the determined relationship between the feature values of input dataset 330 and the corresponding Shapley feature values. In some examples, executed Shapley-splitter predictive module 350 may generate elements of error data 365 that characterize the determined inability of executed Shapley-splitter predictive module to generate a feature-specific reason associated with the additional numerical input feature, and route error data 367 (which includes feature identifier $f_{ID,3}$) to a local partial dependency plot (PDP) predictive module 366 of executed reason generation engine 344.

Executed local PDP predictive module 366 may perform operations that generate a local partial dependency plot associated with the additional numerical input feature, and based on the generated partial dependency plot, determine whether a change in a value of the additional numerical input feature results in a corresponding increase, or decrease, in predicted likelihood of the occurrence of the future default event predicted by the trained, gradient-boosted, decision-tree process. Based on the determination, executed local PDP predictive module 366 may generate additional, or alternate, elements of textual content that include a feature-specific reason associating a value of the additional numerical input feature within with input dataset 330 and the corresponding element of predicted output data 334, e.g., output data element 336. Further, and as described herein, executed local PDP predictive module 366 may implement any of the local PDP processed described herein concurrently with inferencing by executed predictive engine 214 (e.g., concurrently with the application of the trained, gradient-boosted, decision-tree process to input datasets 328) and without training against one or more of the validation datasets.

By way of example, based on feature identifier $f_{ID,3}$ of the additional numerical input feature and on the elements of process input data 175B, executed local PDP predictive module 366 may perform operations that determine a position of a value of the additional numerical input feature within input dataset 330. Further, executed local PDP predictive module 366 may also perform operations that, based on input dataset 330, generate a plurality of modified input datasets 368 associated with the additional numerical input feature, and that provision each of modified input datasets 368 as an input to executed predictive engine 214. Executed local PDP predictive module 366 may establish a range of feature values associated with, and appropriate to, the additional numerical input feature, and may perform operations that discretize the determined range into discrete intervals (e.g., consistent with a predetermined number of interpolation points, etc.) and that compute, for each of the discrete intervals, a discretized feature value. By way of example, the discretized feature values may vary linearly across the discretized intervals of the feature range, or in accordance with any additional, or alternate non-linear or linear function and in some instances, executed local PDP predictive module 366 may perform any of the exemplary processes described herein to generate corresponding ones of modified input datasets 368 by replacing that feature value with a corresponding one of the discretized feature values of the additional numerical input feature.

Based on an application of the trained, gradient-boosted decision process the elements of each of modified input datasets 368, executed local PDP predictive module 366 may generate one or more elements of modified output data 370, and may provision the elements of modified output data 370 as a further input to executed local PDP predictive module 366. As described herein, the local partial dependency plot for the additional numerical input feature may inspect a marginal effect of that additional numerical input feature on the predicted output, and executed local PDP predictive module 366 executed local PDP predictive module 366 may generate data characterizing the local partial dependency plot for the additional numerical input feature by averaging the numerical scores maintained within one or more elements of modified output data 370 associated with corresponding ones of the discretized feature values, and by associated each of the discretized feature values with a corresponding one of the average numerical scores (e.g., to generate corresponding points within the local partial dependency plot for the additional numerical input feature).

In some examples, executed local PDP predictive module 366 may perform operations that further process the data characterizing the local partial dependency plot for the additional numerical input feature (e.g., the pairs of discretized feature values and corresponding averaged numerical scores), and compute a value of a Kendall rank correlation coefficient (e.g., a Kendall "τ) for the local partial dependency plot based on the data. If, for example, executed local PDP predictive module 366 were to establish that the computed value of the Kendall rank correlation coefficient exceeds a threshold value, then executed local PDP predictive module 366 may establish that the local partial dependency plot is characterized by a monotonic increase across the range of feature values of the additional numerical input feature, and may package the phrase "the feature value is too high" into an element 358C of textual content 358 (e.g., as the corresponding feature-specific reason).

Alternatively, if executed local PDP predictive module 366 were to establish that the computed value of the Kendall rank correlation coefficient fails to exceed the threshold value, then executed local PDP predictive module 366 may establish that the local partial dependency plot is characterized by a monotonic decrease across the range of feature values of the additional numerical input feature, and may package the phrase "the feature value is too low" into an additional element of textual content (not illustrated in FIG. 3B). In additional, or alternate, examples, executed local PDP predictive module 366 may obtain the feature value of the additional numerical input feature from the determined position within input dataset 330, and package the obtained feature value into a further element of textual content, either individually or in conjunction with feature identifier $f_{ID,3}$ (also not illustrated in FIG. 3B).

Further, although not illustrated in FIG. 3B, executed Shapley-splitter predictive module 350 may also establish an inability of the trained Shapley-splitter process to generate a feature-specific reason for an additional categorical input feature, such as the exemplary categorical features described herein. Based on elements of error data that include a feature identifier of the additional categorical input feature, executed local PDP predictive module 366 may perform any of the exemplary processes described herein to generate data characterizing a local partial dependency plot for the additional categorical input feature. In some examples, executed local PDP predictive module 366 may analyze the data characterizing a local partial dependency plot for the additional categorical input feature and perform operations that determine a new feature value for the additional categorical input feature that would reduce a corresponding, predicted numerical score (e.g., based on the application of the trained, gradient-boosted, decision tree process to an input dataset that includes the new feature value). Executed local PDP predictive module 366 may generate an additional element of textual content that specifies the new feature value of the additional categorical input feature, and in some instances, a feature identifier of the additional categorical input feature.

In some examples, executed reason generation engine 344 may perform any of the exemplary processes described herein to determine a feature-specific reason associated with, and characterizing, each of the additional, or alternate, ranked pairs of feature identifiers and Shapley feature values maintained within extracted subset 348 (based on an application of the exemplary trained Shapley-splitter processes, or the exemplary local PDP predictive processes, described herein), and to generate elements of textual content that characterize the feature-specific reason. As illustrated in FIG. 3B, a reason mapping module 374 of executed reason generation engine 344 may receive the textual content 358, include elements 358A, 358B, and 358C described herein, along with corresponding ones of the feature identifier, including feature identifiers $f_{ID,1}$, $f_{ID,2}$, and $f_{ID,3}$. Further, in some instances, and executed reason mapping module 374 may perform any of the exemplary processes described herein to map the feature-specific reasons characterized by the elements of textual content 358 to corresponding business-specific reasons that, through a use of natural language, characterize the association between the corresponding feature values and the predicted output in a manner readily apparent to, and appreciable by, representatives and customers of the financial institution.

For example, element 358A may be associated with feature identifier $f_{ID,1}$ of the numerical input feature, and may include the phrase "the feature value is too high." Further, by way of example, the numerical input feature may correspond to a current balance associated with a credit-card account held by a customer, and feature identifier $f_{ID,1}$ may include an alphanumeric identifier assigned to the numerical input feature by FI computing system 130. In some instances, executed reason mapping module 374 may obtain elements of mapping data 376 that associated feature identifier $f_{ID,1}$ and element 358A (e.g., the feature-specific reason "the feature value is too low") with a corresponding feature name (e.g., the feature name "account balance") and elements of natural language that associate the feature name with the feature-specific reason (e.g., "account balance is too high"). Based on the elements of mapping data 376, executed reason mapping module 374 may perform operations that package the elements of natural language, either alone or in conjunction with the feature identifier $f_{ID,1}$ into an element of adverse reason data 378 associated with input dataset 330 and output data element 336 (e.g., within element 378A).

Further, element 358B may include feature identifier $f_{ID,2}$ of the categorical input feature and may include the phrase "the feature value is not the threshold category." Further, by way of example, the categorical input feature may correspond to a current balance associated with a past-due interval of a past-due balance associated with the credit-card, and feature identifier $f_{ID,2}$ may include an alphanumeric identifier assigned to the categorical input feature by FI computing system 130. In some instances, the elements of mapping data 376 may associate feature identifier $f_{ID,2}$ and element 358B (e.g., the feature-specific reason "the feature value is not the threshold category") with a corresponding feature name (e.g., the feature name "past-due interval") and elements of natural language that associate the feature name with the feature-specific reason (e.g., "account is currently past due"). Based on the elements of mapping data 376, executed reason mapping module 374 may perform operations that package the elements of natural language, either alone or in conjunction with the feature identifier $f_{ID,2}$, into an element of adverse reason data 378 (e.g., within element 378B).

Additionally, in some examples, element 358C may include feature identifier $f_{ID,3}$ of the additional numerical input feature and the phrase "the feature value is too high." The additional numerical input feature may, for example, correspond to the customer's current credit utilization, and feature identifier $f_{ID,3}$ may include an alphanumeric identifier assigned to the categorical input feature by FI computing system 130. In some instances, the elements of mapping data 376 may associate feature identifier $f_{ID,3}$ and element 358C (e.g., the feature-specific reason "the feature value is too high") with a corresponding feature name (e.g., the feature name "credit utilization") and elements of natural language that associate the feature name with the feature-specific reason (e.g., "ratio of account utilization is high"). Based on the elements of mapping data 376, Executed reason mapping module 374 may perform operations that package the elements of natural language, either alone or in conjunction with the feature identifier $f_{ID,3}$, into an element of adverse reason data 278 (e.g., within element 3780).

In some instances, executed reason generation engine 344 may perform any of the exemplary processes described herein to map the feature-specific reasons characterized by the each, or a selected subset, of the elements of textual content 358 (e.g., elements 358A, 358B, and 358C) to corresponding elements of natural language, and to generate an additional, or alternate, element of adverse reason data 378 that includes the mapped elements of nature language and a corresponding feature identifier. The selected subset of the elements of textual content 358 may, for example, include a predetermined number of elements of textual content 358, which may be associated with corresponding numerical or categorical features characterized by the largest Shapley feature values (e.g. as specified within subset 348 of the ranked pairs of feature identifiers and Shapley feature values). Executed reason generation engine 344 may also provision the elements of adverse reason data 378 associated with associated with input dataset 330 and with output data element 336, including elements 378A, 378B, and 378C, as additional inputs to executed post-processing engine 338.

Further, although not illustrated in FIG. 3B, executed reason generation engine 344 may also perform any of the exemplary processes described herein to generate elements of textual content that identify and characterize a feature-specific reason associated with all, or a selected subset, of the input feature values maintained within each additional, or alternate, input datasets 328 and as such, with corresponding elements of predicted output data 334, and to map the feature-specific reasons characterized by the textual content to corresponding elements of natural language, and to generate elements of adverse reason data that includes the mapped elements of nature language and a corresponding feature identifier. In some instances, executed reason generation engine 344 may provision the additional elements of adverse reason data associated with each of the additional, or alternate, ones of input datasets 328, and with each of the additional, or alternate, elements of predicted output data 334, as further inputs to executed post-processing engine 338.

As described herein, executed post-processing engine 338 may receive the generated elements of output data 334 (e.g., either alone, or in conjunction with corresponding ones of input datasets 328) from executed predictive engine 214, and may receive the elements of adverse reason data 378 (e.g., including elements 378A, 378B, and 378C associated with input dataset 330 and with output data element 336) from executed reason generation engine 344. In some instances, executed post-processing engine 338 may perform operations that access the elements of customer data 302 maintained within aggregated data store 132, and associate each of the elements of customer data 302 (e.g., that identify a corresponding one of the customers of the financial institution that hold an unsecured credit product) with a corresponding one of the elements of output data 334 (e.g., that include numerical scores indicative of the predicted likelihood that corresponding ones of the customers will be involved in a default event during the future temporal interval) and with a corresponding subset of the elements of adverse reason data 378 (that include elements of natural language characterize the adverse reasons for decisions associated with the numerical scores).

By way of example, element 336 of output data 334 may be associated with the particular customer identified by element 306 of customer data 302, and may include a numerical score of unity, which indicates a predicted occurrence of a default event involving the particular customer during the future temporal interval. Further, elements 378A, 378B, and 378C of adverse reason data 378 may also be associated with the particular customer, and may include the elements of natural language characterizing, and specifying, the adverse reasons for the predicted score of unity that include, but are not limited to, respective ones of "account balance is too high," "account is currently past due," and "ratio of account utilization is high." Executed post-processing engine 338 may, in some instances, associate customer identifier 308 with element 336 of output data 334 and with elements 378A, 378B, and 378C of adverse reason data 378, and may perform any of these exemplary processes to associate each additional, or alternate, one of the elements of output data 334 and adverse reason data 378 with a corresponding one of the customer identifiers maintained within customer data 302.

Further, and in some instances, executed post-processing engine 338 may perform operations that sort the associated elements of customer data 302, output data 334, and adverse reason data 378 based on the corresponding numerical scores (e.g., which indicate the predicted likelihood that corresponding ones of the customer will be involved in a default event during the future temporal interval)), and output elements of sorted output data 380 that include the associated, and now sorted, elements of customer data 302, output data 334, and adverse reason data 378. For example, and for the particular customer, sorted output data 380 may include a corresponding sorted element 382 that associates together customer identifier 308, element 336 of output data 334 (e.g., that specifies a numerical score of unity for the particular customer), and the subset of the elements of adverse reason data 378 (e.g., elements 378A, 378B, and 378C that specify, in natural language, the adverse reasons for the numerical score of unity). As illustrated in FIG. 3B, FI computing system 130 may perform operations that transmit all, or a selected portion of, sorted output data 380 to issuer system 301 (and additionally, or alternatively, to other ones of the issuer systems).

Figure 3C:
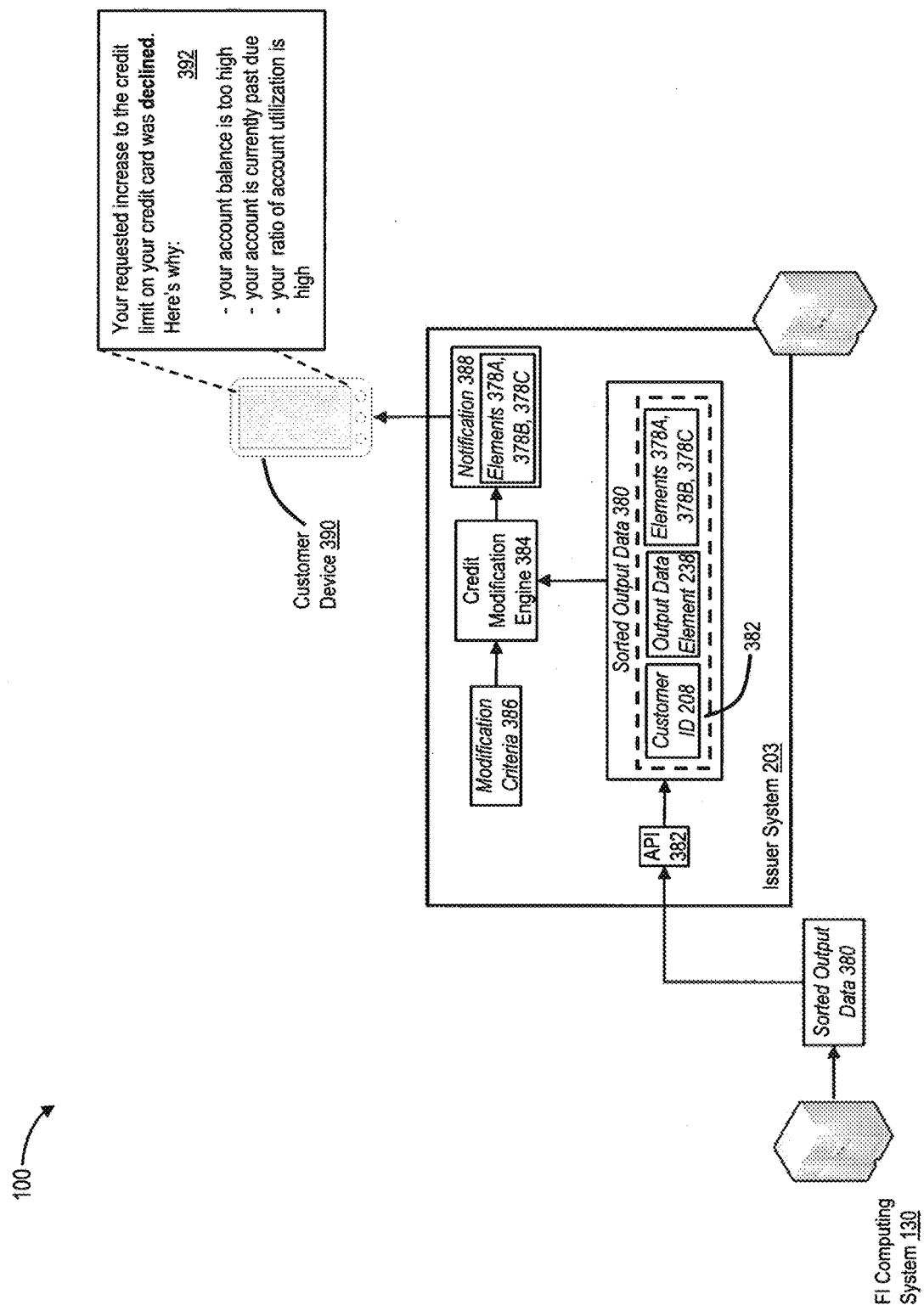

Referring to FIG. 3C, issuer system 301 may receive, all, or a selected portion, of sorted output data 380 from FI computing system 130. For example, a programmatic interface associated with and maintained by issuer system 301, such as application programming interface (API) 382, may receive and route sorted output data 380 to a credit modification engine 384 executed by the one or more processors of issuer system 301. As described herein, the elements of sorted output data 380 may associate together customer identifiers (e.g., that identifying and characterize corresponding customer of the financial institution), corresponding elements of output data 334 (which include numerical scores indicative of a predicted likelihood that the corresponding ones of the customers will be involved in a default event during the future temporal interval), and corresponding subsets of the elements of adverse reason data 378 (which specify the adverse reason(s) for each of the predicted likelihoods), and may sort (or group) the associated customer identifiers, corresponding elements of output data 334, and corresponding subsets of the elements of adverse reason data 378 into respective bins indicative of a predicted non-occurrence of the default event during the future temporal interval (e.g., associated with a numerical score of zero), and indicative of a predicted occurrence of the default event during the future temporal interval (e.g., associated with a numerical score of unity).

For example, the customer of the financial institution that requested the credit-limit increase may be associated with customer identifier 308 and as such, with sorted element 380 that associates together customer identifier 308, and element 336 of output data 334 (which specifies a numerical score of unity for the customer), and elements 378A, 378B, and 378C of adverse reason data 378 (which specify, as adverse reasons for the numerical score of unity, elements of natural language "account balance is too high," "account is currently past due," and "ratio of account utilization is high"). Executed credit modification engine 384 may also access modification criterion 386, which may specify a modification threshold for increasing the credit limit of the credit-card account, and based on modification criterion 386, determine that the numerical value of unity exceeds the modification threshold. Based on the determination that the numerical value of unity exceeds the modification threshold, FI computing system 130 may decline to increase the credit limit of the customer's credit-card account, and executed credit modification engine 384 may generate elements of notification data 388 that confirm the decision to decline the requested credit-limit increase, and that include each of elements 378A, 378B, and 378C of adverse reason data 378, which specify the adverse reasons for the declined credit-limit increase. Executed credit modification engine 384 may also perform operations that transmit notification data 388 across network 120 to a computing system or system associated with the customer, such as customer device 390.

In some instances, not illustrated in FIG. 3C, one or more application programs executed by customer device 390, such as the executed web browser or executed mobile banking application, may receive the elements of notification data 388 through a corresponding programmatic interface. The one or more executed application programs may process the elements of notification data 388, and render all, or a selected portion of, these elements within a digital interface, e.g., via a corresponding display unit. As illustrated in FIG. 3C, the digital interface may include interface elements 392 that confirm the decision to decline the requested credit-limit increase, and that identify the adverse reasons that drive the decision, such, as but not limited to, "account balance is too high," "account is currently past due," and "ratio of account utilization is high."

Figure 4:
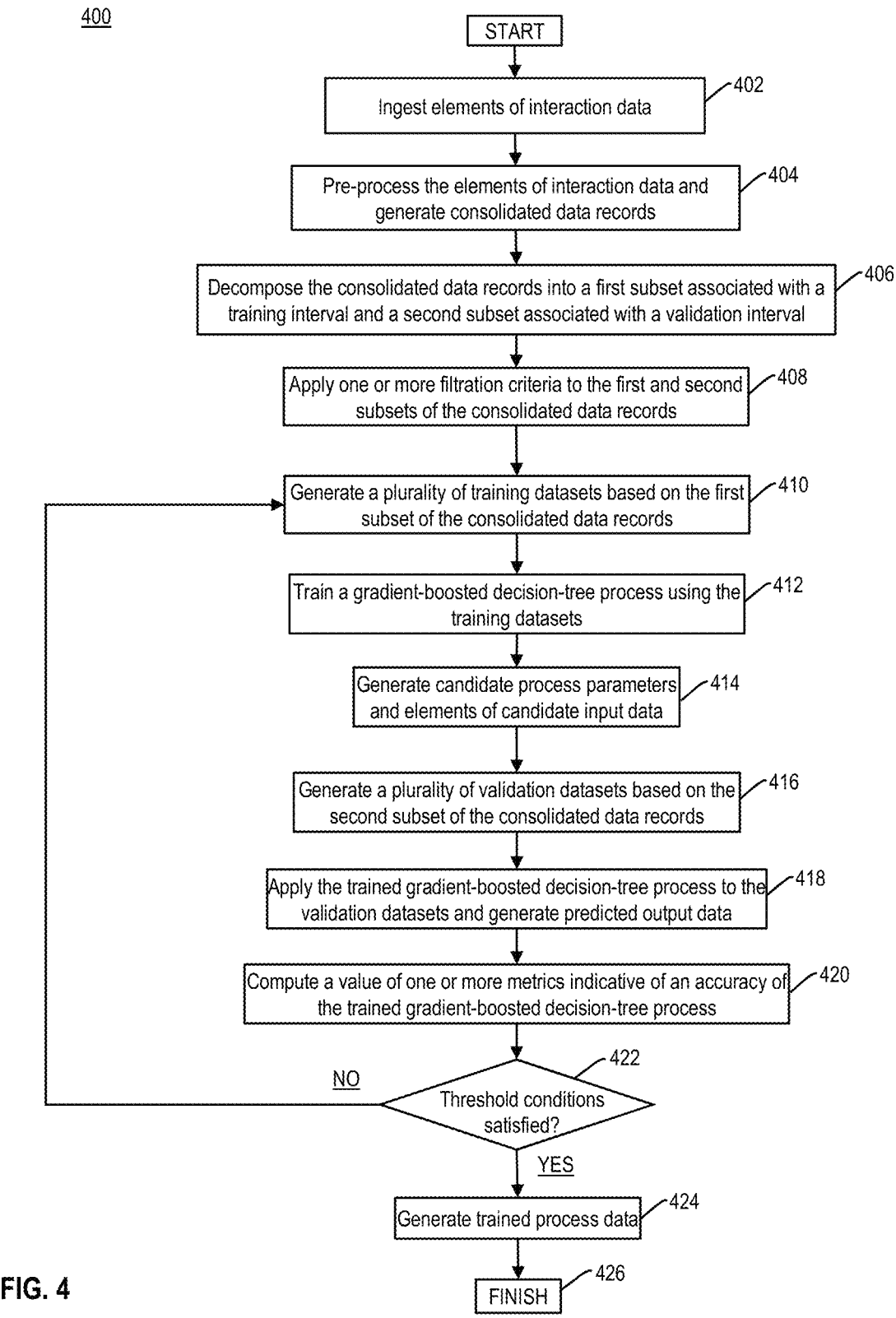
FIG. 4 is a flowchart of an exemplary processes for training a machine-learning or artificial intelligence process, in accordance with some embodiments.

FIG. 4 is a flowchart of an exemplary process 400 for adaptively training a machine learning or artificial intelligence process to predict a likelihood of an occurrence of an event during a future temporal interval using training datasets associated with a first prior temporal interval, and using validation datasets associated with a second, and distinct, prior temporal interval. As described herein, the machine-learning or artificial-intelligence process may include an ensemble or decision-tree process, such as a gradient-boosted decision-tree process (e.g., the XGBoost process), the event may include, but is not limited to, a default event involving a customer of a financial institution and corresponding credit product, such as a secured or unsecured credit-card account, and the future temporal interval may include a twelve-month interval disposed subsequent to a temporal prediction point. In some instances, one or more computing systems, such as, but not limited to, one or more of the distributed components of FI computing system 130, may perform one or of the steps of exemplary process 300, as described herein.

Referring to FIG. 4, FI computing system 130 may perform any of the exemplary processes described herein to establish a secure, programmatic channel of communication with one or more additional computing systems, such as source systems 102A and 102B and transaction system 110 of FIG. 1A, and to obtain, from the source computing systems, elements of interaction data that identify and characterize one or more customers of the financial institution (e.g., in step 402 of FIG. 4). The elements of interaction data may include, but are not limited to, one or more elements of customer profile data, account data, transaction data, delinquency data, and/or credit-bureau data associated with corresponding ones of the customers, and FI computing system 130 may also perform operations that store (or ingest) the obtained elements of interaction data within one or more accessible data repositories, such as aggregated data store 132 (e.g., also in step 402 of FIG. 4). In some instances, FI computing system 130 may perform the exemplary processes described herein to obtain and ingest the elements of interaction data in accordance with a predetermined temporal schedule (e.g., on a monthly basis), or a continuous streaming basis, across the secure, programmatic channel of communication.

Further, FI computing system 130 may access the ingested elements of internal and external interaction data, and may perform any of the exemplary processes described herein to pre-process the ingested elements of internal and external interaction data elements (e.g., the elements of customer profile, account, transaction, delinquency, and/or credit bureau data described herein) and generate one or more consolidated data records (e.g., in step 404 of FIG. 4). As described herein, the FI computing system 130 may store each of the consolidated data records within one or more accessible data repositories, such as consolidated data store 144 (e.g., also in step 404 of FIG. 4).

For example, and as described herein, each of the consolidated data records may be associated with a particular one of the customers, and may include a corresponding pair of a customer identifier associated with the particular customer (e.g., an alphanumeric character string, etc.) and a temporal interval that identifies a corresponding temporal interval. Further, and in addition to the corresponding pair of customer and temporal identifiers, each of the consolidated data records may also include one or more consolidated elements of customer profile, account, transaction, delinquency, and/or credit bureau data that characterize the particular customer during the corresponding temporal interval associated with the temporal identifier, along one or more aggregated values of customer profile, account, delinquency, credit-bureau, and/or transaction parameters that characterize a behavior of the particular customer during the corresponding temporal interval.

In some instances, FI computing system 130 may perform any of the exemplary processes described herein to decompose the consolidated data records into (i) a first subset of the consolidated data records having temporal identifiers associated with a first prior temporal interval (e.g., the training interval $\Delta t_{training}$, as described herein) and (ii) a second subset of the consolidated data records having temporal identifiers associated with a second prior temporal interval (e.g., the validation interval $\Delta t_{validation}$, as described herein), which may be separate, distinct, and disjoint from the first prior temporal interval (e.g., in step 406 of FIG. 4). By way of example, portions of the consolidated data records within the first subset may be appropriate to train the machine-leaning or artificial process (e.g., the gradient-boosted, decision-tree process described herein) during the training interval $\Delta t_{training}$, and portions of the consolidated records within the second subset may be appropriate to validating the trained, gradient-boosted, decision-tree process during the validation interval $\Delta t_{validation}$. FI computing system 130 may also perform any of the exemplary processes described herein to filter the consolidated data records of the first and second subsets in accordance with one or more filtration criteria, such as the exemplary filtration criteria described herein (e.g., in step 408 of FIG. 4).

In some instances, FI computing system 130 may perform any of the exemplary processes described herein to generate a plurality of training datasets based on elements of data obtained, extracted, or derived from all or a selected portion of the first subset of the consolidated data records (e.g., in step 410 of FIG. 4). By way of example, each of the plurality of training datasets may be associated with a corresponding one of the customers of the financial institution and a corresponding temporal interval, and may include, among other things a customer identifier associated with that corresponding customer and a temporal identifier representative of the corresponding temporal interval, as described herein. Further, and as described herein, each of the plurality of training datasets may also elements of data (e.g., feature values) that characterize the corresponding one of the customers, the corresponding customer's interaction with the financial institution or with other financial institution, and/or an occurrence (or lack thereof) of default events involving the corresponding customer during a temporal interval disposed prior to the corresponding temporal interval, e.g., during the extraction interval $\Delta t_{extract}$ described herein. Further, each of the plurality of training datasets may also include an element of ground-truth data indicative of the presence or absence of an actual default event associated with a corresponding one of the customers within a corresponding target prediction interval $\Delta t_{target}$, such as, but not limited to, a twelve-month period disposed subsequent to the date specified by the temporal identifier).

Based on the plurality of training datasets, FI computing system 130 may also perform any of the exemplary processes described herein to train the machine-learning or artificial-intelligence process (e.g., the gradient-boosted decision-tree process described herein) to predict, during a current temporal interval, a likelihood of occurrences of default events involving customers of the financial institution during a future temporal interval (e.g., in step 412 of FIG. 4). For example, and as described herein, FI computing system 130 may perform operations that establish a plurality of nodes and a plurality of decision trees for the gradient-boosted, decision-tree process, which may ingest and process the elements of training data (e.g., the customer identifiers, the temporal identifiers, the feature values, etc.) maintained within each of the plurality of training datasets, and that train the gradient-boosted, decision-tree process against the elements of training data included within each of the plurality of the training datasets.

In some examples, the distributed components of FI computing system 130 may perform any of the exemplary processes described herein in parallel to establish the plurality of nodes and a plurality of decision trees for the gradient-boosted, decision-tree process, and to train the gradient-boosted, decision-tree process against the elements of training data included within each of the plurality of the training datasets. The parallel implementation of these exemplary training processes by the distributed components of FI computing system 130 may, in some instances, be based on an implementation, across the distributed components, of one or more of the parallelized, fault-tolerant distributed computing and analytical protocols described herein.

Through the performance of these training processes, FI computing system 130 may compute one or more candidate process parameters that characterize the trained machine-learning or artificial-intelligence process, such as, but not limited to, candidate process parameters for the trained, gradient-boosted, decision-tree process described herein, such as, but not limited to, the exemplary process parameters described herein (e.g., in step 414 of FIG. 4). Further, and based on the performance of these training processes, FI computing system 130 may perform any of the exemplary processes described herein to generate candidate input data, which specifies a candidate composition of an input dataset for the trained machine-learning or artificial intelligence process, such as the trained, gradient-boosted, decision-tree process described herein (e.g., also in step 414 of FIG. 4).

Further, FI computing system 130 may perform any of the exemplary processes described herein to access the second subset of the consolidated data records, and to generate a plurality of validation subsets having compositions consistent with the candidate input data (e.g., in step 416 of FIG. 4). As described herein, each of the plurality of the validation datasets may be associated with a corresponding one of the customers of the financial institution, and with a corresponding temporal interval within the validation interval $\Delta t_{validation}$, and may include a customer identifier associated with the corresponding one of the customers and a temporal identifier that identifies the corresponding temporal interval. Further, each of the plurality of the validation datasets may also include one or more feature values consistent with the candidate input data, associated with the corresponding one of the customers, and obtained, extracted, or derived from corresponding ones of the accessed second subset of the consolidated data records (e.g., during the corresponding extraction interval $\Delta t_{extract}$, as described herein).

In some instances, FI computing system 130 may perform any of the exemplary processes described herein to apply the trained machine-learning or artificial intelligence process (e.g., the trained, gradient-boosted, decision-tree process described herein) to respective ones of the validation datasets, and to generate corresponding elements of output data based on the application of the trained machine-learning or artificial intelligence process to the respective ones of the validation datasets (e.g., in step 418 of FIG. 4). As described herein, each of the generated elements of output data may be associated with a corresponding one of the validation datasets and as such, a corresponding one of the customers. Further, each of the generated elements of output data may also a numerical score (e.g., ranging from zero to unity) indicative of a predicted likelihood that the corresponding one of the customers will experience, or will be involved in, a default event within a future temporal interval, such as, but not limited to, a twelve-month interval disposed subsequent to the date specified by the temporal identifier within the respective one of the validation datasets.

Further, and as described herein, the distributed components of FI computing system 130 may perform any of the exemplary processes described herein in parallel to validate the trained, gradient-boosted, decision-tree process described herein based on the application of the trained, gradient-boosted, decision-tree process (e.g., configured in accordance with the candidate process parameters) to each of the validation datasets. The parallel implementation of these exemplary validation processes by FI computing system 130 may, in some instances, be based on an implementation, across the distributed components, of one or more of the parallelized, fault-tolerant distributed computing and analytical protocols described herein.

In some examples, FI computing system 130 may perform any of the exemplary processes described herein to compute a value of one or more metrics that characterize a predictive capability, and an accuracy, of the trained machine-learning or artificial intelligence process (such as the trained, gradient-boosted, decision-tree process described herein) based on the generated elements of output data and corresponding ones of the validation datasets (e.g., in step 420 of FIG. 4), and to determine whether all, or a selected portion of, the computed metric values satisfy one or more threshold conditions for a deployment of the trained machine-learning or artificial intelligence process (e.g., in step 422 of FIG. 4). As described herein, and for the trained, gradient-boosted, decision-tree process, the computed metrics may include, but are not limited to, one or more recall-based values (e.g., "recall@5," "recall@10," "recall@20," etc.), one or more precision-based values for the trained, gradient-boosted, decision-tree process, and additionally, or alternatively, a computed value of an area under curve (AUC) for a precision-recall (PR) curve or a computed value of an AUC for a receiver operating characteristic (ROC) curve associated with the trained, gradient-boosted, decision-tree process.

Further, and as described herein, the threshold requirements for the trained, gradient-boosted, decision-tree process may specify one or more predetermined threshold values, such as, but not limited to, a predetermined threshold value for the computed recall-based values, a predetermined threshold value for the computed precision-based values, and/or a predetermined threshold value for the computed AUC values. In some examples, FI computing system 130 may perform any of the exemplary processes described herein to establish whether one, or more, of the computed recall-based values, the computed precision-based values, or the computed AUC values exceed, or fall below, a corresponding one of the predetermined threshold values and as such, whether the trained, gradient-boosted, decision-tree process satisfies the one or more threshold requirements for deployment.

If, for example, FI computing system 130 were to establish that one, or more, of the computed metric values fail to satisfy at least one of the threshold requirements (e.g., step 422; NO), FI computing system 130 may establish that the trained machine-learning or artificial-intelligence process (e.g., the trained, gradient-boosted, decision-tree process) is insufficiently accurate for deployment and a real-time application to the elements of customer profile, account, transaction, delinquency, or credit-bureau data described herein. Exemplary process 400 may, for example, pass back to step 410, and FI computing system 130 may perform any of the exemplary processes described herein to generate additional training datasets based on the elements of the consolidated data records maintained within the first subset.

Alternatively, if FI computing system 130 were to establish that each computed metric value satisfies threshold requirements (e.g., step 422; YES), FI computing system 130 may deem the trained machine-learning or artificial intelligence process (e.g., the trained gradient-boosted, decision-tree process described herein) ready for deployment and real-time application to the elements of customer profile, account, transaction, delinquency, or credit-bureau data described herein, and may perform any of the exemplary processes described herein to generate process parameter data that includes the candidate process parameters, and process input data that includes the candidate input data, associated with the of the trained machine-learning or artificial intelligence process (e.g., in step 424 of FIG. 4). Exemplary process 400 is then complete in step 426.

Figure 5:
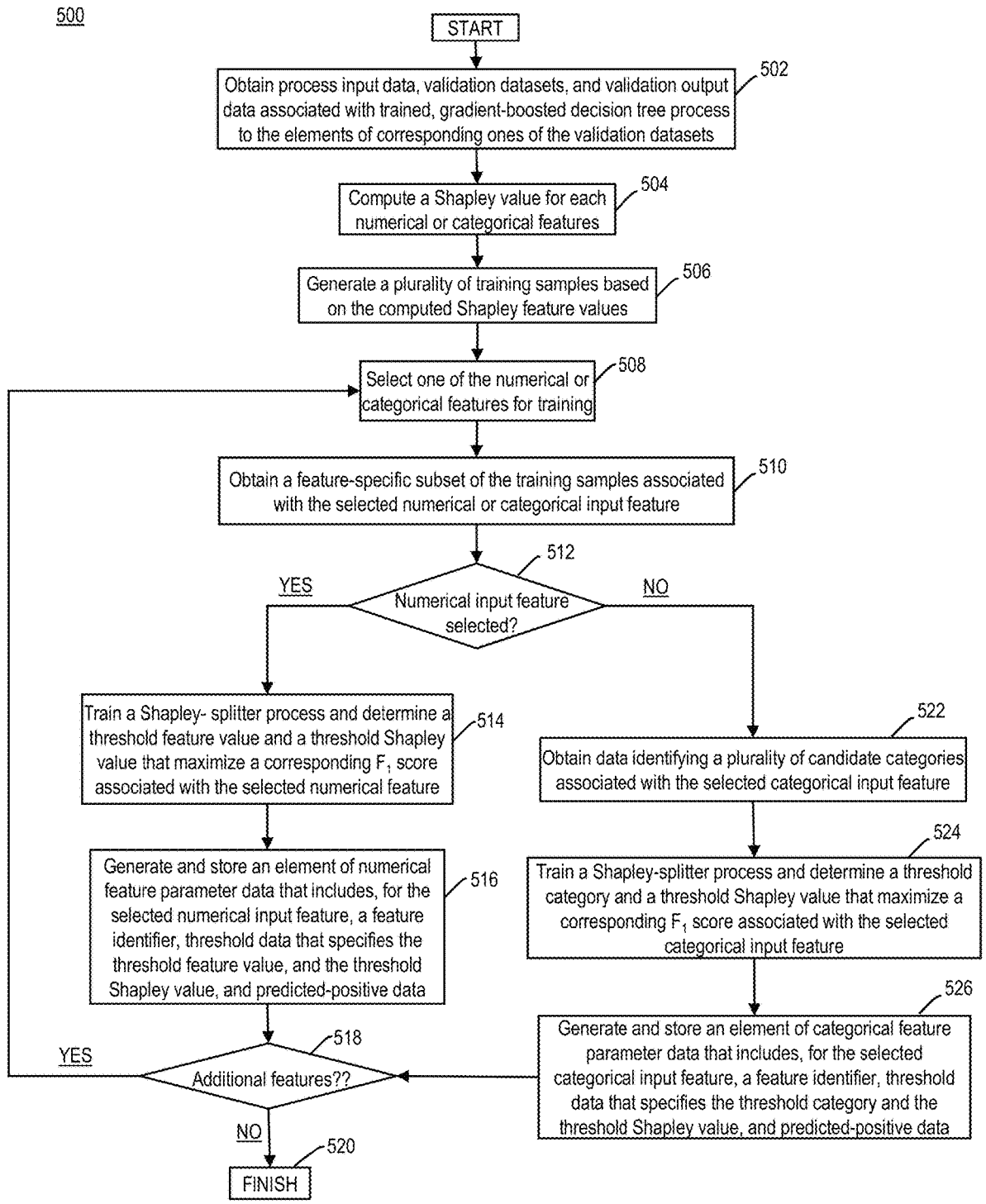
FIG. 5 is a flowchart of exemplary processes for training an explainability process, in accordance with some embodiments.

FIG. 5 is a flowchart of an exemplary process 500 for training an explainability process based on validation data associated with a trained, gradient-boosted decision-tree process. As described herein, the explainability process may include, but is not limited to, Shapley-splitter process that, when applied to a value of a numerical or categorical feature of a customer-specific dataset, generates elements of textual content that link together the numerical or categorical feature value to the predicted output generated through the application of the trained gradient-boosted, decision-tree process to the customer-specific input dataset, and that establish a feature-specific reason for the predicted output, such as, but not limited to, a predicted likelihood of an occurrence of a customer-specific default event during a future temporal interval, as described herein. In some instances, one or more computing systems, such as, but not limited to, one or more of the distributed components of FI computing system 130, may perform one or of the steps of exemplary process 500, as described herein.

Referring to FIG. 5, FI computing system 130 may perform any of the exemplary processes described herein to obtain elements of process input data associated with trained, gradient-boosted decision tree process, validation datasets associated with the trained, gradient-boosted decision tree process, and elements of validation output data generated through an application of the trained, gradient-boosted decision tree process to the elements of corresponding ones of the validation datasets (e.g., in step 502 of FIG. 5). As described herein, the elements of process input data may characterize a composition of an input dataset for the trained, gradient-boosted, decision-tree process and may include feature identifiers of corresponding ones of the numerical or categorical input feature included within the input dataset, and further, each of the validation datasets may be structured in accordance with the elements of process input data.

In step 504 of FIG. 5, FI computing system 130 may perform any of the exemplary processes described herein to compute, based on the validation datasets and the elements of output data, a Shapley feature value that, for each of the numerical or categorical input feature values included within one or more of the validation datasets, characterizes a contribution of the numerical or categorical input feature value to the predicted output of the trained, gradient-boosted, decision-tree process, e.g., the predicted likelihood of an occurrence of a default involving a corresponding customer and a credit-card account during a future temporal interval. FI computing system 130 may also perform any of the exemplary processes described herein to generate a plurality of training samples based on the computed Shapley feature values (e.g., in step 506 of FIG. 5). For example, and as described herein, each of the training samples may a feature identifier of a corresponding one of the numerical or categorical input features (e.g., obtained from the elements of process input data), a value of the corresponding one of the numerical or categorical input features (e.g., obtained from the validation datasets), and a corresponding one of the computed Shapley feature values.

FI computing system 130 may also perform any of the exemplary processes described herein to select one of the numerical or categorical input features for training (e.g., in step 508 of FIG. 5), and that obtain a feature-specific subset of the training samples associated with the selected one of the numerical or categorical input features (e.g., in step 510 of FIG. 5). Further, in step 510, FI computing system 130 may also perform any of the exemplary processes described herein to sort the training samples within the obtained feature-specific subset in accordance with the Shapley feature values (e.g., in descending order based on the corresponding Shapley feature values, etc.).

In some examples, FI computing system 130 may perform operations that determine whether the selected one of the numerical or categorical input features corresponds to a numerical input feature (e.g., in step 512 of FIG. 5). If FI computing system 130 were to establish that the selected one of the numerical or categorical input features corresponds to a numerical input feature (e.g., in step 512; YES), FI computing system 130 may perform any of the exemplary processes described herein to determine, for the numerical feature value, a threshold feature value v* and a threshold Shapley value s* that maximize values of precision and recall for the selected numerical input feature and as such, that maximize a $F_1$ score associated with the selected numerical feature (e.g., in step 514 of FIG. 5). By way of example, and through an implementation of one or more of the exemplary processes described herein in step 514, FI computing system 130 may compute the threshold feature value v* and the threshold Shapley value s* for the selected numerical input feature in accordance with:

$$(v^*, s^*) = \underset{(v,s) \in R^2}{\mathrm{argmax}} \frac{2B(v, s)}{2B(v, s) + A(v, s) + D(v, s)},$$

where: A(v,s) corresponds to a number of the sorted training samples within the obtained feature-specific subset having a numerical feature value that fails to exceed the threshold feature value v* and a Shapley feature value that exceeds the threshold Shapley value s*; B(v,s) corresponds to a number of the sorted training samples within the obtained feature-specific subset having a numerical feature value that exceeds the threshold feature value v* and a Shapley feature value that exceeds the threshold Shapley value s*; and D(v,s) corresponds to a number of the sorted training samples within the obtained feature-specific subset having a numerical feature value that exceeds the threshold feature value v* and a Shapley feature value that fails exceeds the threshold Shapley value s*.

FI computing system 130 may also perform operations, described herein, that package the feature identifier of the selected numerical input feature, threshold data that specifies the threshold feature value v* and the threshold Shapley value s* for the numerical input feature, elements of predicted-positive data associated with the selected numerical input feature into an element of numerical feature parameter data (e.g., in step 516 of FIG. 5). The elements of predicted-positive data may, for example, characterize an occurrence of a predicted positive based on the application of the trained, gradient-boosted, decision-tree process to a value of the selected numerical input feature, and may specify elements of textual content (e.g., a feature-specific reason) that characterize a causal relationship between the value of the selected numerical feature and the occurrence of the predicted positive. Further, in step 516, FI computing system may store the element of numerical feature parameter data within a data repository.

In some instances, FI computing system 130 may parse the elements of process input data and determine whether additional numerical or categorical features await selection for training (e.g., in step 518 of FIG. 5). If, for example, FI computing system 130 were to determine that no further additional numerical or categorical features await selection for training (e.g., step 518; NO), exemplary process 500 may be complete in step 520. Alternatively, if FI computing system 130 were to determine that additional numerical or categorical features await selection for training (e.g., step 518; YES), exemplary process 500 may pass back to step 508, and FI computing system 130 may perform operations to select an additional one of the numerical or categorical input features for training.

Further, referring back to step 512, If FI computing system 130 were to establish that the selected one of the numerical or categorical input features corresponds to a categorical input feature (e.g., in step 512; NO). FI computing system 130 may perform any of the exemplary processes described obtain data that identifies a plurality of candidate categories associated with the selected categorical input feature, which include, in some instances, a null value indicating an absence of a category (e.g., in step 522 of FIG. 5). FI computing system 130 may also perform any of the exemplary processes described herein to determine a threshold category c* and a threshold Shapley value s* for the selected categorical input feature that maximize values of precision and recall for the selected categorical input feature and as such, that maximize an $F_1$ score associated with the selected categorical input feature (e.g., in step 524 of FIG. 5). By way of example, and through an implementation of one or more of the exemplary processes described herein in step 524, FI computing system 130 may compute the threshold category c* and the threshold Shapley value s* for the selected categorical input feature in accordance with:

$$(c^*, s^*) = \underset{(c,s) \in R^2}{\mathrm{argmax}} \frac{2B(c, s)}{2B(c, s) + A(c, s) + D(c, s)},$$

where: A(c,s) corresponds to a number of the sorted training samples within the obtained feature-specific subset having a categorical feature value inconsistent with the threshold category c* and a Shapley feature value that exceeds the threshold Shapley value s*; B(v,s) corresponds to a number of the sorted training samples within the obtained feature-specific subset having a categorical feature value that is consistent with the threshold category c* and a Shapley feature value that exceeds the threshold Shapley value s*; and D(v,s) corresponds to a number of the sorted training samples within the obtained feature-specific subset having a categorical feature value that is consistent with the threshold category c* and a Shapley feature value that fails to exceeds the threshold Shapley value s*.

FI computing system 130 may also perform operations, described herein, that package the feature identifier of the selected categorical input feature, threshold data that specifies the threshold category c* and the threshold Shapley value s*, and elements of predicted-positive data associated with the selected categorical input feature into an element of categorical feature parameter data (e.g., in step 526 of FIG. 5). The elements of predicted-positive data may, for example, characterize an occurrence of a predicted positive based on the application of the trained, gradient-boosted, decision-tree process to a value of the selected categorical input feature, and may specify elements of textual content (e.g., a feature-specific reason) that characterize a causal relationship between the value of the selected categorical input feature and the occurrence of the predicted positive. Further, in step 526, FI computing system may store the element of numerical feature parameter data within a data repository.

Figure 6A:
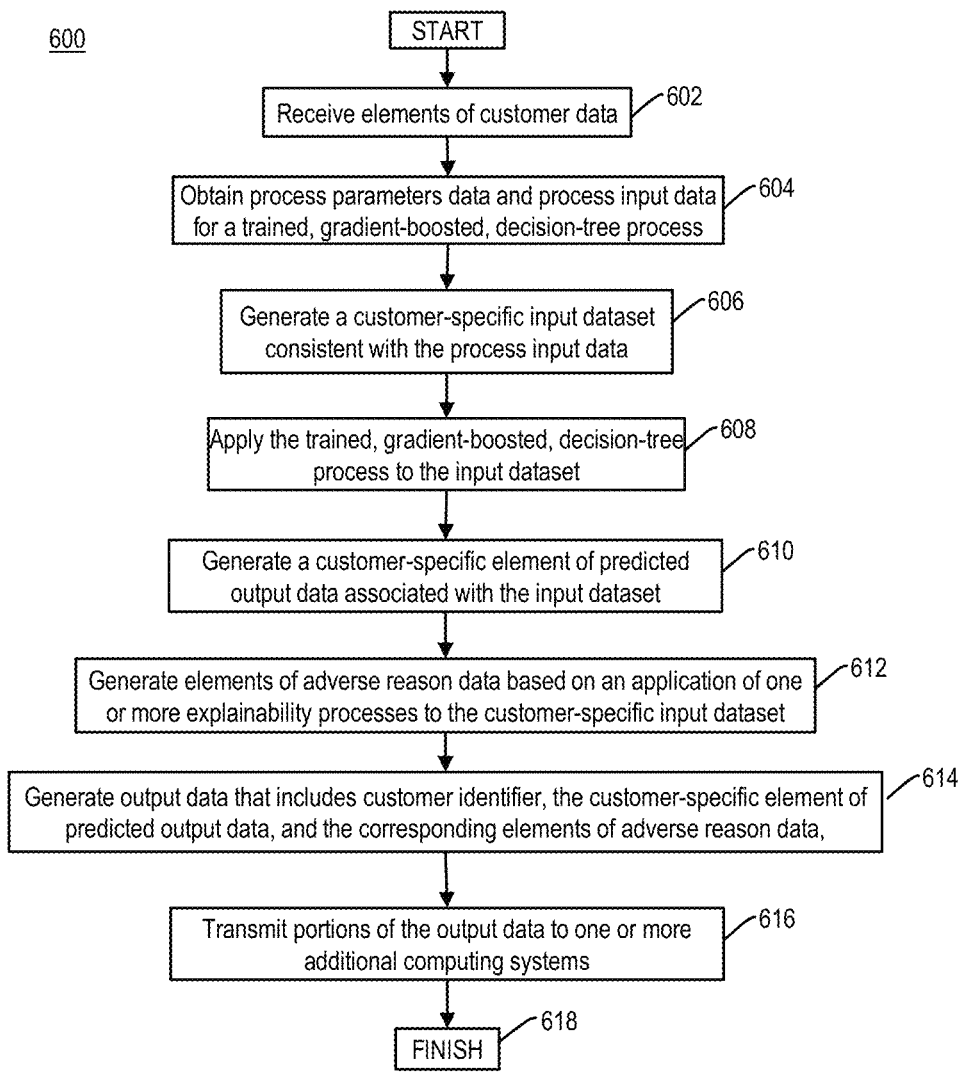
FIG. 6A is flowchart of an exemplary process for generating textual data characterizing a predicted output of a trained machine-learning or artificial-intelligence process, in accordance with some embodiments.

Exemplary process 500 may then pass back to step 518, and FI computing system 130 may parse the elements of process input data and determine whether additional numerical or categorical features await selection for training FIG. 6A is a flowchart of an exemplary process 600 for generating elements of adverse reason data characterizing a predicted output of a trained machine-learning or artificial-intelligence process based on an application of one or more explainability processes to customer-specific input datasets, in accordance with the disclosed exemplary embodiments. As described herein, the events may include one or more default events involving corresponding ones of the customers, and the machine-learning or artificial-intelligence process may include an ensemble or decision-tree process, such as a gradient-boosted decision-tree process (e.g., the XGBoost process), which may be trained to predict a likelihood of an occurrence of a default event during a future temporal interval using training datasets associated with a first prior temporal interval (e.g., the training interval $\Delta t_{training}$, as described herein), and using validation datasets associated with a second, and distinct, prior temporal interval (e.g., the validation interval $\Delta t_{validation}$, as described herein). In some instances, one or more computing systems, such as, but not limited to, one or more of the distributed components of FI computing system 130, may perform one or of the steps of exemplary process 600, as described herein.

Referring to FIG. 6A, FI computing system 130 may perform any of the exemplary processes described herein to receive elements of customer data associated with a customer of the financial institution (e.g., in step 602 of FIG. 6A). For example, FI computing system 130 may receive the elements of customer data from one or more additional computing systems associated with, or operated by, the financial institution (such as, but not limited to, issuer system 301), and in some instances, FI computing system 130 may perform any of the exemplary processes described herein to store the obtained elements of customer data within a locally accessible data repository (e.g., within aggregated data store 132). Further, in some instances, FI computing system 130 may also perform any of the exemplary processes described herein to synchronize and merge the obtained elements of customer data with one or more previously ingested elements of customer data maintained within the locally accessible data repository. As described herein, the elements of customer data may include a customer identifier associated with the customer (e.g., the alphanumeric character string, etc.) and a system identifier associated with a corresponding one of the additional computing systems (e.g., an IP or MAC address of issuer system 301, etc.).

FI computing system 130 may also perform any of the exemplary processes described herein to obtain elements of process parameter data that specify one or more process parameters for the trained, gradient-boosted, decision-tree process, such as the exemplary process parameters described herein, and to obtain element of process input data that specify a composition of an input dataset for the trained, gradient-boosted, decision-tree process (e.g., in step 604 of FIG. 6A). As described herein the elements of process input data may specify the composition of the input dataset for the trained, gradient-boosted, decision-tree process, which not only includes feature identifiers associated with each of the numerical or categorical input feature values, but also a specified sequence or position of these numerical or categorical input feature values within the input dataset.

In some instances, FI computing system 130 may access the elements of customer data, and may perform any of the exemplary processes described herein to generate a customer-specific input dataset having a composition consistent with the elements of process input data (e.g., in step 606 of FIG. 6A). Further, and based on the one or more obtained process parameters, FI computing system 130 may perform any of the exemplary processes described herein to apply the trained, gradient-boosted, decision-tree process to the generated, customer-specific input dataset (e.g., in step 608 of FIG. 6A), and to generate a customer-specific element of predicted output data associated with the customer-specific input dataset (e.g., in step 610 of FIG. 6A). For example, and based on the one or more obtained process parameters, FI computing system 130 may perform operations, described herein, that establish a plurality of nodes and a plurality of decision trees for the trained, gradient-boosted, decision-tree process, each of which receive, as inputs (e.g., "ingest"), corresponding elements (e.g., numerical or categorical input feature values) of the customer-specific input dataset.

Based on the ingestion of the input datasets by the established nodes and decision trees of the trained, gradient-boosted, decision-tree process, FI computing system 130 may perform operations that apply the trained, gradient-boosted, decision-tree process to the customer-specific input dataset and that generate the customer-specific element of the output data associated with the customer-specific input dataset. As described herein, the customer-specific element of predicted output data may include a numerical score (e.g., either zero or unity) indicative of a predicted likelihood of an occurrence of a default event involving the customer and a corresponding credit-card account during the future temporal interval, e.g., with a score of zero being indicative of a predicted non-occurrence of the default event during the future temporal interval, and with a score of unity being indicative of a predicted occurrence of the default event during the future temporal interval. Further, and as described herein, the future temporal interval may include, but is not limited to, a twelve-month period disposed subsequent to a corresponding prediction date (e.g., the prediction date $t_{pred}$ described herein).

Further, as illustrated in FIG. 6A, FI computing system 130 may also perform any of the exemplary processes described herein to generate elements of adverse reason data that include elements of natural language explaining a magnitude of the numerical score generated through the application of the trained, gradient-boosted, decision-tree process to the generated, customer-specific input dataset (e.g., in step 612 of FIG. 6A). By way of example, in step 612, FI computing system 130 may perform any of the exemplary processes described herein to apply one or more explainability processes to the numerical or categorical feature values of the customer-specific input dataset, to generate elements of textual content that establish a causal relationship between corresponding ones of the numerical or categorical feature values and the predicted output of the trained, gradient-boosted, decision-tree process, and to map the elements of textual content to corresponding elements of natural language that characterize the association between the corresponding numerical or categorical feature values and the predicted output in a manner readily apparent to, and appreciable by, representatives and customers of the financial institution, as described below in reference to FIG. 6B.

Figure 6B:
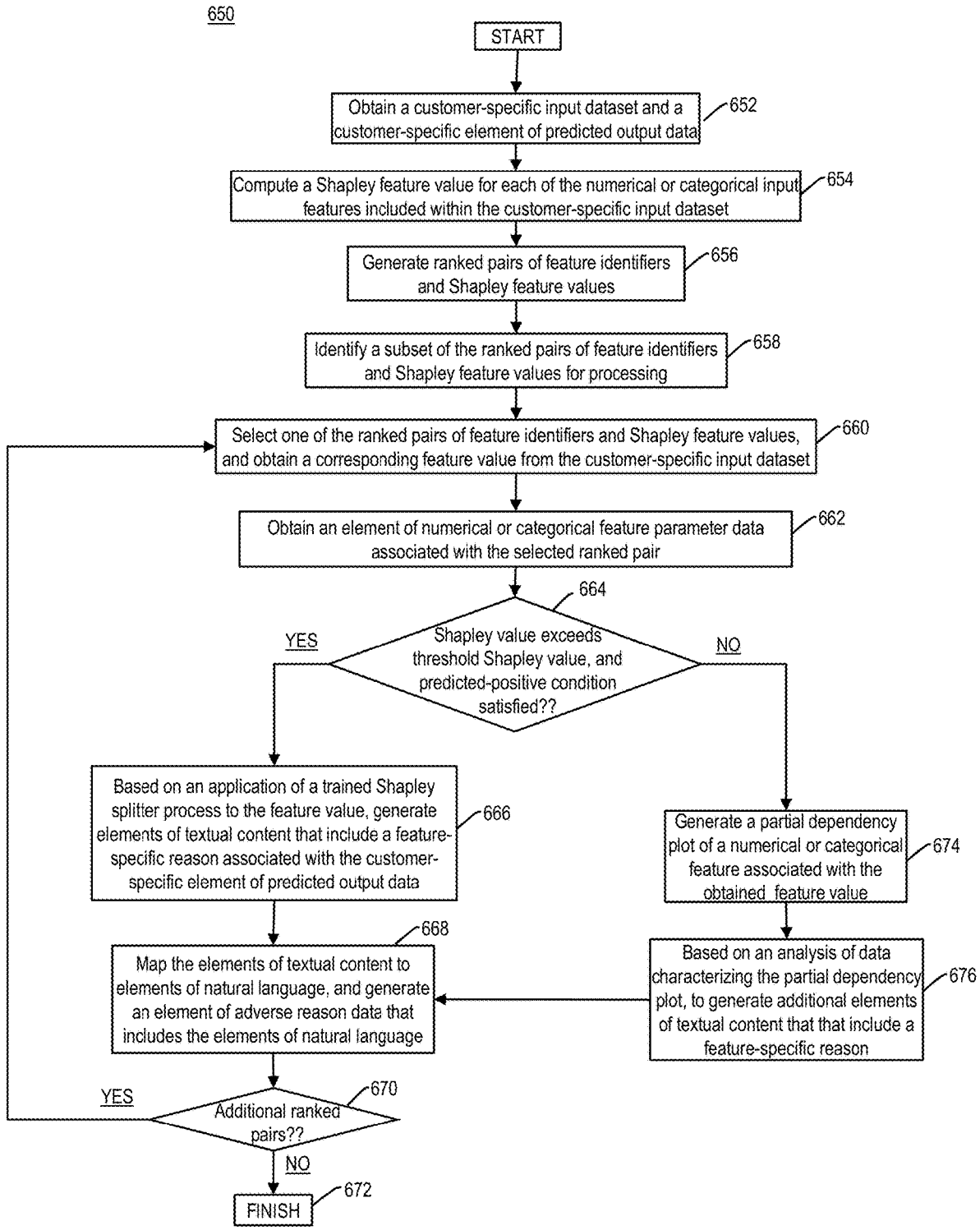
FIG. 6B is flowchart of an exemplary process for applying one or more explainability processes to an input dataset associated with a trained machine-learning or artificial-intelligence process, in accordance with some embodiments.

FIG. 6B is a flowchart of an exemplary process 650 for applying one or more explainability processes to an input dataset associated with a trained machine-learning or artificial-intelligence process, according to some exemplary embodiments. As described herein, the predicted output may include a customer-specific numerical score (e.g., either zero or unity) indicative of a predicted likelihood of an occurrence of a default event involving a customer and a corresponding credit-card account during a future temporal interval, e.g., with a score of zero being indicative of a predicted non-occurrence of the default event during the future temporal interval, and with a score of unity being indicative of a predicted occurrence of the default event during the future temporal interval. Further, and as described herein, the future temporal interval may include, but is not limited to, a twelve-month period disposed subsequent to a corresponding prediction date (e.g., the temporal prediction point $t_{pred}$ described herein). In some instances, one or more computing systems, such as, but not limited to, one or more of the distributed components of FI computing system 130, may perform one or of the steps of exemplary process 650, as described herein.

Referring to FIG. 6B, FI computing system 130 may obtain customer-specific input dataset associated with the trained, gradient-boosted, decision tree process and a customer-specific element of predicted output data generated through an application of the trained, gradient-boosted, decision tree process to the customer-specific input dataset (e.g., in step 652 of FIG. 6B). Based on the customer-specific input dataset and element of predicted output data, FI computing system 130 may perform any of the exemplary processes described herein to compute a Shapley feature value for each of the numerical or categorical input features included within the customer-specific input dataset (e.g., in step 654 of FIG. 6B). Further, FI computing system 130 may also perform any of the exemplary processes described herein to associate each of computed Shapley feature values with an identifier of the corresponding numerical or categorical input feature, and to rank each of the associated pairs feature identifiers and Shapley feature values based on corresponding ones of Shapley feature values, for example, in descending order (e.g., in step 656 of FIG. 6B). FI computing system 130 may also perform any of the exemplary processes described herein to identify a subset of the ranked pairs of feature identifiers and Shapley feature values associated with those numerical or categorical input features characterized by the largest of the ranked Shapley feature values (e.g., in step 658 of FIG. 6B). For example, the subset may include a predetermined number of the ranked pairs associated with the largest of the ranked Shapley feature values, or the subset may include a plurality of ranked pairs associated with Shapley feature values that exceed a threshold value.

In some instances, FI computing system 130 may perform operation, described herein, to select a corresponding one of the ranked pairs of feature identifiers and Shapley feature values (e.g., in step 660 of FIG. 6B). Further, FI computing system 130 may also perform operations, described herein, that obtain the feature identifier and the Shapley feature value from the selected ranked pair, and that access the feature value associated with the obtained feature identifier from the customer-specific input dataset (e.g., also in step 660 of FIG. 6B).

Based on the feature identifier obtained from the selected ranked pair, FI computing system 130 may perform any of the exemplary processes described herein to obtain an element of numerical or categorical feature parameter data associated with a rained Shapley-splitter process that includes the obtained feature identifier, and as such, the characterizes an application of the trained Shapley-splitter process to obtained feature value (e.g., in step 662 of FIG. 6B). By way of example, the obtained element of numerical or categorical feature parameter data may include, among other things, a corresponding feature identifier, a corresponding threshold feature value or threshold category, a corresponding threshold Shapley value, and elements of predicted-positive data specifying a predicted-positive condition for the numerical or categorical input feature associated with the selected ranked pair. FI computing system 130 may also perform operations that determine whether the Shapley feature value of the selected ranked pair exceeds the corresponding threshold Shapley value, and whether the accessed feature value satisfies the predicted-positive condition set forth in the corresponding elements of predicted-positive data (e.g., in step 664 of FIG. 6B).

If, for example, FI computing system 130 were to determine that the Shapley feature value of the selected ranked pair exceeds the corresponding threshold Shapley value, and that the accessed feature value satisfies the predicted-positive condition (e.g., step 664; YES), FI computing system 130 may perform any of the exemplary processes described herein to apply the trained Shapley-splitter process to the accessed feature value and based on the application of the trained Shapley-splitter process to the accessed feature value, generate elements of textual content that establish a causal relationship between the accessed feature value and the predicted output of the trained, gradient-boosted, decision-tree process, and as such, establish a feature-specific reason for the predicted output (e.g., in step 666 of FIG. 6B).

For instance, if the accessed feature value were to represent a value of a numerical input feature (e.g., associated with the feature identifier of the ranked pair), FI computing system 130 may perform any of the exemplary processes described herein, in step 666, to generate elements of textual content that include the phrase "the feature value is too high" when the accessed feature value exceeds the corresponding threshold feature value (e.g., as specified within the corresponding element of numerical parameter data), or to generate elements of textual content that include the phrase "the feature value is too local" when the accessed feature value fails to exceed the corresponding threshold feature value. Alternatively, if the accessed feature value were to represent a value of a categorical input feature (e.g., associated with the feature identifier of the ranked pair), FI computing system 130 may perform any of the exemplary processes described herein, in step 666, to generate elements of textual content that include the phrase "the feature value is the threshold category" when the accessed feature value includes the threshold category (e.g., as specified within the corresponding element of numerical parameter data), or to generate elements of textual content that include the phrase "the feature value is the threshold category" when the accessed feature value fails to include the corresponding threshold category.

FI computing system 130 may also perform any of the exemplary processes described herein to map the elements of textual content to corresponding elements of natural language, and generate an element of adverse reason data that includes the corresponding elements of natural language (e.g., in step 668 of FIG. 6B). As described herein, the corresponding elements of natural language, and the element of adverse reason data, may characterize the association, and causal relationship, between the corresponding feature values and the predicted output in a manner readily apparent to, and appreciable by, representatives and customers of the financial institution. In some instances, FI computing system 130 may determine whether additional ones of the subset of ranked pairs of feature identifiers and Shapley feature values await analysis using any of the exemplary processes described herein (e.g., in step 670 of FIG. 6B). If, for example, FI computing system 130 were to determine that at least one of the subset of ranked pairs of feature identifiers and Shapley feature values await analysis (e.g., step 674; YES), exemplary process 650 may pass back to step 660, and FI computing system may perform operations that select an additional one of the subset of the ranked pairs of feature identifiers and Shapley feature values. Alternatively, if FI computing system 130 were to determine no additional ranked pairs of feature identifiers and Shapley feature values await analysis (e.g., step 670; NO), exemplary process 650 is complete in step 672.

Referring back to step 664, if FI computing system 130 were to determine that the Shapley feature value of the selected ranked pair fails to the corresponding threshold Shapley value, or that the accessed feature value fails to satisfy the predicted-positive condition (e.g., step 664; NO), FI computing system 130 may establish that the trained Shapley-splitter may be incapable of generating elements of textual content that establish a causal relationship between the accessed feature value and the predicted output of the trained, gradient-boosted, decision-tree process. In some instances, FI computing system 130 may perform any of the exemplary processes described herein to generate a partial dependency plot of numerical or categorical feature associated with the accessed feature value (e.g., in step 674 of FIG. 6B) and based on an analysis of data characterizing the partial dependency plot, to generate additional elements of textual content that establish a causal relationship between the accessed feature value and the predicted output of the trained, gradient-boosted, decision-tree process (e.g., in step 676 of FIG. 6B).

For instance, if the accessed feature value were to represent a value of a numerical input feature (e.g., associated with the feature identifier of the ranked pair), FI computing system 130 may perform operations in step 676, described herein, to compute a value of a Kendall rank correlation coefficient (e.g., a Kendall "$\tau$") for the local partial dependency plot. Further, and as described herein, FI computing system 130 may generate in step 680 additional elements of textual content that include the phrase "the feature value is too high" when the computed value of the Kendall rank correlation coefficient exceeds a threshold value, or additional elements of textual content that include the phrase "the feature value is too low" when the computed value of the Kendall rank correlation coefficient fails to exceed the threshold value. In other instances, FI computing system 130 may perform operations, in step 676, that package the accessed feature value associated with the numerical input feature into the additional elements of textual content. Alternatively, if the accessed feature value were to represent a value of a categorical input feature (e.g., associated with the feature identifier of the ranked pair), FI computing system 130 may perform any of the exemplary processes described herein to, based on an analysis of the data characterizing a local partial dependency plot, determine a new feature value for the additional categorical input feature that would reduce a predicted numerical score (e.g., based on the application of the trained, gradient-boosted, decision tree process to an input dataset that includes the new feature value), and package the new feature value into additional elements of textual content (e.g., also in step 676 of FIG. 6B).

In some instances, exemplary process 650 may pass back to step 668, and FI computing system 130 may also perform any of the exemplary processes described herein to map the additional elements of textual content to corresponding elements of natural language that characterize the association, and causal relationship between the corresponding feature values and the predicted output in a manner readily apparent to, and appreciable by, representatives and customers of the financial institution.

Referring back to FIG. 6A, FI computing system 130 may perform any of the exemplary processes described herein to package the customer identifier, the customer-specific element of predicted output data, and the corresponding elements of adverse reason data, including the elements of natural language described herein, into corresponding portions of output data (e.g., in step 614 of FIG. 6A), and FI computing system 130 may perform operations that transmit the output data to a corresponding one of the additional computing systems associated with the financial institution, which include, but are not limited to, issuer system 301 (e.g., in step 616 of FIG. 6A). By way of example, and as described herein, issuer system 301 may receive the output data from FI computing system 130, and may perform any of the exemplary processes described herein to that parse each the elements of output data to obtain a corresponding numerical score for a corresponding customer, and based on the corresponding numerical score, to elect to decline a request by the corresponding customer to increase a credit limit associated with a secured or unsecured credit-card account. In some example, the elements of natural language may establish reasons for the adverse decision, and issuer system 301 may provision data characterizing the adverse decision, and the reasons, to a device of the corresponding customer, e.g., for presentation within a digital interface. Exemplary process 600 is then complete in step 618.

D. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, including, but not limited to, application programming interfaces (APIs) 134, 304, and 382, data ingestion engine 136, pre-processing engine 140, training engine 162, training input module 166, adaptive training and validation module 172, explainability engine 210, predictive engine 214, training engine 230, numerical feature training module 232, categorical feature training module 244, process input engine 312, post-processing engine 338, reason generation engine 344, selection module 346, Shapley-splitter predictive module 350, local PDP predictive module 366, reason generation module 374, and credit modification engine 384, can be implemented as one or more computer programs, i.e., one or more modules of computer program instructions encoded on a tangible non transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
a memory storing instructions;
a communications interface; and
at least one processor coupled to the memory and the communications interface, the at least one processor being configured to execute the instructions to:
train adaptively an artificial intelligence process based on a plurality of training datasets associated with a first temporal interval, and validate the trained artificial intelligence process based on a plurality of validation datasets associated with a second temporal interval, wherein the second temporal interval is subsequent to the first temporal interval;
receive an input dataset based on elements of first interaction data associated with a third temporal interval and a temporal identifier characterizing a fourth temporal interval, the fourth temporal interval being subsequent to the third temporal interval, and the input dataset comprising feature values of a plurality of input features corresponding to the first interaction data;
based on an application of the trained artificial intelligence process to the input dataset, generate output data representative of a predicted likelihood of an occurrence of an event during the fourth temporal interval;
train an explainability process based on the plurality of validation datasets;
provision pairs of the feature values and Shapley feature values to the trained explainability process, where each pair comprises a corresponding one of the feature values and a Shapley feature value associated with the corresponding feature value;
based on an application of the trained explainability process to the pairs of the feature values and Shapley feature values, generate a first element of textual content that characterizes an outcome associated with the predicted likelihood of the occurrence of the event, the first element of textual content being associated with the corresponding feature value; and
transmit a portion of the output data and the first element of textual content to a computing system via the communications interface, wherein the computing system is configured to generate or modify second interaction data based on the portion of the output data, and to provision notification data comprising the first element of textual content to a device associated with the first interaction data.

2. The apparatus of claim 1, wherein the trained artificial intelligence process comprises a trained, gradient-boosted, decision-tree process.

3. The apparatus of claim 1, wherein the at least one processor is further configured to execute the instructions to:
obtain explainability data associated with the input dataset, the explainability data comprising the Shapley feature value;
obtain the corresponding feature value from the input dataset, and obtain parameter data associated with the trained explainability process and the input feature associated with the corresponding feature value, the parameter data comprising a threshold feature value associated with the input feature, a threshold Shapley value associated with the input feature, and data characterizing a predicted-positive condition associated with the input feature;
apply the trained explainability process to the corresponding feature value and to the Shapley feature value in accordance with the parameter data, and generate the first element of textual content based on the application of the trained explainability process to the corresponding feature value and to the Shapley feature value.

4. The apparatus of claim 3, wherein the at least one processor is further configured to execute the instructions to:
  based on a determination that the Shapley feature value exceeds the threshold Shapley value, and that the corresponding feature value satisfies the predicted-positive condition, obtain a second element of textual content associated with the predicted-positive condition and the input feature; and
  perform operations that map portions of the second element of textual content to elements of natural language associated with the corresponding feature value, the first element of textual content comprising the elements of natural language.

5. The apparatus of claim 4, wherein the input feature associated with the corresponding feature value comprises a numerical input feature, and the at least one processor is further configured to execute the instructions to:
  based on the determination that the Shapley feature value exceeds the threshold Shapley value, determine that (ii) the corresponding feature value exceeds the threshold feature value or (ii) fails to exceed the threshold feature value; and
  based on the determination that the corresponding feature value exceeds, or fails to exceed, the threshold feature value, establish that the corresponding feature value satisfies the predicted-positive condition for the numerical input feature.

6. The apparatus of claim 4, wherein, the input feature associated with the corresponding feature value comprises a categorical input feature, the threshold feature value comprises a threshold category, and the at least one processor is further configured to execute the instructions to:
  based on the determination that the Shapley feature value exceeds the threshold Shapley value, determine that (ii) the corresponding feature value includes the threshold feature category or (ii) fails to include the threshold category; and
  based on the determination that the corresponding feature value includes, or fails to include, the threshold category, establish that the corresponding feature value satisfies the predicted-positive condition for the categorical input feature.

7. The apparatus of claim 3, wherein the at least one processor is further configured to execute the instructions to:
  based on a determination that at least one of (i) the Shapley feature value fails to exceed the threshold Shapley value or (ii) the corresponding feature value fails to satisfy the predicted-positive condition, perform operations that generate data characterizing a partial dependency plot for the input feature;
  generate a second element of textual content based on portions of the data characterizing the partial dependency plot;
  perform operations that map portions of the second element of textual content to elements of natural language associated with the corresponding feature value, and generate a third element of textual content based on the elements of natural language; and
  transmit the portion of the output data and the third element of textual content to the computing system via the communications interface.

8. The apparatus of claim 7, wherein the input feature associated with the corresponding feature value comprises a categorical input feature, the categorical input feature is associated with a plurality of candidate category values, the corresponding feature value is associated with a first one of the candidate category values, and the at least one processor is further configured to execute the instructions to:
  identify a second one of the candidate category values based on the data characterizing the partial dependency plot; and
  generate the second element of textual content based on the second one of the candidate category values.

9. The apparatus of claim 1, wherein the at least one processor is further configured to execute the instructions to:
  obtain elements of third interaction data, each of the elements of the third interaction data comprising additional temporal identifier associated with a corresponding temporal interval;
  based on the additional temporal identifiers, determine that a first subset of the elements of the third interaction data are associated with the first temporal interval, and that a second subset of the elements of the third interaction data are associated with the second temporal interval;
  generate the plurality of training datasets based on corresponding portions of the first subset; and
  generate elements of candidate process data and candidate composition data associated with the trained artificial intelligence process, and store the elements of candidate process data and candidate composition data within a corresponding portion of the memory.

10. The apparatus of claim 1, wherein the at least one processor is further configured to execute the instructions to:
  obtain, from the memory, the plurality of validation datasets associated with the trained artificial intelligence process, and elements of additional output data associated with corresponding ones of the validation datasets, the plurality of validation datasets comprising validation feature values associated with the input features; and
  obtain explainability data associated with the validation datasets, the explainability data comprising the Shapley feature value associated with each of the input features;
  generate a plurality of training samples based on the validation feature values and the Shapley feature value, each of the training samples comprising a corresponding pair of the validation feature values and the Shapley feature value; and
  for the corresponding one of the input features, perform operations that determine a threshold feature value and a threshold Shapley value based on the training samples, and generate parameter data for the trained explainability process that includes the threshold feature value and the threshold Shapley value.

11. The apparatus of claim 9, wherein the at least one processor is further configured to execute the instructions to:
  obtain the elements of candidate process data and candidate input data from the corresponding portion of the memory;
  generate the plurality of validation datasets based on portions of the second subset and in accordance with the elements of candidate composition data;
  apply the trained artificial intelligence process to the plurality of validation datasets in accordance with the elements of candidate process data, and generate additional elements of output data based on the application of the trained artificial intelligence process to the plurality of validation datasets;
  compute one or more validation metrics based on the additional elements of output data; and
  based on a determined consistency between the one or more validation metrics and a threshold condition, validate the trained artificial intelligence process, and generate elements of process parameter data and process input data associated with the validated artificial intelligence process, and storing the validation datasets and the elements of process parameter data and process input data within the corresponding portion of the memory.

12. The apparatus of claim 1, wherein the at least one processor is further configured to execute the instructions to:
obtain explainability data associated with the application of the trained artificial intelligence process to the input dataset, the explainability data comprises a value of a metric that characterizes an accuracy of the trained artificial intelligence process during the application to the input dataset; and
obtain elements of process parameter data that include a parameter value of the trained artificial intelligence process and process input data that specifies a composition of the input dataset;
determine that the metric value is inconsistent with at least one predetermined threshold value; and
perform operations that modify at least one of parameter value or the composition of the input dataset based on determination that the metric value is inconsistent with at least one predetermined threshold value.

13. A computer-implemented method, comprising:
using at least one processor, training adaptively an artificial intelligence process based on a plurality of training datasets associated with a first temporal interval, and validating the trained artificial intelligence process based on a plurality of validation datasets associated with a second temporal interval, wherein the second temporal interval is subsequent to the first temporal interval;
receiving, using the at least one processor, an input dataset based on elements of first interaction data associated with a third temporal interval and a temporal identifier characterizing a fourth temporal interval, the fourth temporal interval being subsequent to the third temporal interval, and the input dataset comprising feature values of a plurality of input features corresponding to the first interaction data;
using the at least one processor, and based on the application of a trained artificial intelligence process to the input dataset, generating output data representative of a predicted likelihood of an occurrence of an event during the fourth temporal interval;
using the at least one processor, training an explainability process based on the plurality of validation datasets;
using the at least one processor, provisioning pairs of the feature values and Shapley feature values to the trained explainability process, where each pair comprises a corresponding one of the feature values and a Shapley feature value associated with the corresponding feature value;
using the at least one processor, and based on an application of the trained explainability process to the pairs of the feature values and Shapley feature values, generating a first element of textual content that characterizes an outcome associated with the predicted likelihood of the occurrence of the event, the first element of textual content being associated with the corresponding feature value; and
using the at least one processor, transmitting a portion of the output data and the first element of textual content to a computing system, wherein the computing system is configured to generate or modify second interaction data based on the portion of the output data, and to provision notification data comprising the first element of textual content to a device associated with the first interaction data.

14. The computer-implemented method of claim 13, further comprising:
obtaining, using the at least one processor, explainability data associated with the input dataset, the explainability data comprising the Shapley feature value;
using the at least one processor, obtaining the corresponding feature value of the corresponding input feature from the input dataset, and obtaining parameter data associated with the trained explainability process and the input feature associated with the corresponding feature value, the parameter data comprising a threshold feature value associated with the input feature, a threshold Shapley value associated with the input feature, and data characterizing a predicted-positive condition for the input feature; and
using the at least one processor, applying the trained explainability process to the corresponding feature value and to the Shapley feature value in accordance with the parameter data.

15. The computer-implemented method of claim 14, wherein generating the first element of textual content further comprises:
based on a determination that the Shapley feature value exceeds the threshold Shapley value, and that the corresponding feature value satisfies the predicted-positive condition, obtaining a second element of textual content associated with the predicted-positive condition and the input feature; and
performing operations that map portions of the second element of textual content to elements of natural language associated with the corresponding feature value, the first element of textual content comprising the elements of natural language.

16. The computer-implemented method of claim 15, wherein the input feature associated with the corresponding feature value comprises a numerical input feature, and the computer-implemented method further comprises:
based on the determination that the Shapley feature value exceeds the threshold Shapley value, determining, using the at least one processor, that (ii) the corresponding feature value exceeds the threshold feature value or (ii) fails to exceed the threshold feature value; and
based on the determination that the corresponding feature value exceeds, or fails to exceed, the threshold feature value, determining, using the at least one processor, that the feature value satisfies the predicted-positive condition for the numerical input feature.

17. The computer-implemented method of claim 15, wherein the input feature associated with the corresponding feature value comprises a categorical input feature, the threshold feature value comprises a threshold category, and the computer-implemented method further comprises:
based on the determination that the Shapley feature value exceeds the threshold Shapley value, determining that (ii) the corresponding feature value includes the threshold feature category or (ii) fails to include the threshold category; and
based on the determination that the corresponding feature value includes, or fails to include, the threshold category, determining that the corresponding feature value satisfies the predicted-positive condition for the categorical input feature.

18. The computer-implemented method of claim 14, further comprising:
based on a determination that at least one of (i) the Shapley feature value fails to exceed the threshold Shapley value or (ii) the corresponding feature value fails to satisfy the predicted-positive condition, performing, using the at least one processor, operations that generate data characterizing a partial dependency plot for the input feature;
generating, using the at least one processor, a second element of textual content based on portions of the data characterizing the partial dependency plot;
using the at least one processor, performing operations that map portions of the second element of textual content to elements of natural language associated with the feature value, and generating a third element of textual content based on the elements of natural language; and
transmitting, using the at least one processor, the portion of the output data and the third element of textual content to the computing system.

19. The computer-implemented method of claim 18, wherein the input feature associated with the corresponding feature value comprises a categorical input feature, the categorical input feature is associated with a plurality of candidate category values, the corresponding feature value is associated with a first one of the candidate category values, and generating the second element of textual content comprises:
identifying a second one of the candidate category values based on the data characterizing a partial dependency plot for the input feature; and
generating the second element of textual content based on the second one of the candidate category values.

20. The computer-implemented method of claim 13, further comprising:
obtaining, using the at least one processor, elements of third interaction data, each of the elements of the third interaction data comprising an additional temporal identifier associated with a corresponding temporal interval;
based on the additional temporal identifiers, and using the at least one processor, determining that a first subset of the elements of the third interaction data are associated with the first temporal interval, and that a second subset of the elements of the third interaction data are associated with the second temporal interval; and
using the at least one processor, generating the plurality of training datasets based on corresponding portions of the first subset;
using the at least one processor, generating elements of candidate process data and candidate composition data associated with the trained artificial intelligence process, and storing the elements of candidate process data and candidate composition data within a corresponding portion of a data repository;
generating, using the at least one processor, the plurality of validation datasets based on portions of the second subset and in accordance with the elements of candidate composition data;
using the at least one processor, applying the trained artificial intelligence process to the plurality of validation datasets in accordance with the elements of candidate process data, and generating additional elements of output data based on the application of the trained artificial intelligence process to the plurality of validation datasets;
computing, using the at least one processor, one or more validation metrics based on the additional elements of output data, and based on a determined consistency between the one or more validation metrics and a threshold condition, validating the trained artificial intelligence process using the at least one processor; and
generating, using the at least one processor, elements of process parameter data and process input data associated with the validated artificial intelligence process, and storing, using the at least one processor, the validation datasets and the elements of process parameter data and process input data within the corresponding portion of the data repository.

21. The computer-implemented method of claim 13, wherein the trained artificial intelligence process comprises a trained, gradient-boosted, decision-tree process, and the computer-implemented method further comprises:
obtaining, using the at least one processor, the plurality of validation datasets associated with the trained artificial intelligence process, and elements of additional output data associated with corresponding ones of the validation datasets, the plurality of validation datasets comprising validation feature values associated with corresponding input features; and
obtaining, using the at least one processor, explainability data associated with the validation datasets, the explainability data comprising the Shapley feature value associated with each of the corresponding input features;
generating, using the at least one processor, a plurality of training samples based on the validation feature values and the computed Shapley feature value, each of the training samples comprising a corresponding pair of the validation feature values and the computed Shapley feature value; and
for the corresponding one of the input features, performing, using the at least one processor, operations that determine a threshold feature value and a threshold Shapley value based on the training samples, and generate parameter data for the trained explainability process that includes the threshold feature value and the threshold Shapley value.

22. A tangible, non-transitory computer-readable medium storing instructions that, when executed by at least one processor, cause the at least one processor to perform a method, comprising:
training adaptively an artificial intelligence process based on a plurality of training datasets associated with a first temporal interval, and validating the trained artificial intelligence process based on a plurality of validation datasets associated with a second temporal interval, wherein the second temporal interval is subsequent to the first temporal interval;
receiving an input dataset based on elements of first interaction data associated with a third temporal interval and a temporal identifier characterizing a fourth temporal interval, the fourth temporal interval being subsequent to the third first temporal interval, and the input dataset comprising feature values of a plurality of input features corresponding to the first interaction data;
based on an application of the trained artificial intelligence process to the input dataset, generating output data representative of a predicted likelihood of an occurrence of an event during the fourth temporal interval;

training an explainability process based on the plurality of validation datasets;

provisioning pairs of the feature values and Shapley feature values to the trained explainability process, where each pair comprises a corresponding one of the feature values and a Shapley feature value associated with the corresponding feature value;

based on an application of the trained explainability process to the pairs of the feature values and Shapley feature values, generating an element of textual content that characterizes an outcome associated with the predicted likelihood of the occurrence of the event, the element of textual content being associated with the corresponding feature value; and transmitting a portion of the output data, and the element of textual content to a computing system, wherein the computing system is configured to generate or modify second interaction data based on the portion of the output data, and to provision notification data comprising the element of textual content to a device associated with the first interaction data.

* * * * *